United States Patent
Shibata

(10) Patent No.: US 8,903,195 B2
(45) Date of Patent: Dec. 2, 2014

(54) SPECIFICATION OF AN AREA WHERE A RELATIONSHIP OF PIXELS BETWEEN IMAGES BECOMES INAPPROPRIATE

(75) Inventor: Takashi Shibata, Tokyo (JP)

(73) Assignee: NEC Corporation, Tokyo (JP)

( * ) Notice: Subject to any disclaimer, the term of this patent is extended or adjusted under 35 U.S.C. 154(b) by 521 days.

(21) Appl. No.: 13/201,629

(22) PCT Filed: Feb. 19, 2010

(86) PCT No.: PCT/JP2010/001109
§ 371 (c)(1), (2), (4) Date: Aug. 16, 2011

(87) PCT Pub. No.: WO2010/095460
PCT Pub. Date: Aug. 26, 2010

(65) Prior Publication Data
US 2011/0299795 A1  Dec. 8, 2011

(30) Foreign Application Priority Data
Feb. 19, 2009  (JP) .................. 2009-036826

(51) Int. Cl.
*G06K 9/32* (2006.01)
*G06T 7/20* (2006.01)

(52) U.S. Cl.
CPC ..... *G06T 7/2053* (2013.01); *G06T 2207/20224* (2013.01)
USPC .......................... 382/299; 382/107

(58) Field of Classification Search
CPC ................. G06T 3/4007; G06T 9/00791
USPC ................ 345/475; 348/207.2; 358/3.27, 1.9; 382/104, 162, 163, 167, 284, 299; 386/69
See application file for complete search history.

(56) References Cited

U.S. PATENT DOCUMENTS 6,496,599 B1 * 12/2002 Pettigrew ...................... 382/162
6,956,576 B1 * 10/2005 Deering et al. ................ 345/475
(Continued)

FOREIGN PATENT DOCUMENTS

| JP | 2000-188680 | 7/2000 |
|---|---|---|
| JP | 2005-130443 | 5/2005 |

(Continued)

OTHER PUBLICATIONS

Numata, M., "Method for detecting defect in image," Machine-translated Japanese Patent Publication 2008-139074, published Jun. 19, 2008.*

(Continued)

*Primary Examiner* — Vikkram Bali
*Assistant Examiner* — Xuemei Chen
(74) *Attorney, Agent, or Firm* — Young & Thompson

(57) ABSTRACT

An image processing system produces highly accurate determination of a local area that does not conform to an assumed change. Positional displacement amount calculation element 91 calculates a positional displacement amount between a target image and a reference image. Pixel operation element 95 relates a pixel in the target image to a pixel in the reference image by specifying the pixel in the reference image nearest a position of the pixel in the target image when the target image is corrected so as to resolve the positional displacement, calculates a relative pixel differential vector which is a differential vector of respective vectors of the relative pixels, and determines whether or not the pixel in the target image is a pixel of the local area, based on the relative pixel differential vector and an ellipsoid in a predetermined space, the ellipsoid relating to the pixel in the reference image.

17 Claims, 20 Drawing Sheets

(56) References Cited

U.S. PATENT DOCUMENTS

| | | | | |
|---|---|---|---|---|
| 7,366,350 | B2* | 4/2008 | Kajihara | 382/167 |
| 7,379,204 | B2* | 5/2008 | Fukao | 358/1.9 |
| 7,450,750 | B2* | 11/2008 | Park | 382/162 |
| 7,483,051 | B2* | 1/2009 | Aiso | 348/207.2 |
| 7,672,538 | B2* | 3/2010 | Aiso | 382/284 |
| 7,702,184 | B2* | 4/2010 | Aiso | 382/299 |
| 7,738,731 | B2* | 6/2010 | Aiso | 382/284 |
| 2002/0176604 | A1* | 11/2002 | Shekhar et al. | 382/104 |
| 2005/0157949 | A1* | 7/2005 | Aiso et al. | 382/299 |
| 2005/0163402 | A1 | 7/2005 | Aiso | |
| 2005/0281536 | A1* | 12/2005 | Aiso et al. | 386/69 |
| 2006/0012830 | A1* | 1/2006 | Aiso | 358/3.27 |
| 2008/0020341 | A1* | 1/2008 | Krumbholz | 433/26 |
| 2010/0158369 | A1* | 6/2010 | Kondo | 382/167 |
| 2010/0177959 | A1* | 7/2010 | Withum et al. | 382/163 |

FOREIGN PATENT DOCUMENTS

| | | |
|---|---|---|
| JP | 2007-226656 | 9/2007 |
| JP | 2008-139074 | 6/2008 |
| JP | 2009-140393 | 6/2009 |
| JP | 2009-217658 | 9/2009 |

OTHER PUBLICATIONS

International Search Report—PCT/JP2010-001109—Mar. 30, 2010.
Zoran A Ivanovski et al.—Robust super-resolution based on pixel-level selectivity—Proc. SPIE, vol. 6077, 607707, 2006.
Sung Cheol Park et al.—Super-resolution image reconstruction: a technical overview—Signal Processing Magazine, IEEE, vol. 20, Issue 3, May 2003, p. 21 to 36.

* cited by examiner

SPECIFICATION OF AN AREA WHERE A RELATIONSHIP OF PIXELS BETWEEN IMAGES BECOMES INAPPROPRIATE

TECHNICAL FIELD

The present invention relates to an image processing system, an image processing method, and an image processing program, and in particular relates to an image processing system, an image processing method, and an image processing program for specifying an area where a relationship of pixels between images calculated based on an assumed geometric deformation model becomes inappropriate due to local motion of a subject.

BACKGROUND ART

An example of a method of generating a high-resolution image using images of a plurality of frames is a multiple-frame degradation inverse transformation method (for example, see Patent Literature (PTL) 1). Generally, in the case of capturing an image of a subject over a plurality of frames with a camera, a position or a posture of the camera slightly changes from frame to frame. This causes a subpixel-level displacement of a sampling position of the subject between different images. The subpixel-level displacement mentioned here means, for instance, a displacement expressed with accuracy smaller than one pixel. Due to such a slight displacement, a pixel of the same part of the subject differs in pixel value between images. In the multiple-frame degradation inverse transformation method, the positional displacement of the subject is estimated with high accuracy that is smaller than a pixel spacing, thereby generating a high-resolution image from pixel values of a plurality of images captured for the same part of the subject.

This method includes a positional displacement amount estimation process of estimating the positional displacement of the subject with high accuracy, and a high-quality image generation process of generating a high-quality image based on the obtained positional displacement amount. These processes are described in more detail below. FIG. 20 shows an example of an image that is subject to the positional displacement amount estimation. An image 101 shown in FIG. 20(a) is a reference image which serves as a reference among a plurality of input images, whereas an image 102 shown in FIG. 20(b) is an input image other than the reference image. A building 103 and a house 104 in the reference image 101 and a building 105 and a house 106 in the other image 102 are the same subjects. A position or a posture of a camera when capturing the image 102 is different from that when capturing the reference image 101. This causes a displacement in position of a pixel representing the same part between the images 101 and 102. In the case of estimating such a positional displacement of a pixel between a plurality of images, a geometric deformation model is assumed beforehand, and a positional displacement amount is calculated for each pixel based on the deformation model. After estimating the positional displacement amount of each pixel between the plurality of input images, a pixel value of a high-resolution image is obtained from the plurality of input images based on the estimated positional displacement amount. For example, a ML (Maximum Likelihood) method, a MAP (Maximum A Posteriori) method, and the like are known as such techniques (see Non Patent Literature (NPL) 1).

In the case where a moving object is included in the subject, the moving object moves differently from a change indicated by the assumed deformation model. This causes an incorrect estimated positional displacement amount of a pixel. To generate a high-resolution image from images including such a subject, the pixel with the incorrect estimated positional displacement amount is detected, and the ML method or the MAP method is applied using pixels other than the detected pixel. A method of detecting the pixel with the incorrect estimated positional displacement amount is described in NPL 2. In the method described in NPL 2, the pixel with the incorrect positional displacement amount is detected based on a pixel difference between images.

Moreover, a method of generating a high-resolution image in consideration of a motion part in an image is described in PTL 2. In the method described in PTL 2, a maximum value and a minimum value of luminance values are calculated between an object pixel that is subject to motion determination in a target image other than a reference frame and pixels in the reference frame which surround the object pixel. The maximum value is denoted by Vmax, and the minimum value is denoted by Vmin. A luminance value of the object pixel is denoted by Vtest. A threshold is denoted by ΔVth. In the case where the following two expressions are satisfied, the object pixel is determined to have no motion. Otherwise, the object pixel is determined to have motion.

$Vtest > Vmin - \Delta Vth$ $Vtest < Vmax + \Delta Vth$

CITATION LIST

Patent Literature

PTL 1: Japanese Patent Application Laid-Open No. 2000-188680 (pages 3 to 7)
PTL 2: Japanese Patent Application Laid-Open No. 2005-130443 (paragraphs 0091, 0110, 0112)

Non Patent Literature

NPL 1: Sung Cheol Park, Min Kyu Park, Moon Gi Kang, "Super-resolution image reconstruction: a technical overview", Signal Processing Magazine, IEEE, Volume 20, Issue 3, May 2003, p. 21 to 36
NPL 2: Zoran A. Ivanovski, Ljupcho Panovski, Lina J. Karam, "Robust super-resolution based on pixel-level selectivity", Proc. SPIE, Vol. 6077, 607707, 2006

SUMMARY OF INVENTION

Technical Problem

In the case where a moving object is present as a subject, if motion of the moving object is not taken into consideration, a positional displacement amount of each pixel cannot be estimated with high accuracy. This makes it impossible to obtain a high-resolution image from a plurality of input images. FIG. 21 shows an image in the case where not only the building and the house shown in FIG. 20 but also the moon is captured as a subject. FIG. 21(a) shows a reference image 201, whereas FIG. 21(b) shows another image 202. The same subjects as those in FIG. 20 are given the same reference signs as in FIG. 20. The building 103 and the house 104 in the reference image 201 are uniformly deformed as the building 105 and the house 106 in the other image 202. On the other hand, a positional displacement caused by motion of the moon itself occurs between a moon 207 in the reference image 201 and a moon 208 in the other image 202, so that the deformation of the moon part does not conform to the deformation indicated by the geometric deformation model assumed beforehand, i.e., the uniform deformation of the entire image in this example. Since an estimated positional displacement amount of this part is incorrect, it is impossible to obtain a high-quality image.

The techniques described in NPL 2 and PTL 2 specify such an area with an incorrect estimated positional displacement amount. By generating a high-quality image while excluding this area, the image quality can be improved than in the case where the motion of the moving object is not taken into consideration.

However, in a method that uses a simple pixel difference between corresponding images as in the method described in NPL 2, if there is a large pixel value variance between adjacent pixels, an area that is actually suitable for use in the high-quality image generation process tends to be determined as an area unsuitable for the high-quality image generation process. Thus, there is a problem that excluding even such an area leads to a reduction in image quality improvement effect in an area with a large pixel value variance.

This problem is described in more detail below. Typically, due to a slight change in position or posture of a camera, a pixel representing the same part of a subject differs in pixel value between images. This tendency is particularly noticeable in an area with a large pixel value variance between adjacent pixels. Accordingly, in the case of performing unsuitable area determination based on a simple pixel value difference of corresponding pixels between a plurality of images, even if the pixels represent the same part, that area is determined as an unsuitable area. FIG. 22 shows an example of a large pixel value variance of corresponding pixels. FIG. 22(a) shows a subject 301 composed of a black area and a white area. Suppose images 302 and 303 are obtained as a result of capturing an image of this subject with different camera positions or postures, where a positional displacement equivalent to 0.5 pixel occurs between the images 302 and 303. A top right pixel 304 in the image 302 is black. Meanwhile, a top right pixel 305 in the image 303 is gray which is an intermediate color between black and white, because of the displacement from the image 302 by 0.5 pixel. Though the pixels 304 and 305 are both pixels representing the same part of the image 301, the pixel 304 is black whilst the pixel 305 is gray, with there being a large pixel value difference between the pixels 304 and 305. As a result, an area such as the pixels 304 and 305 that actually represent the same part tends to be determined as an area unsuitable for the high-quality imaging process, and excluded from the high-quality imaging process.

In the method described in PTL 2, too, there is a possibility that a pixel which should be determined as suitable for the high-quality imaging process is determined as an unsuitable pixel. FIG. 23 is an explanatory diagram showing an example of such a situation. Pixel coordinates are represented in one dimension in FIG. 23, for simplicity's sake. In FIG. 23, a horizontal axis is a pixel coordinate axis, and a vertical axis represents a pixel luminance value. A circle designates a pixel in the reference image, and a square designates a pixel in the other image. It is supposed here that a pixel 150 is the object pixel, and pixels 160 to 162 are pixels surrounding the pixel 150. FIG. 23(b) shows an area determined to be not a motion image. As shown in FIG. 23(b), when a luminance value of the pixel 162 is Vmin and a luminance value of the pixel 160 is Vmax, the object pixel is determined as a pixel of an unsuitable area if a luminance value of the object pixel is not included in a range of (Vmin−ΔVth) to (Vmax+ΔVth).

Hence, the object pixel 150 shown in FIG. 23 is determined as a pixel of an unsuitable area. However, the luminance value of the object pixel 150 is close to that of the pixel 160, and so the pixel 150 can be considered as a pixel suitable for the high-quality imaging process. In the method described in PTL 2, even such a pixel 150 is determined as a pixel unsuitable for the high-quality imaging process.

The above describes the case of generating a high-quality image from a plurality of input images, as an example. In other cases, too, there may be a need to specify a local area that does not conform to a change indicated by an assumed geometric deformation model.

In view of this, an exemplary object of the present invention is to provide an image processing system, an image processing method, and an image processing program capable of highly accurate determination of a local area that does not conform to an assumed change.

Solution to Problem

An image processing system according to the present invention includes: positional displacement amount calculation means for calculating a positional displacement amount in a positional displacement between a target image and a reference image, the target image being an image that is subject to determination of whether or not a local area that does not conform to an assumed change with respect to the reference image is present; and pixel operation means for relating a pixel in the target image to a pixel in the reference image by specifying the pixel in the reference image nearest a position of the pixel in the target image when the target image is corrected so as to resolve the positional displacement, calculating a relative pixel differential vector which is a differential vector of respective vectors of the relative pixels, and determining whether or not the pixel in the target image is a pixel of the local area, based on the relative pixel differential vector and an ellipsoid in a predetermined space, the ellipsoid relating to the pixel in the reference image.

An image processing method according to the present invention includes: calculating a positional displacement amount in a positional displacement between a target image and a reference image, the target image being an image that is subject to determination of whether or not a local area that does not conform to an assumed change with respect to the reference image is present; and relating a pixel in the target image to a pixel in the reference image by specifying the pixel in the reference image nearest a position of the pixel in the target image when the target image is corrected so as to resolve the positional displacement, calculating a relative pixel differential vector which is a differential vector of respective vectors of the relative pixels, and determining whether or not the pixel in the target image is a pixel of the local area, based on the relative pixel differential vector and an ellipsoid in a predetermined space, the ellipsoid relating to the pixel in the reference image.

An image processing program according to the present invention causes a computer to execute: a positional displacement amount calculation process of calculating a positional displacement amount in a positional displacement between a target image and a reference image, the target image being an image that is subject to determination of whether or not a local area that does not conform to an assumed change with respect to the reference image is present; and a pixel operation process of relating a pixel in the target image to a pixel in the reference image by specifying the pixel in the reference image nearest a position of the pixel in the target image when the target image is corrected so as to resolve the positional displacement, calculating a relative pixel differential vector which is a differential vector of respective vectors of the relative pixels, and determining whether or not the pixel in the target image is a pixel of the local area, based on the corresponding pixel differential vector and an ellipsoid in a predetermined space, the ellipsoid relating to the pixel in the reference image.

Advantageous Effects of Invention

According to the present invention, a local area that does not conform to an assumed change can be determined with high accuracy.

DESCRIPTION OF EMBODIMENTS

Exemplary embodiments of the present invention are described below, with reference to drawings. The following describes, as an example, the case where a plurality of color images are input and a local area that does not conform to a change indicated by an assumed geometric deformation model is specified in the color images.

Exemplary Embodiment 1

Figure 1:
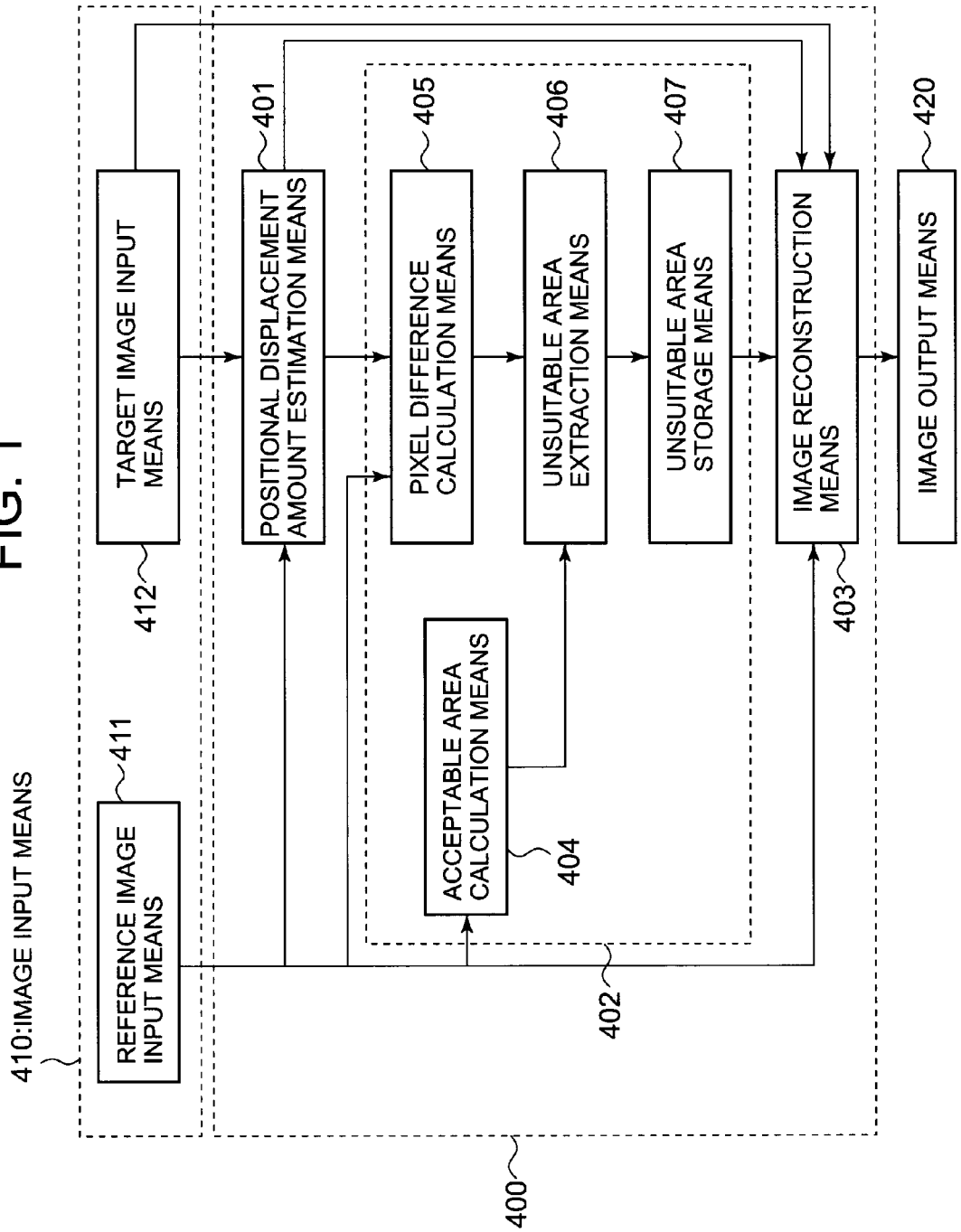
FIG. 1 is a block diagram showing an example of an image processing system in Exemplary Embodiment 1 of the present invention.

FIG. 1 is a block diagram showing an example of an image processing system in Exemplary Embodiment 1 of the present invention. The image processing system in this exemplary embodiment includes a computer (CPU, processor, data processor) 400 that operates under program control, image input means 410, and image output means 420. The computer 400 includes positional displacement amount estimation means 401, unsuitable area determination means 402, and image reconstruction means 403. The unsuitable area determination means 402 includes acceptable area calculation means 404, pixel difference calculation means 405, unsuitable area extraction means 406, and unsuitable area storage means 407.

The image input means 410 includes reference image input means 411 and target image input means 412. Let K be the number of images input to the image input means 410. An image number k (k=1, ..., K) is assigned to each image, thereby distinguishing each image by its image number. Each input image has the same number of pixels. In the case where each pixel in one image is identified by a pixel number i, a vector whose element is a pixel value of a pixel i in an image of an image number k is denoted by $x_{ki}$. For example, in the case where an image is represented by a YUV signal, the vector $x_{ki}$ whose element is the pixel value of the pixel i in the image of the image number k is expressed as a three-dimensional vector $x_{ki}=(Y_{ki}, U_{ki}, V_{ki})^t$. $Y_{ki}$ is a Y signal (luminance) of the i-th pixel, and $U_{ki}$ and $V_{ki}$ are a U signal and a V signal (chrominance signal) of the i-th pixel. Meanwhile, t denotes a transposed matrix.

Though the case where the image is represented by a YUV signal is described as an example here, the image may be represented in other formats. For instance, the image may be represented in an RGB format. In this case, $x_{ki}$ is a three-dimensional vector whose elements are R, G, and B components. The number of dimensions of the vector $x_{ki}$ is not limited to three. For example, in the case where the image is represented in a gray scale, the vector $x_{ki}$ is a one-dimensional vector. In the case where the image is a multispectral image or a hyperspectral image, the vector $x_{ki}$ is a multidimensional vector of a larger number of dimensions than three. Suppose each individual pixel in the input image is represented by r signals. Then, a color space is an r-dimensional space, and the vector $x_{ki}$ is an r-dimensional vector. The following describes the case where the image is represented in the YUV format, as an example.

The following describes each means shown in FIG. 1.

Here, an image that serves as a reference in positional displacement amount estimation calculation is referred to as a reference image, and an image that is subject to calculation of how much a pixel is displaced from the reference image is referred to as a target image. Among the K images input to the image input means 410, one image is the reference image and each of the remaining images is the target image. Any of the K input images may be set as the reference image. This exemplary embodiment describes an example where the first image (image where k=1) is set as the reference image.

The reference image input means 411 receives an input of the reference image that serves as the reference in positional displacement amount estimation calculation, and stores the reference image. The target image input means 412 receives an input of the target image, and stores the target image.

The positional displacement amount estimation means 401 calculates, based on a pixel value in the reference image input to the reference image input means 411 and a pixel value in the target image input to the target image input means 412, their relative positional displacement amount with subpixel accuracy (accuracy smaller than one pixel), and stores the positional displacement amount. The positional displacement mentioned here is a positional displacement induced by a change indicated by an assumed geometric deformation model. The positional displacement amount estimation means 401 may also specify a transformation method indicating to which position a pixel in the reference image should be changed to obtain the target image.

The change of the target image with respect to the reference image is indicated by a uniform geometric deformation model such as translation or rotation, a non-uniform geometric deformation model expressed by an interpolation function such as a B-spline function, or a combination of these geometric deformation models. That is, the change indicated by the assumed geometric deformation model has types including a uniform change of the entire image and a non-uniform change of the entire image. The positional displacement amount estimation means 401 may store parameters indicating an image transformation method and a change amount for each of these types of change beforehand, and estimate the positional displacement amount using the stored information. For example, the positional displacement amount estimation means 401 may transform the reference image by each transformation method, calculate a difference between a pixel value in the transformed image and a pixel value in the target image for each pixel, find a total sum of the calculated differences, and specify a transformation method and a change amount that correspond to a minimum total sum to thereby determine the positional displacement amount.

Alternatively, the geometric deformation model (type of transformation method for the reference image) may be predetermined, where the positional displacement amount estimation means 401 estimates a transformation amount (i.e. a change amount of the positional displacement) in the deformation model. For example, supposing that the positional displacement between the reference image and the target image based on a difference in camera position can be indicated by a predetermined transformation method such as translation, the positional displacement amount estimation means 401 may estimate the change amount of the positional displacement (e.g. the amount of translation). In this case, the positional displacement amount estimation means 401 may calculate, for example through the use of a gradient method or the like, such a change amount that corresponds to a minimum square sum of differences between pixel values of pixels in the transformed reference image and pixel values of pixels in the target image, and specify a parameter indicating the change amount to thereby determine the positional displacement amount. A method of specifying the positional displacement amount in this way is described in Reference Document 1 below.

[Reference Document 1] Bruce D. Lucas, Takeo Kanade, "An Iterative Registration Technique with an Application to Stereo Vision", Proceedings of Imaging Understanding Workshop, 1981, pp. 121 to 130

The following describes the case where the geometric deformation model is predetermined and the positional displacement amount estimation means 401 estimates the change amount in the deformation model, as an example. That is, the case where the method of transformation from the reference image to the target image is known beforehand and the estimation relating to the change amount is performed is described as an example below.

The positional displacement amount estimation means 401 estimates the positional displacement amount from the reference image, for each individual target image.

The unsuitable area determination means 402 specifies, for each target image, an area unsuitable for a high-quality image generation process using the pixel value in the reference image stored in the reference image input means 411 and the inter-image positional displacement amount obtained by the positional displacement amount estimation means 401, and stores the specified area.

The acceptable area calculation means 404 calculates an acceptable area using the pixel value in the reference image input to the reference image input means 411, and stores the calculated acceptable area. The acceptable area is an area in a color space for determining whether or not a pixel in the target image is a pixel of an area that conforms to the change indicated by the assumed geometric deformation model. In this exemplary embodiment, the geometric deformation model is assumed beforehand, as mentioned above. The acceptable area is determined for each individual pixel in the reference image. Suppose the target image is corrected so as to resolve the positional displacement from the reference image, and a pixel in the reference image nearest a pixel in the corrected target image is specified to relating the pixel in the target image to the pixel in the reference image. This being the case, if a position in the color space indicated by a pixel value of the pixel in the target image relative to the pixel in the reference image is included in an acceptable area of the pixel in the reference image, the pixel in the target image can be regarded as a pixel of an area that conforms to the change indicated by the geometric deformation model assumed beforehand (in other words, an area without a local change caused by motion of a fixed object and the like). The acceptable area calculation means 404 calculates such an acceptable area for each pixel in the reference image. Note that the above-mentioned target image correction (correction to resolve the positional displacement) is performed separately from the acceptable area calculation, and so the target image is not used in the acceptable area calculation.

Figure 2:
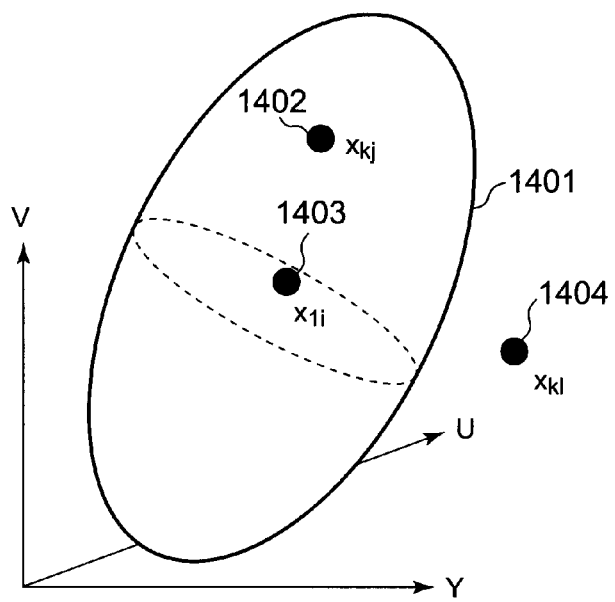
FIG. 2 is an explanatory diagram showing an example of an acceptable space.

FIG. 2 is an explanatory diagram showing an example of an acceptable space. In a color space shown in FIG. 2, a position 1403 ($x_{1,i}$) is a position in the color space indicated by a pixel value of a pixel in the reference image. An ellipsoid 1401 is an acceptable area calculated for this pixel in the reference image. A position 1402 ($x_{k,j}$) is a position in the color space indicated by a pixel in the target image. Since the position 1402 is in the acceptable area 1401, the pixel in the target image is determined as an area that conforms to the change indicated by the geometric deformation model assumed beforehand. When a position 1404 ($x_{k,l}$) shown in FIG. 2 is a position in the color space indicated by a pixel value of a pixel in the target image, on the other hand, the pixel in the target image is determined as not an area that conforms to the change indicated by the geometric deformation model assumed beforehand, because the position 1404 is outside the acceptable area 1401.

The acceptable area calculation means 404 selects the pixels in the reference image input to the reference image input means 411 one by one, and calculates the acceptable area for each pixel. Having selected the pixel, the acceptable area calculation means 404 calculates a maximum variance vector for the selected pixel. The acceptable area calculation means 404 then sets, as the acceptable area, an ellipsoid whose radius in a central axis direction (hereafter "central axis radius") is a magnitude of the maximum variance vector and whose central axis direction is the same direction as the maximum variance vector. Note that, though an n-dimensional ellipsoid in an n-dimensional color space has n principal axes, a radius of each of (n−1) axis directions other than the central axis is predetermined. The central axis is an axis having a longest principal axis direction radius, among the n principal axes of the n-dimensional ellipsoid. In the case where the magnitude of the maximum variance vector is smaller than the predetermined radii of the (n−1) axis directions, the acceptable area calculation means 404 sets a maximum length of the predetermined radii, as the central axis radius. For instance, in the case of calculating the three-dimensional ellipsoid shown as an example in FIG. 2, a minor-axis radius is predetermined, and the acceptable area calculation means 404 sets an area whose major-axis radius is the magnitude of the maximum variance vector, as the acceptable area. Here, if the magnitude of the maximum variance vector is smaller than the minor-axis radius, the acceptable area calculation means 404 sets an ellipsoid whose major-axis radius is the same as the minor-axis radius, as the acceptable area.

Figure 3A:
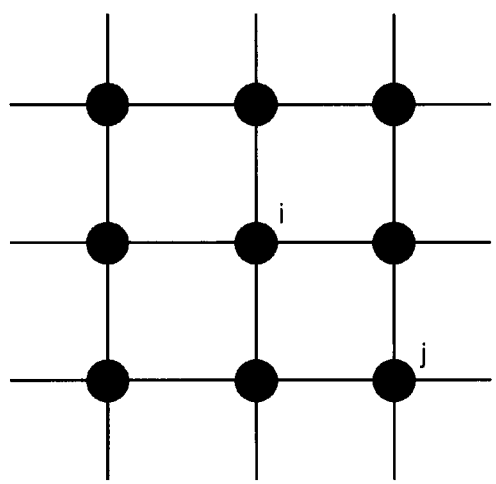
FIG. 3A and FIG. 3B are explanatory diagrams each showing a maximum variance vector.
Figure 3B:
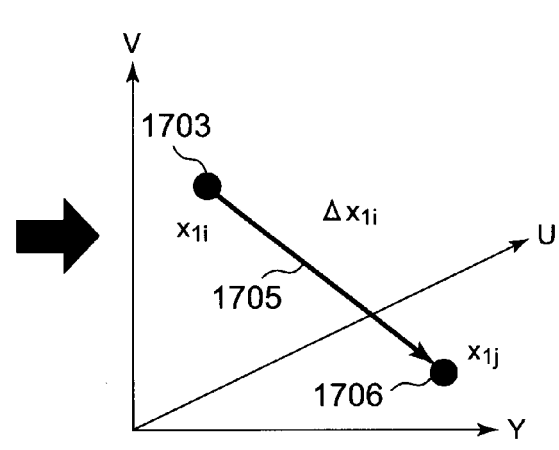

FIG. 3A and FIG. 3B are explanatory diagram showing a maximum variance vector. FIG. 3A shows a pixel i selected from the reference image, and surrounding pixels adjacent to the pixel i. As shown in FIG. 3A, there are eight pixels surrounding the selected pixel i. The acceptable area calculation means 404 calculates a differential vector between the selected pixel i and each of its surrounding pixels. As the differential vector, the acceptable area calculation means 404 calculates a vector obtained by subtracting a vector whose element is a pixel value of the pixel i from a vector whose element is a pixel value of the surrounding pixel of the pixel i. For example, when $x_{1i}$ and $x_{1j}$ respectively denote vectors of the pixels i and j shown in FIG. 3A, the acceptable area calculation means 404 calculates $x_{1j}-x_{1i}$, as the differential vector. Note that, in the color space, a direction from a position having the pixel value of the pixel i as a coordinate value to a position having the pixel value of the surrounding pixel of the pixel i as a coordinate value is referred to as a pixel value gradient. This being so, a direction of the differential vector mentioned above can be regarded as the pixel value gradient. In the case where there are eight surrounding pixels as shown in FIG. 3A, the acceptable area calculation means 404 calculates eight differential vectors. The acceptable area calculation means 404 specifies a differential vector having a largest magnitude out of the differential vectors. The specified vector is referred to as the maximum variance vector. A pixel forming the maximum variance vector among the surrounding pixels of the selected pixel is referred to as a maximum variance pixel.

The differential vector calculated by the acceptable area calculation means 404 is a differential vector between a pixel and its surrounding pixel in the reference image, and can be referred to as an adjacent pixel differential vector.

In the example shown in FIG. 3A, the pixel j is supposed to be the maximum variance pixel. Let a position 1703 be the position in the color space (a YUV space in this exemplary embodiment) indicated by the pixel value of the selected pixel (see FIG. 3B), and a position 1706 be the position in the color space indicated by the pixel value of the maximum variance pixel j (see FIG. 3B). This being so, a vector 1705 shown in FIG. 3B is the maximum variance vector. The maximum variance vector calculated for the pixel i in the reference image is denoted by $\Delta x_{1i}$.

The acceptable area calculation means 404 calculates a parameter indicating the ellipsoid whose center is the position in the color space indicated by the pixel value of the selected pixel i, whose central axis radius is the magnitude of the maximum variance vector $\Delta x_{1i}$, and whose central axis direction is the same direction as the maximum variance vector, and stores the calculated parameter. In the case of the three-dimensional ellipsoid shown as an example in FIG. 2, the major axis is the central axis.

The acceptable area calculation means 404 sets the ellipsoid as the acceptable area. This means to specify such an acceptable area that has an equal distance from the center, which is the position in the color space indicated by the pixel value of the selected pixel i, to each vertex of the acceptable area on the central axis. In other words, there is no imbalance in broadening of the ellipsoid from the center in the central axis direction. For instance, in the example shown in FIG. 3A, even when a pixel value other than the pixel j among the pixels surrounding the pixel i is a pixel value close to the pixel i, the acceptable area calculation means 404 does not set one major axis long and the other major axis short.

The direction of the maximum variance vector differs depending on the selected pixel. Besides, the magnitude of the maximum variance vector is larger when there is a larger pixel value variance between the pixel i and its surrounding pixel. Therefore, for each pixel in the reference image, the acceptable area calculation means 404 determines the acceptable range according to the direction and the magnitude of the maximum variance vector.

The above describes the case where the position in the color space indicated by the pixel value of the selected pixel i is set as the center of the ellipsoid and the central axis direction and the central axis radius of the ellipsoid are determined according to the maximum variance vector. However, the ellipsoid as the acceptable area may be determined by other methods. For instance, the acceptable area calculation means 404 may calculate a mean pixel value of the selected pixel i and its surrounding eight pixels. As an example, in the case where the pixels are in the YUV format, the acceptable area calculation means 404 may calculate a mean value of Y signals, a mean value of U signals, and a mean value of V signals of the selected pixel and its surrounding pixels, and then determine a position in the color space indicated by each of the mean values of the Y, U, and V signals, as the center position of the ellipsoid. The acceptable area calculation means 404 further calculates a covariance matrix, and specifies a direction of the first principal axis (central axis) and the first principal component scores using principal component analysis. The acceptable area calculation means 404 determines the ellipsoid (acceptable area) whose central axis radius is a largest one of the obtained first principal component scores.

Moreover, the following method may be employed as a method of determining the acceptable area using principal component analysis. In this method, the acceptable area calculation means 404 calculates the mean pixel value of the selected pixel i and its surrounding eight pixels, and sets the position in the color space indicated by each mean value as the center position of the ellipsoid, as in the above-mentioned case. The acceptable area calculation means 404 then calculates the covariance matrix, specifies the n-th principal axis and the n-th principal component scores using principal component analysis, and sets a direction of the n-th principal axis as a direction of the n-th axis of the ellipsoid. The acceptable area calculation means 404 further sets $t_n+L$ as a radius of the direction of the n-th axis, where $t_n$ is a largest one of the n-th principal component scores. In the case where a pixel value is N-dimensional, n=1, . . . , N. For instance, in the case of a YUV image, N=3, and n takes a value from 1 to 3. L is a predetermined constant for determining the radius.

The pixel difference calculation means 405 corrects the target image so as to resolve the positional displacement estimated by the positional displacement amount estimation means 401. Since the positional displacement amount is already estimated by the positional displacement amount estimation means 401, the pixel difference calculation means 405 only needs to perform inverse transformation of transformation from the reference image to the target image so as to eliminate the positional displacement amount, and obtain a pixel position in the target image when the positional displacement is resolved. The pixel difference calculation means 405 then specifies a pixel in the reference image relative to a pixel in the corrected target image, and calculates a differential vector of vectors indicated by pixel values of the relative pixels (i.e. vectors whose elements are the pixel values).

The differential vector calculated by the pixel difference calculation means 405 is a differential vector of the relative vectors of the reference image and the target image, and can be referred to as a relative pixel differential vector.

Figure 4:
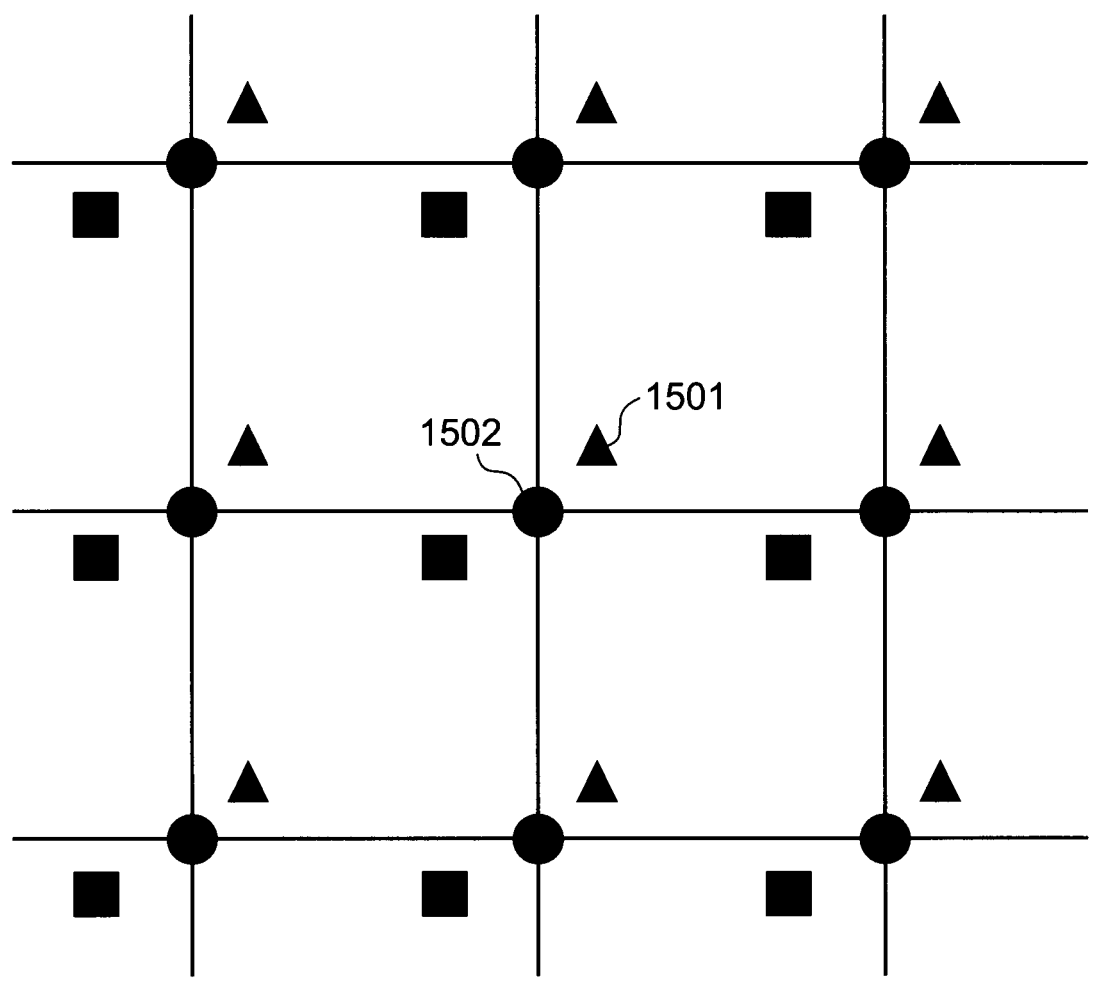
FIG. 4 is an explanatory diagram showing pixels in a corrected target image and pixels in a reference image.

The positional displacement amount is estimated by the positional displacement amount estimation means 401 with subpixel accuracy. Accordingly, when the pixel difference calculation means 405 corrects the target image so as to resolve the positional displacement, a pixel in the corrected target image does not always match a pixel in the reference image. FIG. 4 is an explanatory diagram showing pixels in the corrected target image and pixels in the reference image. A two-dimensional plane indicating at which position each pixel is present in the relative image is shown in FIG. 4. Each pixel designated by a circle is a pixel in the reference image. Each pixel designated by a triangle is a pixel in the corrected target image. Likewise, each pixel designated by a square is a pixel in another corrected target image. Since each target image is corrected so as to resolve the positional displacement estimated with subpixel accuracy, a pixel in each target image does not necessarily match a pixel in the reference image, as shown in FIG. 4. The pixel difference calculation means 405 specifies a pixel in the reference image nearest a position of a pixel in the corrected target image (a position in the image), to relate the two pixels. This defines a relationship between the pixel in the target image and the pixel in the reference image. The pixel difference calculation means 405 then calculates a differential vector of vectors (vectors in the color space) whose elements are respectively pixel values of the relative pixels. For example, the pixel difference calculation means 405 specifies a pixel 1502 in the reference image nearest a pixel 1501 in the target image shown in FIG. 4, to relate the pixel 1501 to the pixel 1502. The pixel difference calculation means 405 then calculates a differential vector by subtracting a vector whose element is a pixel value of the pixel 1502 from a vector whose element is a pixel value of the pixel 1501. The pixel difference calculation means 405 calculates the differential vector for each pixel in each target image.

Note that, instead of directly calculating the differential vector, the pixel difference calculation means 405 may obtain the pixel value at the pixel position in the target image by interpolation from the pixel in the reference image, and calculate the differential vector of the vector whose element is the pixel value obtained by interpolation and the vector indicated by the pixel value of the pixel in the reference image. For example, the pixel difference calculation means 405 may calculate the pixel value of the pixel 1501 shown in FIG. 4 by bilinear interpolation or bicubic interpolation through the use of the pixel value in the reference image, and calculate the differential vector of the vector whose element is the calculated pixel value and the vector whose element is the pixel value of the pixel 1502.

The unsuitable area extraction means 406 determines, for each pixel in the target image, whether or not the pixel is a pixel of an area that does not conform to the change indicated by the geometric deformation model assumed beforehand, using the acceptable area obtained by the pixel difference calculation means 405. In more detail, through the use of the acceptable area calculated for the pixel in the reference image relative to the pixel in the target image and the differential vector calculated for the two pixels, the unsuitable area extraction means 406 determines whether or not the position in the color space indicated by the pixel value of the pixel in the target image is outside the acceptable area. If the position in the color space indicated by the pixel value of the pixel in the target image is outside the acceptable area, the unsuitable area extraction means 406 determines that the pixel in the target image is a pixel of an area that does not conform to the change indicated by the geometric deformation model assumed beforehand. If the position in the color space indicated by the pixel value of the pixel in the target image is inside or at the boundary of the acceptable area, on the other hand, the unsuitable area extraction means 406 determines that the pixel in the target image is a pixel of an area that conforms to the change indicated by the geometric deformation model assumed beforehand.

An area that does not conform to the change indicated by the geometric deformation model assumed beforehand is an area unsuitable for high-quality image generation. Such an area is simply referred to as an unsuitable area. Meanwhile, an area that conforms to the change indicated by the geometric deformation model assumed beforehand is an area suitable for high-quality image generation. Such an area is simply referred to as a suitable area.

The unsuitable area storage means 407 stores a pixel number of the pixel of the unsuitable area calculated by the unsuitable area extraction means 406. This pixel number is a pixel number for identifying the pixel in the image, and may be set beforehand for each pixel. The unsuitable area extraction means 406 may store, when determining the pixel as the pixel of the unsuitable area, the pixel number of the pixel in the unsuitable area storage means 407. Alternatively, information for specifying the pixel of the unsuitable area may be stored in a form other than the pixel number. Moreover, instead of storing the pixel number, the unsuitable area extraction means 406 may calculate, for each pixel in the target image, a reliability level of whether or not the pixel in the target image is the suitable area to be used by the image reconstruction means 403 based on the calculation result of whether or not the pixel in the target image corresponds to the unsuitable area, and store the reliability level in the unsuitable area storage means 407.

The image reconstruction means 403 reconstructs a high-resolution image, based on the estimated positional displacement amount calculated by the positional displacement estimation means 401, the pixel number of the unsuitable area stored in the unsuitable area storage means 407, and the pixel values of the plurality of images stored in the image input means 410. This high-resolution image is referred to as a reconstructed image. The image reconstruction means 403 is described in more detail below. Let $I_k$ be a column vector in which only the luminance values (Y signals in the YUV format) out of the pixel values of the k-th input image (k is an integer from 1 to K) among the K input images are arranged in predetermined order. When the number of pixels in each input image is denoted by N, $I_k$ is an N-dimensional vector expressed as $(Y_{k1}, Y_{k2}, \ldots, Y_{ki}, \ldots, Y_{kN})^t$.

Moreover, let a vector T be a column vector in which only the luminance values (Y signals in the YUV format) of the reconstructed image obtained by the image reconstruction means 403 are arranged in the predetermined order. The reconstructed image is an image of a higher resolution (i.e. an image having a larger number of pixels) than the input image. The number of pixels in the reconstructed image is denoted by M, where M>N. The vector T is an M-dimensional vector.

The order in which the luminance values are arranged in $I_k$ and T may be, for example, raster scan order, or may be order other than the raster scan order.

The image reconstruction means 403 calculates the luminance value (Y signal) of each pixel in the reconstructed image, by finding such a vector T that minimizes an evaluation function E[T] given by the following Expression (1).

[Math. 1]

$$E[T] = \sum_{k=1}^{K} \|S_k(DBM_kT - I_k)\|^2 + \alpha \|QT\|^2 \qquad \text{Expression (1)}$$

In Expression (1), D, B, and Q are predetermined matrices. D and B are respectively matrices representing low-pass filters for downsampling and camera blur. Q is a matrix representing a high-pass filter. $M_k$ is a matrix representing a geometric deformation for the reconstructed image. In detail, $M_k$ is a matrix representing transformation for applying a geometric deformation (e.g. translation or rotation) of the target image with respect to the reference image, to the reconstructed image. The image reconstruction means 403 can determine such a matrix $M_k$ that induces the positional displacement amount estimated by the positional displacement amount estimation means 401, in the reconstructed image. Note that $M_k$ itself does not involve image enlargement or reduction, and image reduction by reducing the number of pixels of the reconstructed image to the number of pixels of the input image is represented by the matrix D. Hence, the combination of D and $M_k$ defines a relationship between the pixel value (the luminance value in this exemplary embodiment) in the target image and the pixel value in the reconstructed image.

A matrix $S_k$ in Expression (1) is a diagonal matrix. The image reconstruction means 403 determines diagonal components of $S_k$ as follows. In the case where the i-th pixel in the input image corresponds to an unsuitable area, the image reconstruction means 403 sets the i-th diagonal component of $S_k$ to 0. In the case where the i-th pixel in the input image corresponds to a suitable area, the image reconstruction means 403 sets the i-th diagonal component of $S_k$ to 1. For example, whether the i-th pixel in the input image corresponds to a suitable area or an unsuitable area may be determined based on whether or not the pixel number of the i-th pixel is stored in the unsuitable area storage means 407. In the case where k indicates the reference image (i.e. k=1), however, the image reconstruction means 403 sets all diagonal components of $S_k$ to 1, because the determination of whether the pixel corresponds to a suitable area or an unsuitable area is not performed for the pixel in the reference image.

The first term in the right-hand side of Expression (1) is called an error term, and intended to minimize a difference between a value generated when applying positional displacement correction, camera blur, and downsampling to the luminance value (the vector T) of the reconstructed image and the actual luminance value (the vector $I_k$) of the k-th image. The second term in the right-hand side of Expression (1) is called a regularization term, and intended to prevent numerically unstable calculation. $\alpha$ is a weight indicating a strength of the regularization term.

For instance, the image reconstruction means 403 may employ a conjugate gradient method or a Gauss-Newton method, as an optimization technique of minimizing the evaluation function E[T] in Expression (1). The image reconstruction means 403 may perform calculation using the conjugate gradient method or the Gauss-Newton method until E[T] sufficiently converges to a minimum value, thereby finding the vector T (i.e. each Y signal of the reconstructed image).

For the chrominance components of the reconstructed image, that is, the U and V signals of each pixel in the reconstructed image, the image reconstruction means 403 may perform the following calculation. The image reconstruction means 403 enlarges the reference image among the input images by performing bilinear interpolation or bicubic interpolation, and sets the U and V signals of each pixel in the enlarged image as the U and V signals of each pixel in the reconstructed image.

Though the above describes an example where the reference image is enlarged, the image reconstruction means 403 may instead enlarge one arbitrary target image. In this case, the image reconstruction means 403 enlarges the target image by performing bilinear interpolation or bicubic interpolation. The image reconstruction means 403 then extracts only the U signals from the enlarged image, generates a column vector in which the U signals are arranged in the predetermined order (e.g. raster scan order), multiplies the above-mentioned transformation matrix $M_k$ by the column vector, and sets the value of each element included in the resulting vector as the U signal of each pixel in the reconstructed image. In the same manner, the image reconstruction means 403 extracts only the V signals from the enlarged image, generates a column vector in which the V signals are arranged in the predetermined order, multiplies the above-mentioned transformation matrix $M_k$ by the column vector, and sets the value of each element included in the resulting vector as the V signal of each pixel in the reconstructed image.

Though the above describes the case where the U and V signals of the reconstructed image are set based on the enlarged image obtained by interpolating the reference image or the target image, the U and V signals may be calculated in the same way as the luminance value (Y signal). That is, the U signal of each pixel in the reconstructed image may be calculated by setting $I_k$ as a vector in which only the U signals of the pixel values in the k-th input image (k is an integer from 1 to K) are arranged in the predetermined order, setting the vector T as a column vector in which only the U signals in the reconstructed image are arranged in the predetermined order, and finding such a vector T that minimizes the evaluation function E[T]. The same applies to the V signal of each pixel in the reconstructed image.

Though the above describes an example where the input image is represented in the YUV format, the pixel value of each individual pixel in the reconstructed image may be determined by the same calculation even in the case where the input image is represented in other formats (such as a multi-spectral image and a hyperspectral image).

The image output means 420 outputs (e.g. displays) the reconstructed image generated by the image reconstruction means 403. For example, the image output means 420 is realized by a display device.

The positional displacement amount estimation means 401, the acceptable area calculation means 404, the pixel difference calculation means 405, the unsuitable area extraction means 406, and the image reconstruction means 403 are realized, for example, by a CPU of a computer operating according to an image processing program. That is, the CPU may read the image processing program stored in program storage means (not shown), and operate as the positional displacement amount estimation means 401, the acceptable area calculation means 404, the pixel difference calculation means 405, the unsuitable area extraction means 406, and the image reconstruction means 403 according to the program. Alternatively, each of the means may be realized by a dedicated circuit.

Figure 5:
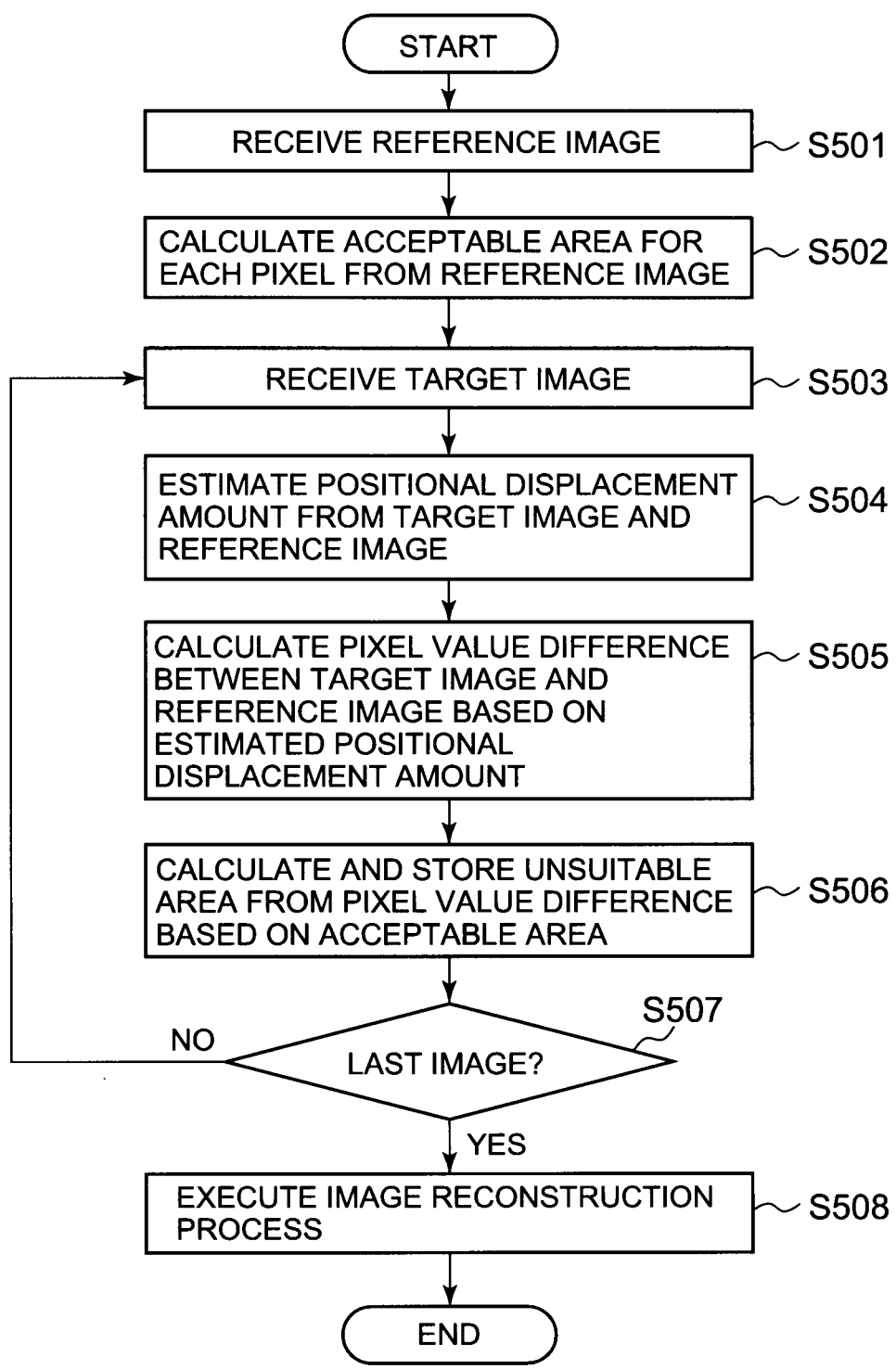
FIG. 5 is an explanatory diagram showing an example of processing in Exemplary Embodiment 1.

The following describes an operation. FIG. 5 is an explanatory diagram showing an example of processing in Exemplary Embodiment 1. First, when a reference image is input, the reference image input means 411 stores the reference image (step S501). Next, for each individual pixel in the reference image, the acceptable area calculation means 404 calculates a parameter indicating an acceptable area, and stores the parameter (step S502). For instance, the acceptable area calculation means 404 determines, as the acceptable area, an ellipsoid whose center is a position in the color space indicated by the pixel selected from the reference image, whose central axis direction is a direction of a maximum variance vector relating to the pixel, and whose central axis radius is a magnitude of the maximum variance vector, and stores the parameter indicating the acceptable area, as described earlier.

When a target image is input, the target image input means 412 stores the target image (step S503). In detail, when one target image is newly input and stored, the positional displacement amount estimation means 401 estimates a positional displacement amount of the target image from the reference image with subpixel accuracy, and stores the positional displacement amount (step S504).

Next, the pixel difference calculation means 405 corrects the target image so as to resolve the positional displacement estimated by the positional displacement amount estimation means 401, and relates a pixel in the corrected target image to a pixel in the reference image. The pixel difference calculation means 405 then calculates a differential vector of the relative pixel pair (step S505).

Next, for each pixel in the target image input in step S503, the unsuitable area extraction means 406 determines whether or not the pixel is an unsuitable area, using the differential vector calculated for the pixel and the acceptable area of the pixel in the reference image relative to the pixel. The unsuitable area extraction means 406 stores the pixel determined as the unsuitable area, in the unsuitable area storage means 407 (step S506). For example, a pixel number of the pixel is stored in the unsuitable area storage means 407.

In the case where the target image on which steps S504 to S506 are performed is not the last target image (step S507: NO), the processing from step S503 is repeated. For example, when the next target image is input to the target image input means 412, the target image input means 412 stores the target image (step S503), and steps S504 to S506 are performed on the target image. In the case where the target image on which steps S504 to S506 are performed is the last target image (e.g. in the case where there is no input of the next target image), the image reconstruction means 403 generates a composite image (high-resolution image), using the information of the unsuitable area stored in the unsuitable area storage means 407 and the reference image and each target image stored in the image input means 410 (step S508). The image reconstruction means 403 outputs the generated reconstructed image to the image output means 420. For example, the reconstructed image is displayed on the display device.

According to this exemplary embodiment, for each individual pixel in the reference image, the acceptable area according to the luminance values of the pixel and its surrounding pixels is set as the ellipsoid in the color space. By separately setting the acceptable area according to a variance in color of each individual pixel in the reference image in this way, it is possible to prevent a situation where an area with a large pixel value variance in an image tends to be determined as a local area (unsuitable area) that does not conform to the change indicated by the assumed geometric deformation model. As a result, a reduction in image quality improvement effect in reconstructed image generation can be suppressed.

Figure 23:
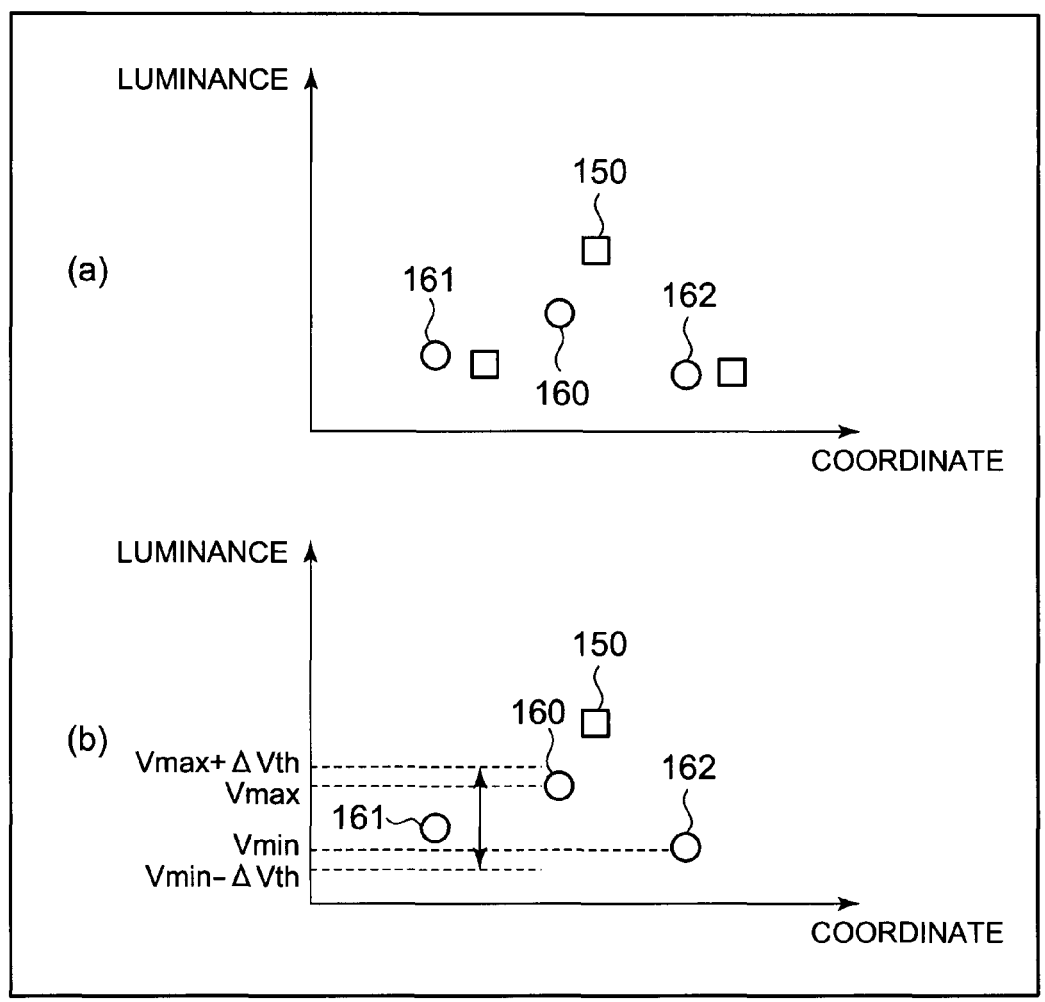
FIG. 23 is an explanatory diagram showing an example where a pixel that should be determined as a pixel suitable for a high-quality imaging process is determined as an unsuitable pixel.

Moreover, according to this exemplary embodiment, the ellipsoid whose center is the position in the color space indicated by the pixel value of the pixel in the reference image is set as the acceptable space. This enables more appropriate determination of whether or not the pixel in the target image is a local area that does not conform to the change indicated by the assumed geometric deformation model. For instance, in the example shown in FIG. 23(*b*), the object pixel 150 relative to the pixel 160 can be determined as an image of a suitable area.

Though this exemplary embodiment describes the case where the pixel value of the pixel itself is used as the element of the vector $x_{ki}$, the element of the vector $x_{ki}$ may be a value indicating a feature of the image, instead of the pixel value itself. An example of the value indicating the feature of the image is a value obtained by differentiating the pixel value of each pixel in an x direction or a y direction, which may be used as the element of the vector $x_{ki}$. As an alternative, such a feature value and the pixel value itself may both be included as the element of the vector $x_{ki}$. A space that allows such a vector to be represented may be set beforehand as the space for determining the ellipsoid as the acceptable area.

Though this exemplary embodiment describes the case where the acceptable area calculation means 404 calculates the acceptable area for the reference image, the acceptable area calculation means 404 may calculate the acceptable area for the target image so that the unsuitable area is determined using the acceptable area. In this case, the acceptable area calculation means 404 may calculate the acceptable area for each pixel in the target image, where the unsuitable area extraction means 406 determines the unsuitable area using the acceptable area calculated for each pixel in the target image and the differential vector calculated by the pixel difference calculation means 405. Note that the calculation of the acceptable area for each pixel in the target image is the same as the calculation of the acceptable area for each pixel in the reference image.

Alternatively, the acceptable area calculation means 404 may calculate the acceptable area for each pixel in the reference image and the target image so that the unsuitable area is determined using the acceptable area. Let Ra be the acceptable area calculated for each pixel in the reference image, and Rb be the acceptable area calculated for each pixel in the target image. The unsuitable area extraction means 406 may determine the pixel of interest as a pixel of an unsuitable area, if a result of determination using the acceptable area Ra and the differential vector calculated by the pixel difference calculation means 405 and a result of determination using the acceptable area Rb and the differential vector calculated by the pixel difference calculation means 405 both indicate that the pixel is a pixel of an unsuitable area. As an alternative, the unsuitable area extraction means 406 may determine the pixel of interest as a pixel of an unsuitable area, if at least one of the result of determination using the acceptable area Ra for the reference image and the result of determination using the acceptable area Rb for the target image indicates that the pixel is a pixel of an unsuitable area.

Exemplary Embodiment 2

Figure 6:
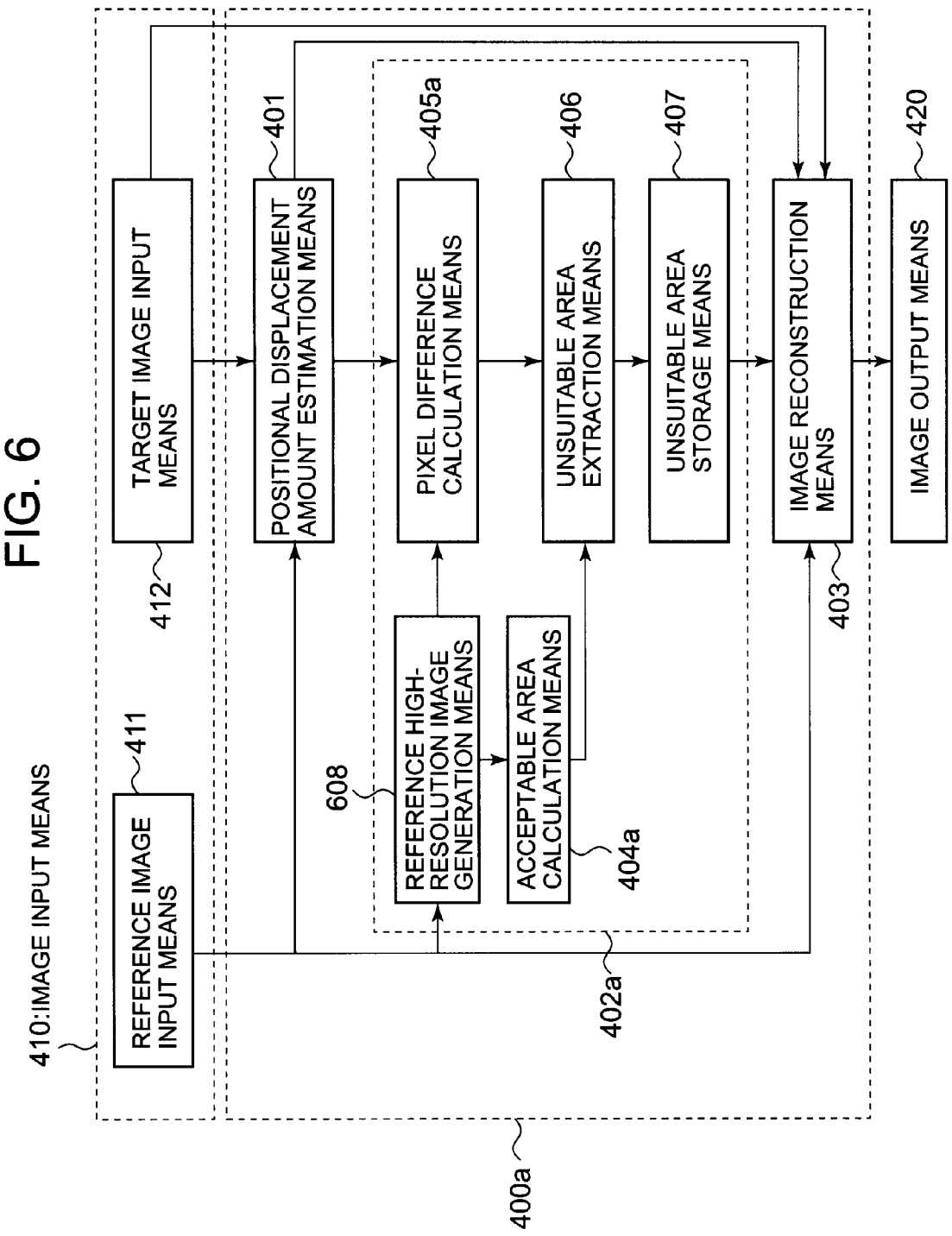
FIG. 6 is a block diagram showing an example of an image processing system in Exemplary Embodiment 2 of the present invention.

FIG. 6 is a block diagram showing an example of an image processing system in Exemplary Embodiment 2 of the present invention. The same components as those in Exemplary Embodiment 1 are given the same reference signs as in FIG. 1, and their detailed description is omitted. The image processing system in Exemplary Embodiment 2 includes a computer (CPU, processor, data processor) 400a that operates under program control, the image input means 410, and the image output means 420. The computer 400a includes the positional displacement amount estimation means 401, unsuitable area determination means 402a, and the image reconstruction means 403.

The unsuitable area determination means 402a includes acceptable area calculation means 404a, pixel difference calculation means 405a, the unsuitable area extraction means 406, the unsuitable area storage means 407, and reference high-resolution image generation means 608, and determines whether or not a pixel in a target image corresponds to an unsuitable area, using an image obtained by increasing a resolution of a reference image. The unsuitable area extraction means 406 and the unsuitable area storage means 407 are the same as those in Exemplary Embodiment 1. The image input means 410, the positional displacement amount estimation means 401, the image reconstruction means 403, and the image output means 420 are the same as those in Exemplary Embodiment 1.

The reference high-resolution image generation means 608 acquires the reference image input to the reference image input means 411, generates an image obtained by increasing the resolution of the reference image by performing interpolation (e.g. bilinear interpolation or bicubic interpolation) on the reference image, and stores the generated image. This image is referred to as a reference high-resolution image.

The acceptable area calculation means 404a in this exemplary embodiment determines an acceptable area for each individual pixel in the reference high-resolution image stored in the reference high-resolution image generation means 608, and stores a parameter indicating the acceptable area. The acceptable area calculation means 404a is the same as the acceptable area calculation means 404 in Exemplary Embodiment 1, except that the reference high-resolution image is used instead of the reference image. That is, the method of determining the acceptable area for each pixel is the same as that in Exemplary Embodiment 1.

The pixel difference calculation means 405a corrects the target image so as to resolve a positional displacement estimated by the positional displacement amount estimation means 401 (i.e. so as to eliminate an estimated positional displacement amount). The pixel difference calculation means 405a then specifies a pixel in the reference high-resolution image relative to a pixel in the corrected target image, and calculates a differential vector of vectors indicated by pixel values of the relative pixels (i.e. vectors whose elements are the pixel values). The pixel difference calculation means 405a is the same as that in Exemplary Embodiment 1, except that the pixel relative to the pixel in the target image is the pixel in the reference high-resolution image.

Figure 7:
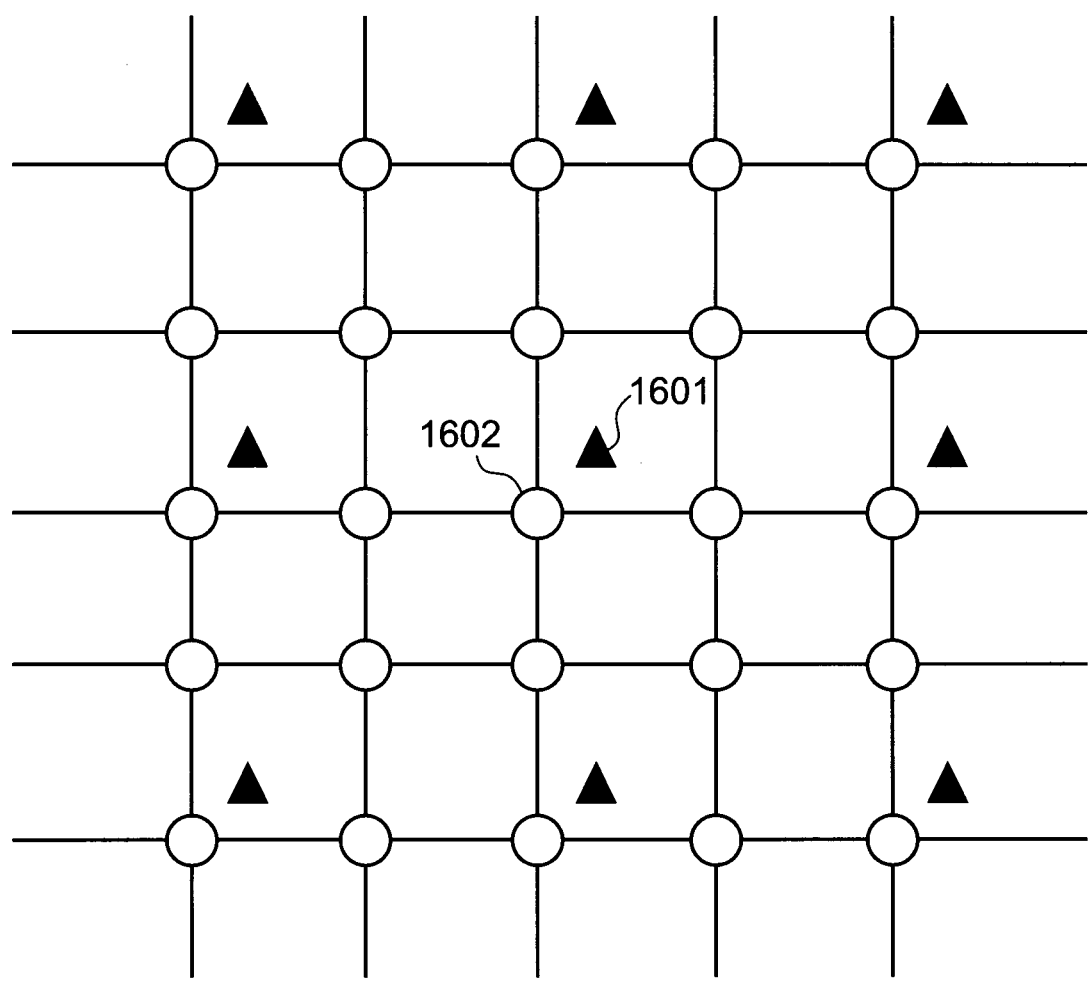
FIG. 7 is an explanatory diagram showing pixels in a corrected target image and pixels in a reference high-resolution image.

FIG. 7 is an explanatory diagram showing pixels in the corrected target image and pixels in the reference high-resolution image. A two-dimensional plane indicating at which position each pixel is present in the relative image is shown in FIG. 7. Each pixel designated by a circle is a pixel in the reference image. Each pixel designated by a triangle is a pixel in the corrected target image. The reference high-resolution image is an image obtained by increasing the resolution of the reference image by interpolation, and therefore has a larger number of pixels than the target image. Since the pixel difference calculation means 405a corrects each target image so as to resolve the positional displacement estimated with sub-pixel accuracy, the pixel in the target image does not necessarily match the pixel in the reference high-resolution image. The pixel difference calculation means 405a specifies a pixel in the reference high-resolution image nearest a position of a pixel in the corrected target image (a position in the image), to relate the two pixels. The pixel difference calculation means 405a then calculates a differential vector of vectors (vectors in the color space) whose elements are respectively pixel values of the relative pixels. For example, the pixel difference calculation means 405a specifies a pixel 1602 in the reference high-resolution image nearest a pixel 1601 in the target image shown in FIG. 7, to relate the pixel 1601 to the pixel 1602. The pixel difference calculation means 405a then calculates a differential vector by subtracting a vector whose element is a pixel value of the pixel 1602 from a vector whose element is a pixel value of the pixel 1601. The pixel difference calculation means 405a calculates the differential vector for each pixel in each target image. In Exemplary Embodiment 2, a pixel in the target image may be related to a pixel newly generated by interpolation in the reference high-resolution image.

The unsuitable area extraction means 406 determines, for each pixel in the target image, whether or not the pixel is a pixel of an area that does not conform to the change indicated by the geometric deformation model assumed beforehand, using the acceptable area obtained by the pixel difference calculation means 405a. This operation can be performed in the same manner as in Exemplary Embodiment 1. Through the use of the acceptable area calculated for the pixel in the reference high-resolution image relative to the pixel in the target image and the differential vector calculated for the two pixels, the unsuitable area extraction means 406 determines whether or not the position in the color space indicated by the pixel value of the pixel in the target image is outside the acceptable area.

The reference high-resolution image generation means 608, the acceptable area calculation means 404a, and the pixel difference calculation means 405a are realized, for example, by a CPU operating according to a program. Alternatively, each of the means may be realized by a dedicated circuit.

Figure 8:
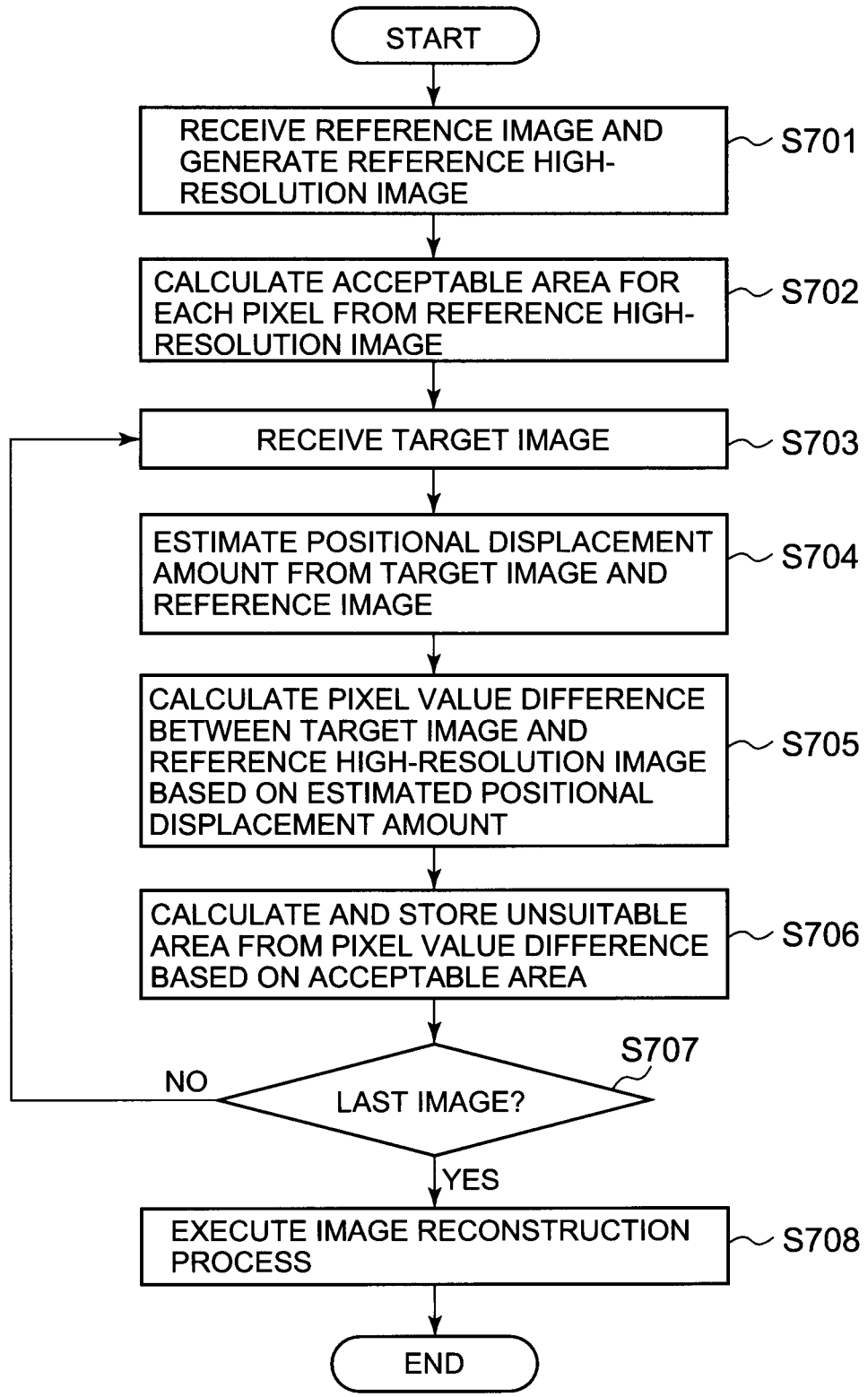
FIG. 8 is a flowchart showing an example of processing in Exemplary Embodiment 2.

The following describes an operation in Exemplary Embodiment 2. FIG. 8 is a flowchart showing an example of processing in Exemplary Embodiment 2. When a reference image is input, the reference image input means 411 stores the reference image. The reference high-resolution image generation means 608 performs bilinear interpolation or bicubic interpolation on the reference image to generate a reference high-resolution image, and stores the reference high-resolution image (step S701). Next, for each individual pixel in the reference high-resolution image, the acceptable area calculation means 404a calculates a parameter indicating an acceptable area, and stores the parameter (step S702).

When a target image is input, the target image input means 412 stores the target image (step S703). The positional displacement amount estimation means 401 estimates a positional displacement amount of the target image from the reference image with subpixel accuracy, and stores the positional displacement amount (step S704). Here, the positional displacement amount estimation means 401 can use the reference image stored in the reference image input means 411. Steps S703 and S704 are the same as steps S503 and 504.

Next, the pixel difference calculation means 405a corrects the target image so as to resolve the positional displacement estimated by the positional displacement amount estimation means 401, and relates a pixel in the target image to a pixel in the reference high-resolution image. The pixel difference calculation means 405a then calculates a differential vector of the relative pixel pair (step S705).

Next, for each pixel in the target image input in step S703, the unsuitable area extraction means 406 determines whether or not the pixel is an unsuitable area, using the differential vector calculated for the pixel and the acceptable area calculated for the pixel in the reference high-resolution image relative to the pixel. The unsuitable area extraction means 406 stores the pixel determined as the unsuitable area, in the unsuitable area storage means 407 (step S706).

In the case where the target image on which steps S704 to S706 are performed is not the last target image (step S707: NO), the processing from step S703 is repeated. For example, when the next target image is input, the target image input means 412 stores the target image (step S703), and steps S704 to S706 are performed on the target image. In the case where the target image on which steps S704 to S706 are performed is the last target image (e.g. in the case where there is no input of the next target image), the image reconstruction means 403 generates a composite image using the information of the unsuitable area stored in the unsuitable area storage means 407 and the reference image and each target image stored in the image input means 410, and outputs the composite image to the image output means 420 (step S708). Steps S706 to S708 are the same as steps S506 to S508.

In Exemplary Embodiment 2 as in Exemplary Embodiment 1, the determination of whether or not the pixel is a local area that does not conform to the change indicated by the assumed geometric deformation model can be performed appropriately. As a result, a reduction in image quality improvement effect in reconstructed image generation can be suppressed. In particular, in Exemplary Embodiment 2, interpolation is performed when generating the reference high-resolution image from the reference image, so that pixels of colors intermediate between the plurality of existing pixels are inserted between the pixels in the reference image. The resulting reference high-resolution image has a shorter distance between adjacent pixels in the color space (e.g. the YUV space). The acceptable area calculation means 404a sets the acceptable area for each pixel in this reference high-resolution image. Hence, the acceptable area that reflects a variance in color between pixels in an image more than in Exemplary Embodiment 1 can be provided. As a result, the determination of whether or not the pixel is a local area that does not conform to the change indicated by the assumed geometric deformation model can be performed more appropriately. This contributes to an enhanced image quality improvement effect in the reconstructed image.

In Exemplary Embodiment 2, too, the feature value such as the value obtained by differentiating the pixel value of each pixel in the x direction or the y direction may be used as the element of the vector $x_{kt}$, as described in Exemplary Embodiment 1.

Moreover, the acceptable area may be calculated not for the reference image but for the target image, as described in Exemplary Embodiment 1. In this case, the image processing system may include target image resolution increasing means (not shown) for increasing the resolution of the target image by interpolation, where the target image resolution increasing means increases the resolution of the target image by the same operation as the reference high-resolution image generation means 608. The pixel difference calculation means 405a then corrects the target image of the increased resolution so as to resolve the positional displacement, and specifies a pixel nearest a pixel position of the reference image from among pixels in the corrected image, thereby relating the pixel in the target image of the increased resolution to the pixel in the reference image. The pixel difference calculation means 405a then calculates a relative pixel differential vector of respective vectors of the relative pixels.

Further, the acceptable area calculation means 404a selects the pixels in the target image one by one, specifies the maximum variance vector between the selected pixel and its surrounding pixels, and sets, as a determination area, an ellipsoid defined by a magnitude and a direction of the maximum variance vector and a pixel value of the selected pixel. This operation is the same as when calculating the acceptable area for the reference image.

Moreover, the acceptable area calculation means 404a may calculate the acceptable area (Ra) for each pixel in the reference image and also calculate the acceptable area (Rb) for each pixel in the target image, where the unsuitable area extraction means 406 determines whether or not the pixel in the target image is a pixel of an unsuitable area using the acceptable areas Ra and Rb calculated respectively for the reference image and the target image, as described in Exemplary Embodiment 1.

Exemplary Embodiment 3

Figure 9:
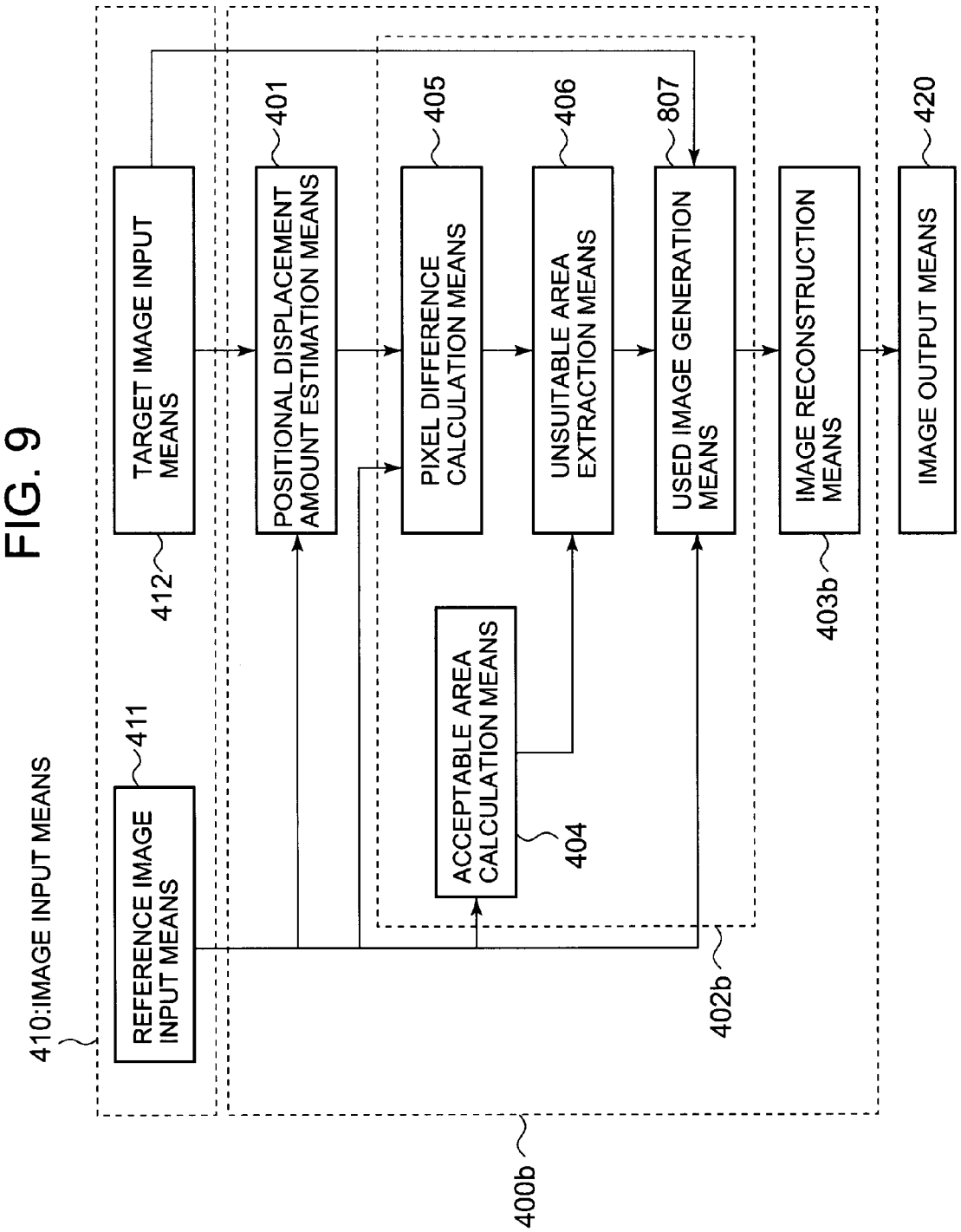
FIG. 9 is a block diagram showing an example of an image processing system in Exemplary Embodiment 3 of the present invention.

FIG. 9 is a block diagram showing an example of an image processing system in Exemplary Embodiment 3 of the present invention. The same components as those in Exemplary Embodiment 1 are given the same reference signs as in FIG. 1, and their detailed description is omitted. The image processing system in Exemplary Embodiment 3 includes a computer (CPU, processor, data processor) 400b that operates under program control, the image input means 410, and the image output means 420. The computer 400b includes the positional displacement amount estimation means 401, unsuitable area determination means 402b, and image reconstruction means 403b.

The unsuitable area determination means 402b includes the acceptable area calculation means 404, the pixel difference calculation means 405, the unsuitable area extraction means 406, and used image generation means 807, and generates an image used for reconstructed image generation by replacing a pixel value of a pixel of an unsuitable area in a target image with a pixel value of a relative pixel in a reference image. The acceptable area calculation means 404, the pixel difference calculation means 405, and the unsuitable area extraction means 406 are the same as those in Exemplary Embodiment 1. The image input means 410, the positional displacement amount estimation means 401, and the image output means 420 are the same as those in Exemplary Embodiment 1.

In this exemplary embodiment, the unsuitable area extraction means 406 sends information (e.g. a pixel number) of a pixel relative to an unsuitable area in each target image, to the used image generation means 807.

The used image generation means 807 replaces a pixel value of the pixel determined as the unsuitable area in the target image with a pixel value of a pixel in the reference image relative to the pixel, based on the information of the pixel determined as the unsuitable area. The reference image and the target image in which the pixel value has been replaced by the used image generation means 807 are put to use for reconstructed image generation.

Figure 10:
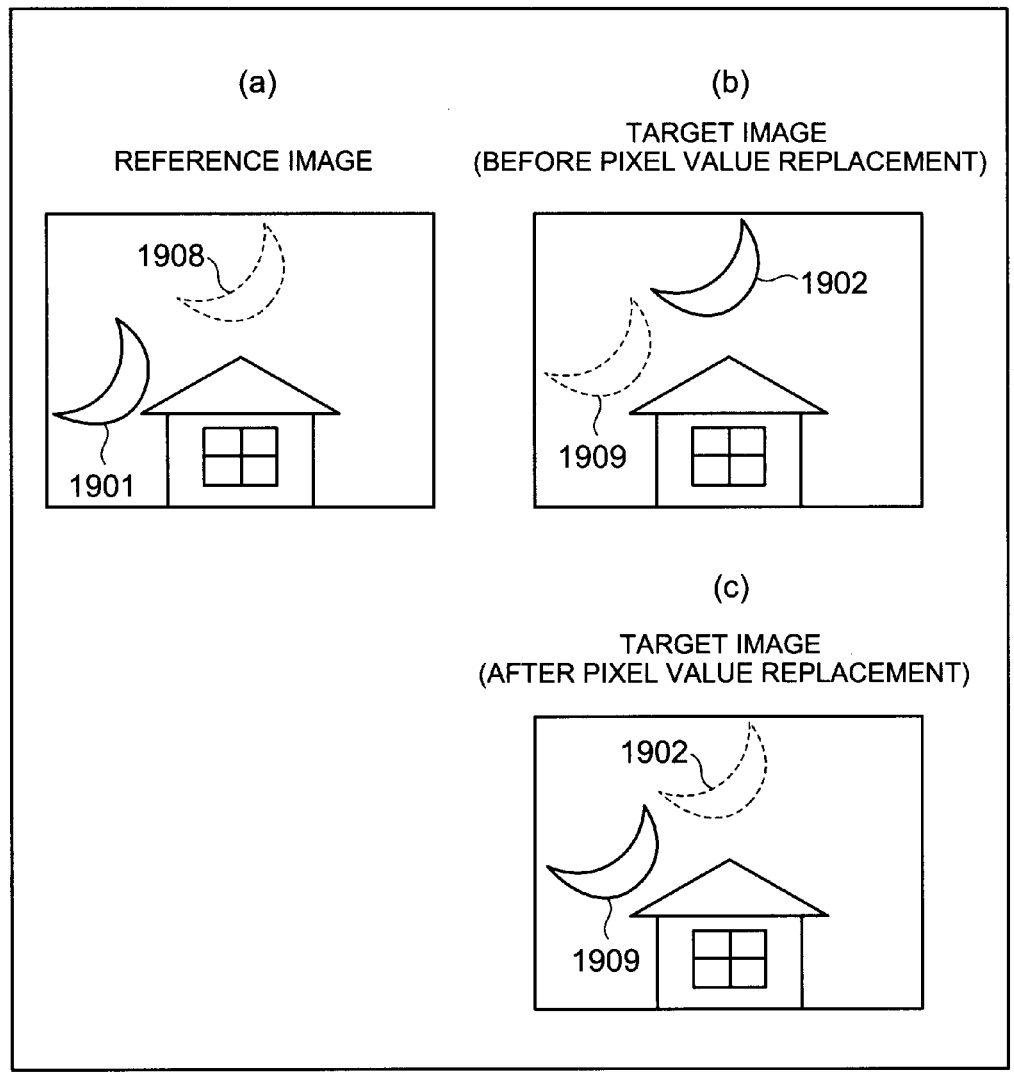
FIG. 10 is an explanatory diagram showing an example of pixel value replacement in a target image.

FIG. 10 is an explanatory diagram showing an example of pixel value replacement in a target image. FIG. 10(a) shows a reference image obtained by capturing an image of a house and the moon, and FIG. 10(b) shows a target image obtained by capturing an image of the same house and moon. In FIGS. 10(a) and 10(b), the house and the moon included in each image is designated by solid lines, whereas an area relative to an area representing the moon in another image is designated by dashed lines. For example, an area 1909 shown in FIG. 10(b) corresponds to an area 1901 representing the moon in the reference image, and is a background in the target image. The target image has a uniform change from the reference image, due to a camera position or the like at the time of image capture. However, there is also motion of the moon itself which is a subject, inducing a local area that does not conform to the uniform change of the entire image. That is, there is a local area that does not conform to the change indicated by the geometric deformation model assumed beforehand. Therefore, there is no relationship between pixels representing the moon. A pixel in the area 1909 shown in FIG. 10(b) is related to a pixel in the area 1901 shown in FIG. 10(a). Likewise, a pixel in an area 1902 shown in FIG. 10(b) is related to a pixel in an area 1908 shown in FIG. 10(a). Each of the pixels in the areas 1909 and 1902 in the target image is then determined as a pixel of an unsuitable area by the unsuitable area extraction means 406.

The used image generation means 807 replaces a pixel value of such a pixel determined as a pixel of an unsuitable area, with a pixel value of a relative pixel in the reference image. In the example shown in FIG. 10, the used image generation means 807 replaces a pixel value of the pixel in the area 1909 shown in FIG. 10(b) with a pixel value of the pixel in the area 1901 in the reference image, and equally replaces a pixel value of the pixel in the area 1902 shown in FIG. 10(b) with a pixel value of the pixel in the area 1908 in the reference image. As a result, the target image shown in FIG. 10(b) is converted to an image shown in FIG. 10(c). As shown in FIG. 10(c), the area 1909 becomes an area representing the moon, and the area 1902 becomes a background area.

The used image generation means 807 stores the reference image and each target image. Regarding a target image in which a pixel value has been replaced, the used image generation means 807 stores the target image in which the pixel value has been replaced.

The image reconstruction means 403b generates a reconstructed image using the reference image and each target image stored in the used image generation means 807. When determining a pixel value (e.g. a Y signal and the like in the YUV representation) of each pixel in the reconstructed image, the image reconstruction means 403b may calculate the luminance value of each pixel in the reconstructed image by finding such a vector T that minimizes the evaluation function E[T] given by the following Expression (2).

Expression (2)

$$E[T] = \sum_{k=1}^{K} \| DBM_k T - I_k \|^2 + \alpha \| QT \|^2 \qquad \text{[Math. 2]}$$

The image reconstruction means 403b is the same as the image reconstruction means 403 in Exemplary Embodiment 1, except that Expression (2) is used as the evaluation function E[T].

In Exemplary Embodiment 3, the used image generation means 807 replaces the pixel value of the unsuitable area in the target image with the pixel value of the relative pixel in the reference image, as a result of which the unsuitable area in the target image no longer exists. Accordingly, the diagonal components in the diagonal matrix $S_k$ in Expression (1) are all set to 1. Expression (2) can be regarded as an expression in the case where the diagonal components of the diagonal matrix $S_k$ in Expression (1) are all set to 1.

The used image generation means 807 and the image reconstruction means 403b are realized, for example, by a CPU operating according to a program. Alternatively, each of the means may be realized by a dedicated circuit.

Figure 11:
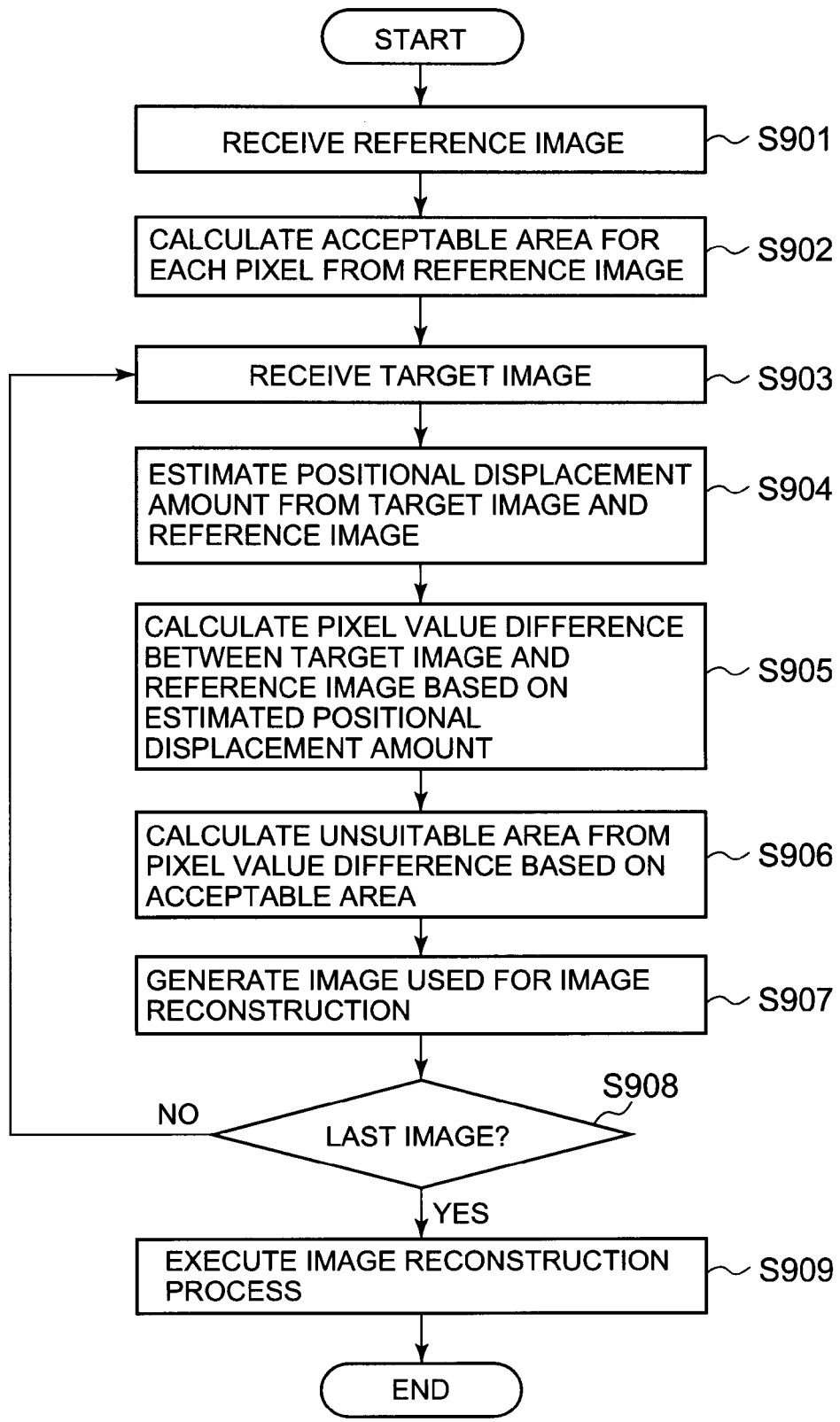
FIG. 11 is a flowchart showing an example of processing in Exemplary Embodiment 3.

The following describes an operation in Exemplary Embodiment 3. FIG. 11 is a flowchart showing an example of processing in Exemplary Embodiment 3. Processing from when a reference image is input to the reference image input means 411 to when the acceptable area calculation means 404 calculates a parameter indicating an acceptable area for each pixel in the reference image and stores the parameter (steps S901 and S902) is the same as steps S501 and S502 in Exemplary Embodiment 1.

When a target image is input, the target image input means 412 stores the target image (step S903). The positional displacement amount estimation means 401 estimates a positional displacement amount of the target image from the reference image with subpixel accuracy, and stores the positional displacement amount (step S904). Next, the pixel difference calculation means 405 corrects the target image so as to resolve the positional displacement, and relates a pixel in the target image to a pixel in the reference image. The pixel difference calculation means 405 then calculates a differential vector of the relative pixel pair (step S905). The unsuitable area extraction means 406 determines, for each pixel in the target image, whether or not the pixel is an unsuitable area, using the differential vector calculated for the pixel and the acceptable area. The unsuitable area extraction means 406 sends the pixel determined as the unsuitable area, to the used image generation means 807 (step S906). Steps S903 to S906 are the same as steps S503 to S506 in Exemplary Embodiment 1.

The used image generation means 807 replaces a pixel value of each pixel determined as a pixel of an unsuitable area among pixels in the target image input in step S903, with a pixel value of a pixel in the reference image relative to the pixel (step S907). For instance, suppose the target image shown as an example in FIG. 10(b) is input in step S903. The used image generation means 807 replaces the pixel values of the pixels in the areas 1902 and 1909 in the target image, respectively with the pixel values of the pixels in the areas 1908 and 1901 in the reference image (FIG. 10(a)). The used image generation means 807 stores the reference image and the target image whose pixel value has been replaced. In the case where there is no unsuitable area in the target image and so the used image generation means 807 does not replace any pixel value, the used image generation means 807 stores the original target image.

In the case where the target image on which steps S904 to S907 are performed is not the last target image (step S908: NO), the processing from step S903 is repeated. For example, when the next target image is input, the target image input means 412 stores the target image (step S903), and steps S904 to S907 are performed on the target image. In the case where the target image on which steps S904 to S907 are performed is the last target image (e.g. in the case where there is no input of the next target image), the image reconstruction means 403b generates a reconstructed image using the reference image and each target image stored in the used image generation means 807, and outputs the reconstructed image to the image output means 420 (step S909). Step S909 is the same as step S508, except that Expression (2) is used as the evaluation function E[T].

In Exemplary Embodiment 3 as in Exemplary Embodiment 1, the determination of whether or not the pixel is a local area that does not conform to the change indicated by the assumed geometric deformation model can be performed appropriately. As a result, a reduction in image quality improvement effect in reconstructed image generation can be suppressed. Moreover, in Exemplary Embodiment 3, the used image generation means 807 replaces a pixel value of an area determined as an unsuitable area in the target image and stores the resulting target image, and the image reconstruction means 403b generates the reconstructed image using the target image in which the pixel value has been replaced. The image reconstruction means 403b does not need to use information of the area determined as the unsuitable area, so that a memory (the unsuitable area storage means 407) for storing the information can be omitted. Thus, according to Exemplary Embodiment 3, the high-quality image generation process can be performed with a smaller amount of memory.

In Exemplary Embodiment 3, the unsuitable area determination means 402b may include the reference high-resolution image generation means 608 described in Exemplary Embodiment 2, where the pixel difference calculation means 405 calculates the differential vector from the reference high-resolution image and the target image. In this case, the used image generation means 807 replaces a pixel value of each pixel determined as a pixel of an unsuitable area among the pixels in the target image, with a pixel value of a pixel in the reference high-resolution image relative to the pixel.

Exemplary Embodiment 4

Exemplary Embodiments 1 to 3 each describe a structure in the case of generating a high-resolution image having a larger number of pixels than an input image. On the other hand, Exemplary Embodiment 4 describes a structure in the case of generating a blended image of the same resolution as each individual input image. The blended image mentioned here is an image obtained by calculating, for each pixel, a mean pixel value of relative pixels in a plurality of images.

Figure 12:
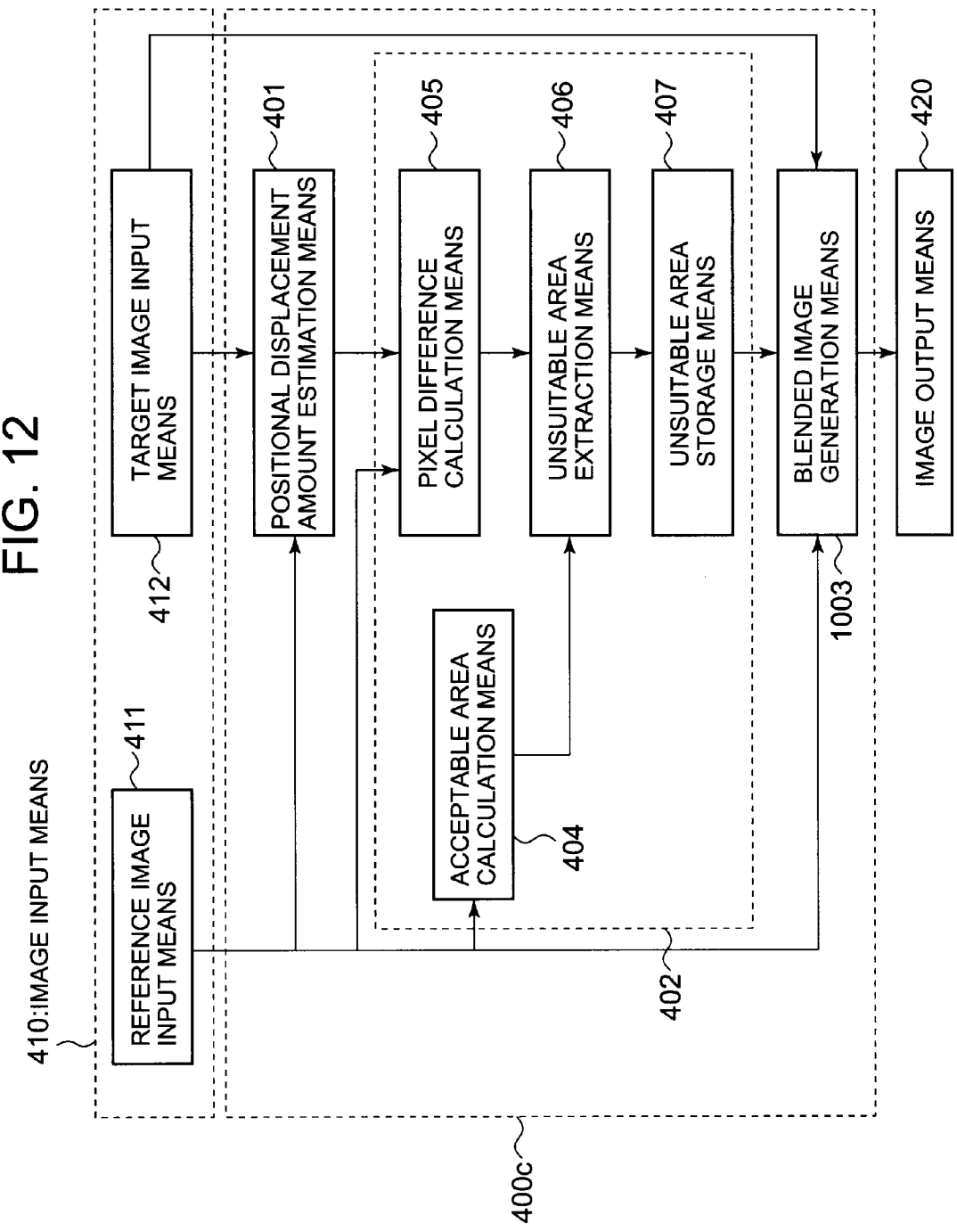
FIG. 12 is a block diagram showing an example of an image processing system in Exemplary Embodiment 4 of the present invention.

FIG. 12 is a block diagram showing an example of an image processing system in Exemplary Embodiment 4 of the present invention. The same components as those in Exemplary Embodiment 1 are given the same reference signs as in FIG. 1, and their detailed description is omitted. The image processing system in Exemplary Embodiment 4 includes a computer (CPU, processor, data processor) 400c that operates under program control, the image input means 410, and the image output means 420. The computer 400c includes the positional displacement amount estimation means 401, the unsuitable area determination means 402, and blended image generation means 1003.

The unsuitable area determination means 402 includes the acceptable area calculation means 404, the pixel difference calculation means 405, the unsuitable area extraction means 406, and the unsuitable area storage means 407. The image input means 410, the positional displacement amount estimation means 401, the unsuitable area determination means 402, and the image output means 420 are the same as those in Exemplary Embodiment 1.

The blended image generation means 1003 generates a blended image by calculating, for each pixel, a mean pixel value of relative pixels in the reference image and each target image. For example, the blended image generation means 1003 generates the blended image by calculating, for each pixel in the reference image, a mean pixel value of the pixel and its relative pixel in each target image. Regarding a pixel of an area representing a moving object in the blended image, however, the blended image generation means 1003 does not perform the mean value calculation, but sets a pixel value of an area representing the moving object in the reference image, as a pixel value in the blended image. Moreover, in the case of calculating a mean pixel value of relative pixels in the reference image and each target image, the blended image generation means 1003 excludes a pixel determined as an unsuitable area, from the mean value calculation.

Figure 13:
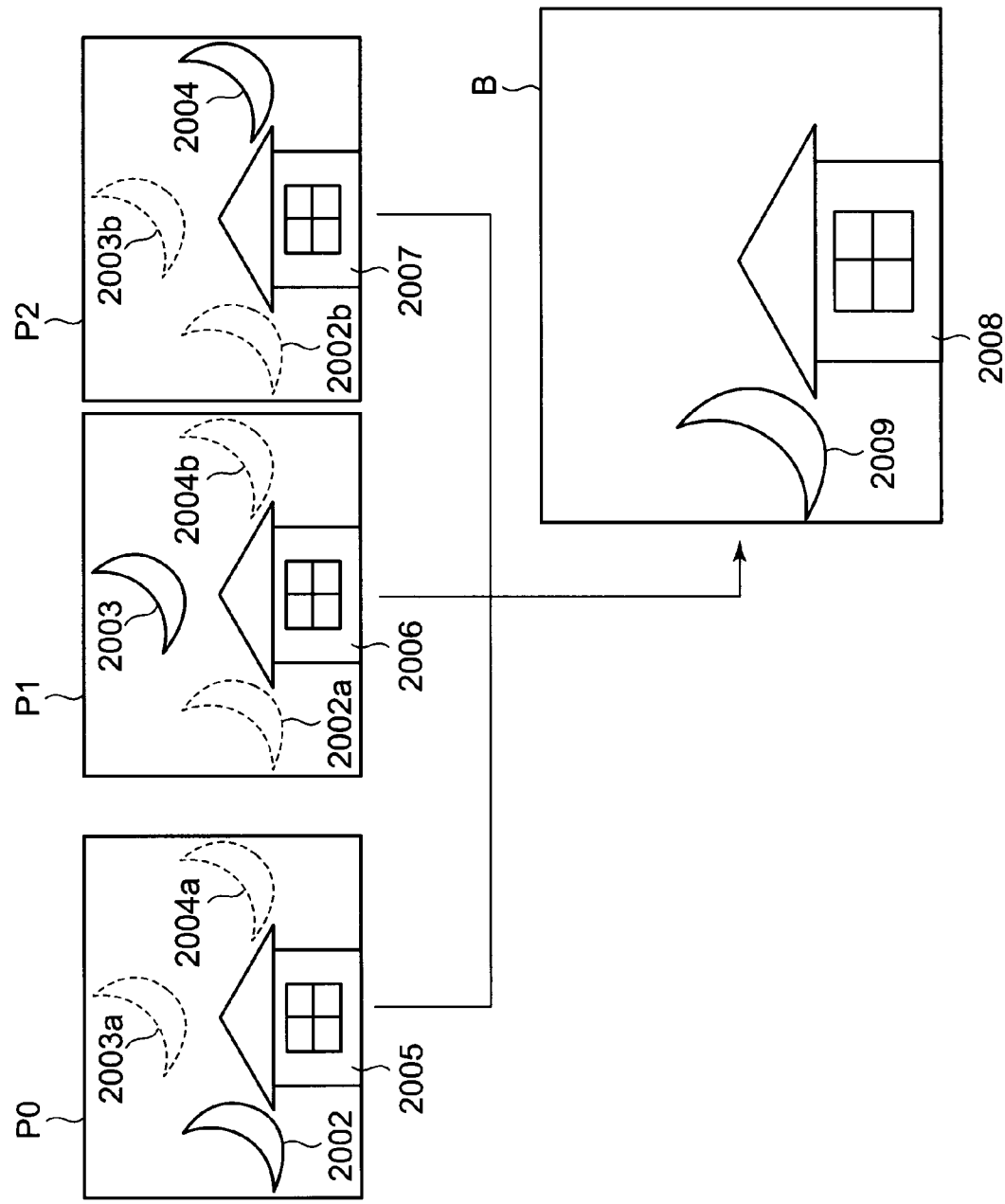
FIG. 13 is an explanatory diagram showing an example of blended image generation.

FIG. 13 is an explanatory diagram showing an example of blended image generation by the blended image generation means 1003. In FIG. 13, an image P0 is a reference image, images P1 and P2 are target images, and an image B is a blended image. In FIG. 13, the moon and a house included in each image are designated by solid lines, whereas an area relative to an area representing the moon in another image is designated by dashed lines. For example, areas 2002a and 2004b in the target image P1 respectively correspond to areas 2002 and 2004 representing the moon in the reference image P0 and the target image P2. In this example, pixels in areas 2002a and 2003 in the target image P1 are each determined as a pixel of an unsuitable area, and pixels in areas 2002b and 2004 in the target image P2 are each determined as a pixel of an unsuitable area. Meanwhile, the other areas have the change indicated by the geometric deformation model assumed beforehand, and are each determined as a suitable area.

In the example shown in FIG. 13, a pixel in the area 2002 in the reference image P0 is related to the pixels in the areas 2002a and 2002b in the target images P1 and P2. Likewise, pixels in the areas 2003, 2003a, and 2003b are related each other, and pixels in the areas 2004, 2004a, and 2004b are related each other. In addition, pixels in areas 2005, 2006, and 2007 representing the house are related each other.

In the case where a pixel in each target image relative to a pixel in the reference image is determined as a pixel of a suitable area, the blended image generation means 1003 calculates a mean pixel value of the pixel in the reference image and the pixel in each target image relative to the pixel, and sets the mean pixel value as a pixel value in the blended image. For example, the areas 2006 and 2007 in the target images P1 and P2 relative to the area 2005 in the reference image P0 are each not an unsuitable area. Accordingly, the blended image generation means 1003 calculates a mean pixel value of the relative pixels in the areas 2005, 2006, and 2007, and sets the mean pixel value as a pixel value in the blended image B. A pixel value of an area 2008 in the blended image B, for example, is obtained in this way.

Moreover, the blended image generation means 1003 uses a pixel value of the pixel in the area 2002 representing a moving object in the reference image, directly as a pixel value of a pixel in an area representing the moving object in the blended image. Therefore, though the pixels in the areas 2002, 2002a, and 2002b are related, the blended image generation means 1003 does not calculate a mean pixel value of these relative pixels, but simply sets the same value as the pixel value in the area 2002, as a pixel value of the same position 2009 in the blended image B as the area 2002 of the moving object in the reference image. For instance, the determination of whether or not the pixel is a pixel of an area representing a moving object in the reference image may be performed as follows. If the pixel in each target image relative to the pixel in the reference image is determined as an unsuitable area, the blended image generation means 1003 determines the pixel in the reference image as a pixel of an area representing a moving object. The blended image generation means 1003 may also employ other methods to determine a pixel of an area representing a moving object in the reference image.

If a pixel in any target image relative to the pixel in the reference image is determined as a pixel of an unsuitable area, the blended image generation means 1003 calculates a mean pixel value of the pixel in the reference image and each pixel determined as a pixel of a suitable area among the pixels in the target images relative to the pixel, and sets the mean pixel value as a pixel value in the blended image. As an example, the pixel in the area 2003a in the reference image P0 is related to the pixels in the areas 2003 and 2003b in the target images P1 and P2. However, since the pixel in the area 2003 is determined as a pixel of an unsuitable area, the blended image generation means 1003 sets a mean pixel value of the pixel in the area 2003a and the pixel in the area 2003b relative to the pixel, as a pixel value in the blended image B. As another example, the pixel in the area 2004a in the reference image P0 is related to the pixels in the areas 2004b and 2004 in the target image P1 and P2. However, since the pixel in the area 2004 is determined as a pixel of an unsuitable area, the blended image generation means 1003 sets a mean pixel value of the pixel in the area 2004a and the pixel in the area 2004b relative to the pixel, as a pixel value in the blended image B.

The blended image generation means 1003 is realized, for example, by a CPU operating according to a program. Alternatively, the blended image generation means 1003 may be realized by a dedicated circuit.

Figure 14:
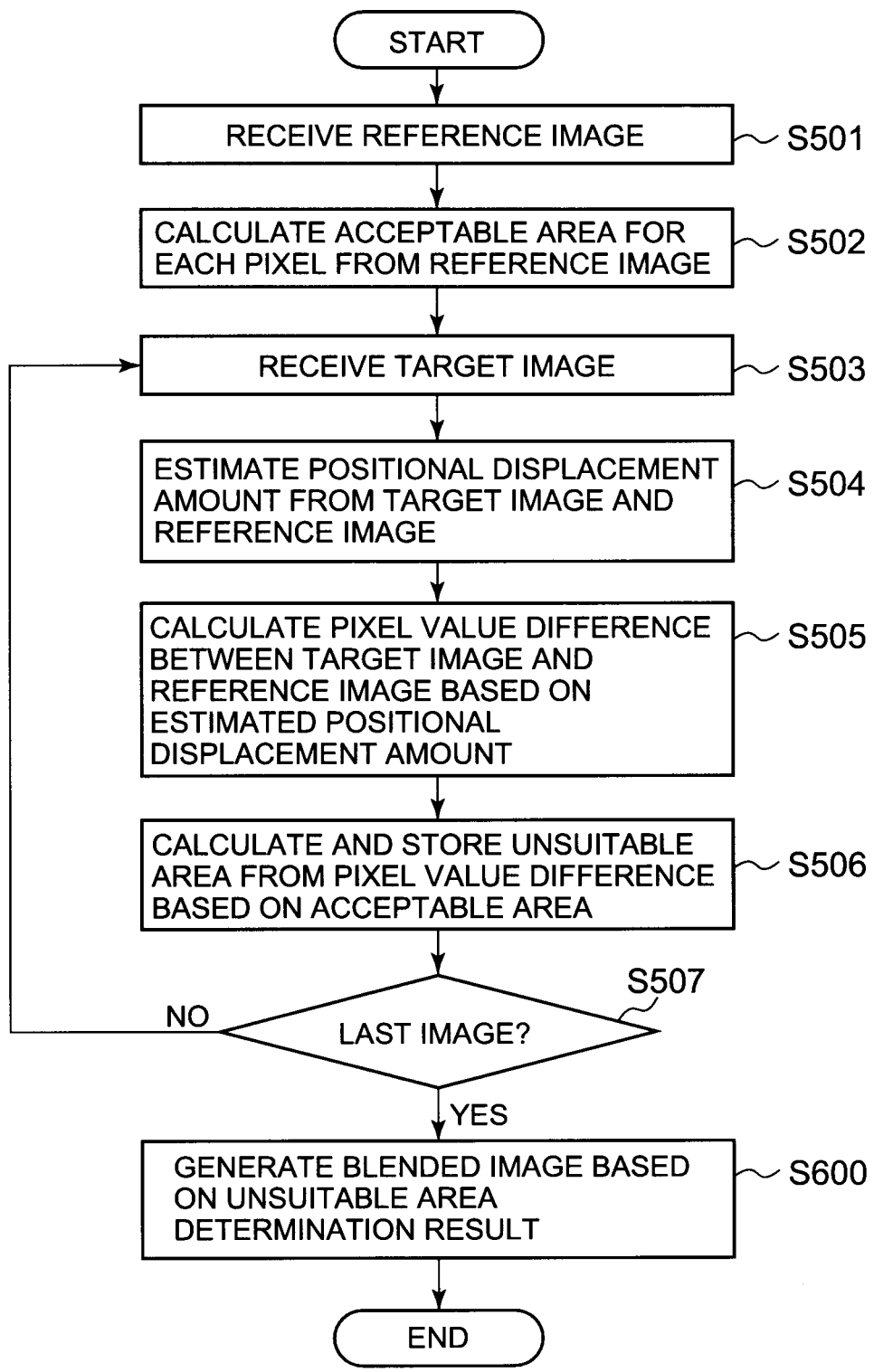
FIG. 14 is a flowchart showing an example of processing in Exemplary Embodiment 4.

FIG. 14 is a flowchart showing an example of processing in Exemplary Embodiment 4. The same processes as those in Exemplary Embodiment 1 are given the same reference signs as in FIG. 5, and their description is omitted. An operation from when a reference image is input to when information of a pixel of an unsuitable area in each target image is stored in the unsuitable area storage means 407 (steps S501 to S507) is the same as that in Exemplary Embodiment 1.

In the case where the target image on which steps S504 to S506 are performed is the last target image (e.g. in the case where there is no input of the next target image), the blended image generation means 1003 references the information of the pixel relative to the unsuitable area in each target image, and generates a blended image from the reference image and each target image, as described above (step S600). The blended image generation means 1003 outputs the blended image to the image output means 420.

In Exemplary Embodiment 4 as in Exemplary Embodiment 1, it is possible to prevent a situation where an area with a large pixel value variance in an image tends to be determined as a local area (unsuitable area) that does not conform to the change indicated by the assumed geometric deformation model. A pixel of such an area with a large pixel value variance can also be put to use in the blended image generation process, which contributes to high-resolution of the generated blended image. Besides, the blended image generation means 1003 does not use a pixel value of a pixel of an unsuitable area in the target image, for the mean value calculation in blended image generation. This also contributes to high-resolution of the blended image.

In Exemplary Embodiment 4, the unsuitable area determination means 402 may have a structure that includes the reference high-resolution image generation means 608 described in Exemplary Embodiment 2, and calculates the acceptable area using the reference high-resolution image generated by the reference high-resolution image generation means 608 and determines an image of an unsuitable area.

Moreover, the unsuitable area determination means 402 may include the used image generation means 807 described in Exemplary Embodiment 3, where the used image generation means 807 replaces a pixel value of a pixel of an unsuitable area in each target image with a pixel value of a relative pixel in the reference image. The resulting target image no longer has an unsuitable area. Hence, the blended image generation means 1003 generates the blended image, by calculating a mean pixel value of relative pixels in the reference image and each target image and setting the mean pixel value as a pixel value in the blended image.

Exemplary Embodiment 5

Figure 15:
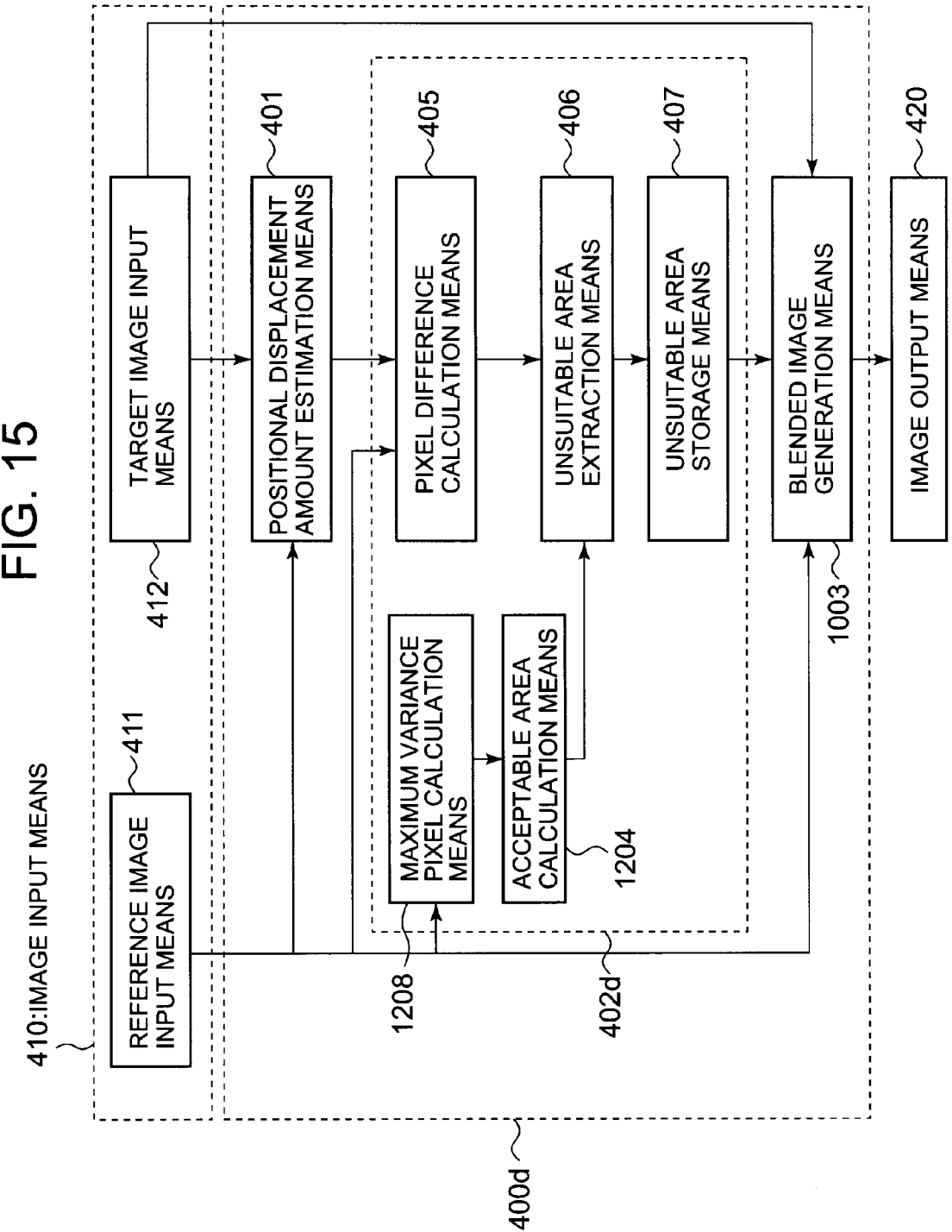
FIG. 15 is a block diagram showing an example of an image processing system in Exemplary Embodiment 5 of the present invention.

FIG. 15 is a block diagram showing an example of an image processing system in Exemplary Embodiment 5 of the present invention. The same components as those in Exemplary embodiments 1 and 4 are given the same reference signs as in FIGS. 1 and 12, and their detailed description is omitted. The image processing system in Exemplary Embodiment 5 includes a computer (CPU, processor, data processor) 400d that operates under program control, the image input means 410, and the image output means 420. The computer 400d includes the positional displacement amount estimation means 401, unsuitable area determination means 402d, and the blended image generation means 1003. The image input means 410, the image output means 420, the positional displacement amount estimation means 401, and the blended image generation means 1003 are the same as those in Exemplary Embodiment 4.

The unsuitable area determination means 402d includes maximum variance pixel calculation means 1208, acceptable area calculation means 1204, the pixel difference calculation means 405, the unsuitable area extraction means 406, and the unsuitable area storage means 407. The pixel difference calculation means 405, the unsuitable area extraction means 406, and the unsuitable area storage means 407 are the same as those in Exemplary Embodiments 1 and 4.

The unsuitable area determination means 402d specifies, for each target image, an unsuitable area using a pixel value in the reference image stored in the reference image input means 411 and an inter-image positional displacement amount obtained by the positional displacement amount estimation means 401, and stores the unsuitable area.

The maximum variance pixel calculation means 1208 specifies a maximum variance pixel for each pixel in the reference image stored in the reference image input means 411, and stores the maximum variance pixel. The maximum variance pixel calculation means 1208 can determine the maximum variance pixel by specifying a maximum variance vector for each pixel in the reference image. The specification of the maximum variance vector can be performed in the same manner as the acceptable area calculation means 404 in Exemplary Embodiment 1.

The acceptable area calculation means 1204 calculates an acceptable area for each pixel in the reference image, using the maximum variance pixel specified for the pixel. The acceptable area calculation means 1204 calculates a differential vector (i.e. the maximum variance vector) from the pixel in the reference image and the maximum variance pixel of the pixel. The acceptable area calculation means 1204 then calculates a parameter indicating an ellipsoid whose center is a position in the color space indicated by a pixel value of the pixel in the reference image, whose central axis radius is a magnitude of the maximum variance vector, and whose central axis direction is the same direction as the maximum variance vector. Note here that the acceptable area calculation means 1204 does not store the parameter indicating the acceptable area.

As an alternative, the maximum variance pixel calculation means 1208 may store the maximum variance vector itself instead of storing the maximum variance pixel, where the acceptable area calculation means 1204 calculates the acceptable area using the maximum variance vector.

The maximum variance pixel calculation means 1208 and the acceptable area calculation means 1204 are realized, for example, by a CPU operating according to a program. Alternatively, each of the means may be realized by a dedicated circuit.

The maximum variance pixel calculation means 1208 and the acceptable area calculation means 1204 are components that separate the function of the acceptable area calculation means 404 in Exemplary Embodiment 1. In Exemplary Embodiment 1, when the reference image is input, the acceptable area is calculated for each pixel in the reference image, and the parameter indicating the acceptable area is stored. In Exemplary Embodiment 5, on the other hand, when the reference image is input, merely the maximum variance pixel for each pixel is specified and stored, without calculating the parameter indicating the acceptable area. Subsequently, when determining whether or not a pixel in a target image is a pixel of an unsuitable area, the acceptable area calculation means 1204 calculates the acceptable area using the information of the maximum variance pixel, for each individual target image. By calculating the acceptable area for each target image, it becomes unnecessary to store the parameter indicating the acceptable area, thereby achieving a reduction in memory amount. The following describes processing in Exemplary Embodiment 5 with reference to a flowchart.

Figure 16:
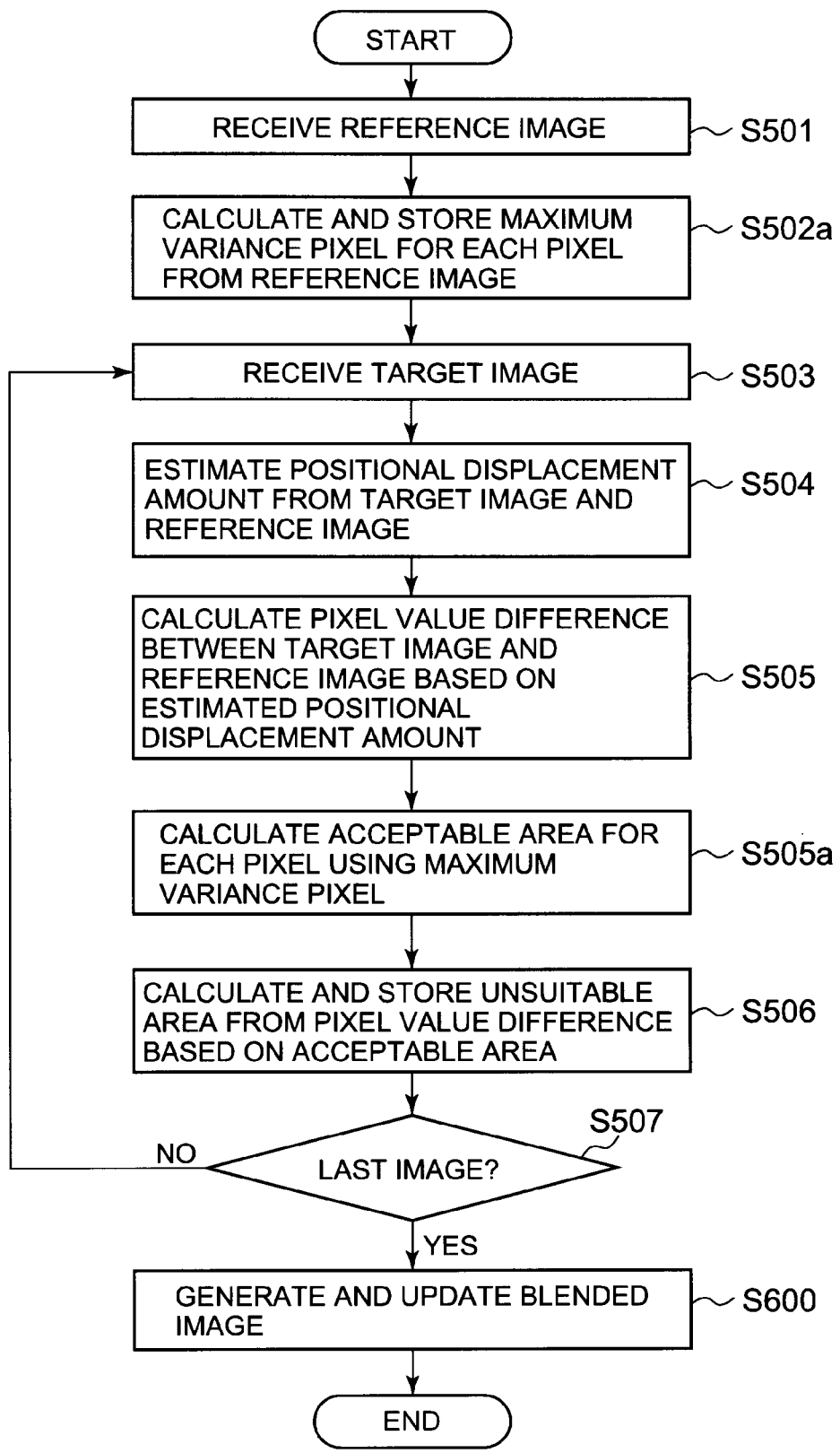
FIG. 16 is a flowchart showing an example of processing in Exemplary Embodiment 5.

FIG. 16 is a flowchart showing an example of processing in Exemplary Embodiment 5. The same processes as those in Exemplary Embodiments 1 and 4 are given the same reference signs as in FIGS. 5 and 14, and their description is omitted. When a reference image is input, the reference image input means 411 stores the reference image (step S501).

The maximum variance pixel calculation means 1208 specifies a maximum variance pixel for each pixel in the reference image, and stores the maximum variance pixel (step S502*a*). The maximum variance pixel calculation means 1208 selects pixels in the reference image one by one. Let denote the selected pixel. The maximum variance pixel calculation means 1208 calculates a differential vector between the pixel i and each of its surrounding pixels, and specifies a pixel corresponding to a differential vector of a largest magnitude (i.e. a pixel forming the maximum variance vector) among the surrounding pixels of the pixel i, as the maximum variance pixel. Unlike the other exemplary embodiments, the maximum variance pixel calculation means 1208 does not calculate an acceptable area when the reference image is input. The maximum variance pixel calculation means 1208 may store identification information (e.g. a pixel number) of the pixel, as information of the maximum variance pixel.

Processing from when a target image is input (step S503) to when the target image is corrected so as to resolve a positional displacement, a pixel in the target image is related to a pixel in the reference image, and a differential vector of the relative pixel pair is calculated (step S505) is the same as that in Exemplary Embodiment 4.

Next, the acceptable area calculation means 1204 reads, for each pixel in the reference image input to the reference image input means 411, the maximum variance pixel of the pixel from the maximum variance pixel calculation means 1208, and calculates a parameter indicating an acceptable area (step S505*a*).

Next, for each pixel in the target image input in step S503, the unsuitable area extraction means 406 determines whether or not the pixel is an unsuitable area, using the differential vector calculated for the pixel and the acceptable area of the pixel in the reference image relative to the pixel. The unsuitable area extraction means 406 stores the pixel determined as the unsuitable area, in the unsuitable area storage means 407 (step S506).

In the case where the target image on which steps S504 to S506 are performed is not the last target image (step S507: NO), the processing from step S503 is repeated. For example, when the next target image is input to the target image input means 412, the target image input means 412 stores the target image (step S503), and steps S504 to S506 are performed on the target image. In the case where the target image on which steps S504 to S506 are performed is the last target image (e.g. in the case where there is no input of the next target image), the blended image generation means 1003 generates a blended image in the same way as in Exemplary Embodiment 4 with reference to the information of the pixel corresponding to the unsuitable area in each target image, and outputs the blended image to the image output means 420.

In the loop processing of step S503 to S507, each time the processing goes to step S505*a*, the acceptable area calculation means 1204 calculates the parameter indicating the acceptable area for each pixel in the reference image, and the unsuitable area extraction means 406 performs the determination in step S506 using the parameter. This makes it unnecessary to store the parameter indicating the acceptable area, so that a memory for storing the acceptable area can be saved.

In this exemplary embodiment as in Exemplary Embodiment 4, it is possible to prevent a situation where an area with a large pixel value variance in an image tends to be determined as a local area (unsuitable area) that does not conform to the change indicated by the assumed geometric deformation model. This contributes to high-resolution of the generated blended image. In addition, the parameter indicating the acceptable area is calculated repeatedly for each target image, which makes it unnecessary to store the parameter indicating the acceptable area. Since only the information of the maximum variance pixel needs to be stored, a reduction in memory amount can be achieved.

In Exemplary Embodiment 5, the unsuitable area determination means 402*d* may have a structure that includes the reference high-resolution image generation means 608 described in Exemplary Embodiment 2, where the maximum variance pixel calculation means 1208 specifies the maximum variance pixel for each pixel in the reference high-resolution image. In this case, the acceptable area calculation means 1204 calculates the parameter indicating the acceptable area for each pixel in the reference high-resolution image in step S505*a*.

Moreover, the unsuitable area determination means 402*d* may include the used image generation means 807 described in Exemplary Embodiment 3, where the used image generation means 807 replaces a pixel value of a pixel of an unsuitable area in each target image with a pixel value of a relative pixel in the reference image. The resulting target image no longer has an unsuitable area. Hence, the blended image generation means 1003 generates the blended image, by calculating a mean pixel value of relative pixels in the reference image and each target image and setting the mean pixel value as a pixel value in the blended image.

Though Exemplary Embodiment 5 describes a structure in the case of generating the blended image, each of Exemplary Embodiments 1 to 3 may also have a structure in which the maximum variance pixel calculation means 1208 and the acceptable area calculation means 1204 are included instead of the acceptable area calculation means 404 or 404*a*, where merely the maximum variance pixel is specified when the reference image is input, and the acceptable area for each pixel is calculated in the loop processing for each target image. A reduction in memory amount can be achieved in this case, too.

In Exemplary Embodiments 3 to 5, too, the feature value such as the value obtained by differentiating the pixel value of each pixel in the x direction or the y direction may be used as the element of the vector $x_{ki}$, as described in Exemplary Embodiment 1.

Moreover, in Exemplary Embodiments 3 to 5, too, the acceptable area may be calculated not for the reference image but for the target image, as described in Exemplary Embodiment 1. Alternatively, the acceptable area (Ra) may be calculated for each pixel in the reference image and the acceptable area (Rb) for each pixel in the target image, where the unsuitable area extraction means 406 determines whether or not the pixel in the target image is a pixel of an unsuitable area using the acceptable areas Ra and Rb calculated respectively for the reference image and the target image.

In each of Exemplary Embodiments 1 to 5, the image processing system may have a structure that does not include the image reconstruction means 403 or 403*b* or the blended image generation means 1003 and the image output means 420, and does not generate the reconstructed image or the blended image. Even in such a structure, it is possible to determine, for each pixel in the target image, whether or not the pixel is a local area that does not conform to the change indicated by the assumed geometric deformation model, with high accuracy. In this case, the reconstructed image or the blended image may be generated by another device.

Exemplary Embodiment 6

In each of Exemplary Embodiments 1 to 5, in the case of determining whether or not a pixel in a target image is a pixel of an unsuitable area, an ellipsoid relating to a pixel in a reference image relative to the pixel in the target image is used. Alternatively, in the case of determining whether or not a pixel in a target image is a pixel of an unsuitable area, a value indicating a degree of whether positions in the color space relating to a plurality of pixels in the target image are respectively in or outside ellipsoids in the color space relating to pixels in the reference image relative to the plurality of pixels may be calculated, with the determination of whether or not the pixel in the target image is a pixel of an unsuitable area being performed based on the calculated value. The following describes an exemplary embodiment of performing such determination for each pixel in the target image, as Exemplary Embodiment 6.

Figure 17:
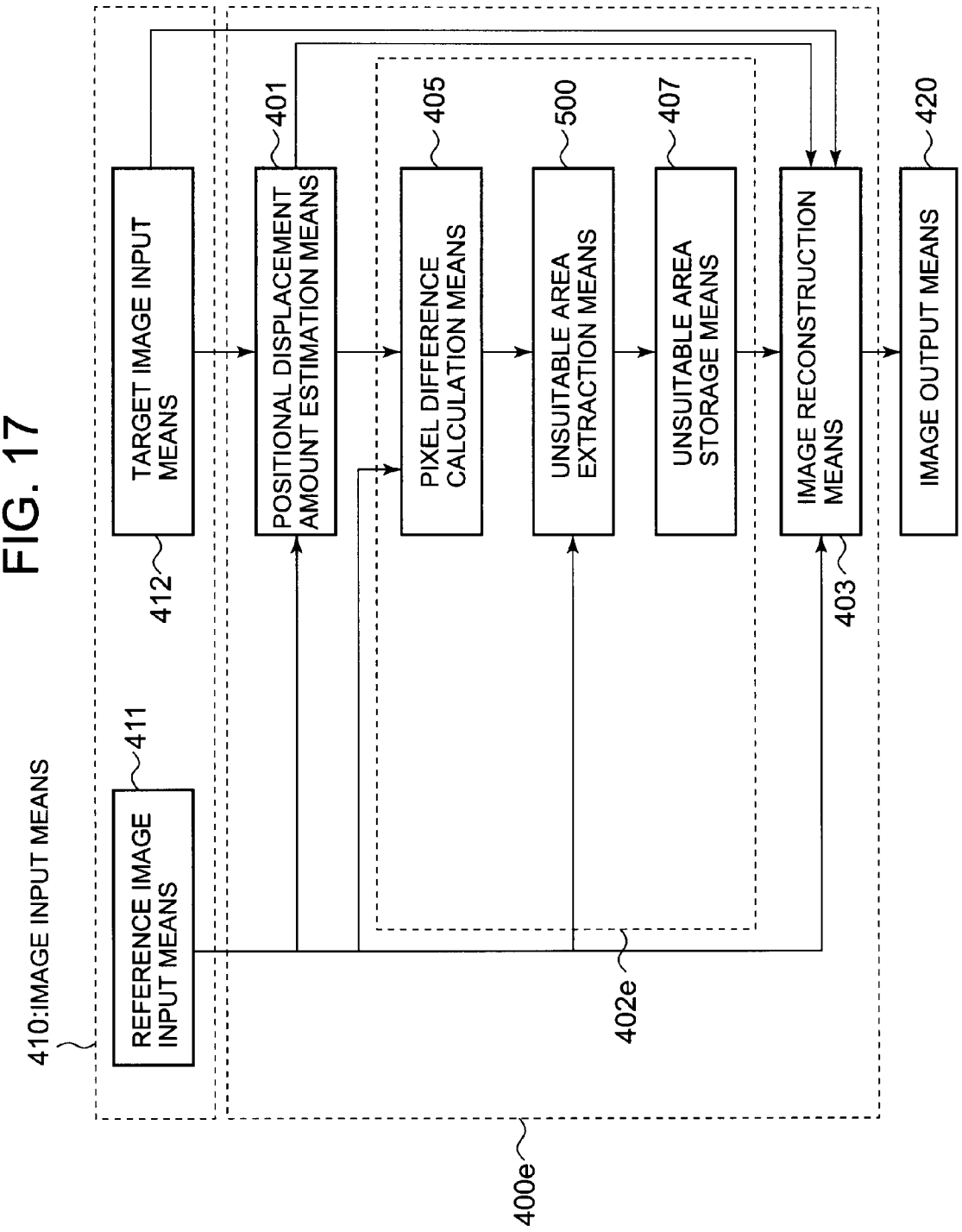
FIG. 17 is a block diagram showing an example of an image processing system in Exemplary Embodiment 6 of the present invention.

FIG. 17 is a block diagram showing an example of an image processing system in Exemplary Embodiment 6 of the present invention. The same components as those in Exemplary Embodiment 1 are given the same reference signs as in FIG. 1, and their detailed description is omitted. The image processing system in Exemplary Embodiment 6 includes a computer 400*e* that operates under program control, the image input means 410, and the image output means 420. The computer 400*e* includes the positional displacement amount estimation means 401, unsuitable area determination means 402*e*, and the image reconstruction means 403.

The unsuitable area determination means 402*e* includes the pixel difference calculation means 405, unsuitable area extraction means 500, and the unsuitable area storage means 407, and determines whether or not a pixel in the target image corresponds to an unsuitable area.

The pixel difference calculation means 405 is the same as the pixel difference calculation means 405 in Exemplary Embodiment 1, and calculates a differential vector (relative pixel differential vector) of relative pixels between the reference image and the target image.

The unsuitable area storage means 407 is the same as the unsuitable area storage means 407 in Exemplary Embodiment 1.

The unsuitable area extraction means 500 determines, for each individual pixel in the target image, whether or not the pixel is a pixel of an unsuitable area. When performing this determination for each individual pixel in the target image, the unsuitable area extraction means 500 calculates, using the relative pixel differential vector, a value (hereafter referred to as a determination index value) indicating a degree of whether positions in the color space relating to a plurality of pixels in the target image are respectively in or outside ellipsoids in the color space relating to pixels in the reference image corresponding to the plurality of pixels, and determines whether or not the pixel in the target image is a pixel of an unsuitable area based on the determination index value.

The positional displacement amount estimation means 401, the pixel difference calculation means 405, and the unsuitable area extraction means 500 are realized, for example, by a CPU operating according to a program. Alternatively, each of the means may be realized by a dedicated circuit.

The following describes a parameter indicating an ellipsoid in the color space relating to a pixel in the reference image, for ease of explanation. In this exemplary embodiment, it is supposed that the reference image and the target image are represented in the YUV format. This ellipsoid is the same as the ellipsoid calculated as the acceptable area in Exemplary Embodiment 1. In Exemplary Embodiment 6, however, the area used as the determination area is not one ellipsoid relating to one pixel in the reference image. Let i be an arbitrary pixel in the reference image, and $x_{1i}=(Y_{1i}, U_{1i}, V_{1i})^t$ be a vector whose element is a pixel value of the pixel i. This being the case, an ellipsoid in the color space relating to the pixel i is given by a matrix A in the following Expression (3).

Expression (3)

$$A = \frac{1}{\sigma^2}I + \left(\frac{1}{2d^2} - \frac{1}{2\sigma^2}\right)\frac{\Delta x_{1i} \cdot \Delta x_{1i}^t}{\|\Delta x_{1i}\|^2} \quad \text{[Math. 3]}$$

σ in Expression (3) is a radius of an axis direction of the ellipsoid other than a rotational axis. In the ellipsoid shown as an example in FIG. 2, σ is the minor-axis radius of the ellipsoid. σ is set beforehand as a constant. I is a unit matrix of the same number of rows and the same number of columns as the dimensions of the color space. In this exemplary embodiment, I is a 3×3 unit matrix. $\Delta x_{1i}$ in Expression (3) is a maximum variance vector of the pixel i in the reference image. That is, $\Delta x_{1i}$ is a vector having a largest magnitude among differential vectors obtained by subtracting the vector indicated by the pixel value of the pixel i respectively from vectors indicated by pixel values of surrounding eight pixels adjacent to the pixel i.

d in Expression (3) is a central axis radius of the ellipsoid. In the ellipsoid shown as an example in FIG. 2, d is the major-axis radius of the ellipsoid. d is the magnitude of the maximum variance vector $\Delta x_{1i}$ of the pixel i. Note that an upper limit $d_{max}$ of the central axis radius is set beforehand as a constant. Though the magnitude of $\Delta x_{1i}$ is set to d, $d=d_{max}$ if $\Delta x_{1i} > d_{max}$. Moreover, the central axis radius is set to be not smaller than a radius of other axis directions. Therefore, in the case where the magnitude of the maximum variance vector $\Delta x_{1i}$ is smaller than σ, the central axis radius d=σ.

The following describes an operation. It is supposed here that the first image input to the image input means 410 is input to the reference image input means 411 as a reference image, and the second and subsequent images are input to the target image input means 412 each as a target image. It is also supposed that the reference image and the target images are represented in the YUV format. The image processing system performs the following processing for each target image. In the following description, the target image of interest that is to be processed is referred to as a k-th input image (k≥2).

The positional displacement amount estimation means 401 calculates a positional displacement amount of the target image from the reference image with subpixel accuracy, using a pixel value $x_i$ in the reference image which is the first input image and a pixel value $x_k$ in the target image. k denotes the ordinal position of the target image among all input images. The positional displacement amount estimation means 401 can be regarded as calculating at which position coordinates in the reference image each pixel in the target image is situated. When estimating the positional displacement amount, the positional displacement amount estimation means 401 performs the calculation using, for example, a projective transformation model which is a deformation model assuming a uniform deformation. In the case where a positional displacement amount of an area of the most part of the image can be represented by the uniform deformation, it is possible to estimate the positional displacement amount for the area with a small error. The positional displacement amount estimation means 401 stores the estimated positional displacement amount.

Next, the pixel difference calculation means 405 specifies a pixel in the reference image nearest a pixel in the k-th target image of interest, based on the calculated positional displacement amount. Let j be the pixel in the target image, and $x_{kj}$ be a vector indicated by a pixel value of the pixel j. Let i be the pixel in the reference image determined to be nearest the pixel j, and $x_{1i}$ be a vector indicated by a pixel value of the pixel i.

The pixel difference calculation means 405 relates the pixel i to the pixel j. The pixel difference calculation means 405 then calculates a vector $\Delta x(k, i, j)=x_{kj}-x_{1i}$, as a differential vector between the pixel j and the pixel i. The pixel difference calculation means 405 equally relates each pixel in the target image to each pixel in the reference image, and calculates the differential vector.

Next, the unsuitable area extraction means 500 determines whether or not the pixel j in the target image is a pixel of an unsuitable area, based on the determination index value. The determination index value is a value indicating a degree of whether positions in the color space relating to a plurality of pixels in the target image are respectively in or outside ellipsoids in the color space relating to pixels in the reference image relative to the plurality of pixels. A smaller determination index value means a greater degree to which the positions in the color space relating to the plurality of pixels in the target image are in the respective ellipsoids. The plurality of pixels in the target image include the pixel j itself. The plurality of pixels are a plurality of pixels centered on the pixel j. Though this exemplary embodiment describes an example where all pixels in the target image are used as the plurality of pixels in the target image, only the pixels within a predetermined distance threshold from the pixel j that is subject to the determination may be used as the plurality of pixels in the target image.

In detail, the unsuitable area extraction means 500 obtains a determination index value $D_1$ by performing calculation shown as an example in the following Expression (4).

Expression (4)

$$D_1 = \sum_{j'} F(j, j') \cdot C(k, i', j') \quad \text{[Math. 4]}$$

In Expression (4), j' is a pixel selected from the target image of interest (the k-th input image), and i' is a pixel in the reference image relative to the pixel j' in the target image. That is, the unsuitable area extraction means 500 selects each individual pixel from the target image, calculates $F(j, j') \cdot C(k, i', j')$ for each selected pixel, and sets a total sum of the calculation results as the determination index value $D_1$.

C(k, i', j') in Expression (4) is given by the following Expression (5).

[Math. 5]

$$C(k,i',j')=(\delta x(k,i',j'))^t A \delta x(k,i',j') \quad \text{Expression (5)}$$

C(k, i', j') can be regarded as a value indicating whether a position in the color space relating to the pixel j' is in or outside an ellipsoid in the color space relating to a pixel in the reference image relative to the pixel j'.

For example, when the reference image is input, the unsuitable area extraction means 500 calculates and stores the matrix A for each pixel in the reference image beforehand. Calculating the matrix A means defining the ellipsoid. When the reference image is input, the unsuitable area extraction means 500 may select the pixels in the reference image one by one, calculate an adjacent pixel differential vector which is a differential vector of respective vectors of the selected pixel and each of its surrounding pixels, specify a maximum variance vector which is the adjacent pixel differential vector having a largest magnitude, and calculate the matrix A using the maximum variance vector. The unsuitable area extraction means 500 then stores the matrix A calculated for each pixel in the reference image.

F(j, j') in Expression (4) is a weighting factor according to a positional relation (distance) between the pixel j, which is subject to the determination of whether or not the pixel is a pixel of an unsuitable area, and the pixel j'. For instance, the weighting factor F(j, j') may be set to be larger when the distance between the pixels j and j' is smaller. As an example, F(j, j') may be defined as the following Expression (6).

Expression (6)

$$F(j, j') = \frac{1}{2\pi\varepsilon} c \times p\left(-\frac{R_{j,j'}^2}{2\varepsilon^2}\right) \qquad [\text{Math. 6}]$$

In Expression (6), $R_{j,j'}$ is the distance between the pixels j and j'. Moreover, $\varepsilon$ in Expression (6) is a parameter for adjusting F(j, j'). A larger $\varepsilon$ yields a larger F(j, j'), even in the case where the distance ($R_{j,j'}$) between the pixels j and j' is large.

As another example, F(j, j') may be defined as the following Expression (7).

Expression (7)

$$F(j, j') = \begin{cases} 1/R_0^2 & (\text{when } R_{j,j'} < R_0) \\ 0 & (\text{when } R_{j,j'} \geq R_0) \end{cases} \qquad [\text{Math. 7}]$$

According to Expression (7), the weighting factor F(j, j') is 0 in the case where the distance ($R_{j,j'}$) between the pixels j and j' is not smaller than $R_0$, and the weighting factor F(j, j') is $1/R_0^2$ in the case where the distance $R_{j,j'}$ is smaller than $R_0$. $R_0$ is a distance defining a boundary between a range where the weighting factor is 0 and a range where the weighting factor is not 0.

Having obtained the determination index value $D_1$ through the calculation of Expression (4), the unsuitable area extraction means 500 compares the determination index value $D_1$ with a predetermined threshold. If $D_1$ is larger than the threshold, the unsuitable area extraction means 500 determines that the pixel j in the target image is a pixel of an unsuitable area. If $D_1$ is not larger than the threshold, on the other hand, the unsuitable area extraction means 500 determines that the pixel j in the target image is not a pixel of an unsuitable area.

The unsuitable area extraction means 500 performs the above-mentioned determination on each pixel in the target image, and stores the pixel determined as the pixel of the unsuitable area in the unsuitable area storage means 407.

After completing the determination process for each pixel in one target image, the image processing system repeats the same processing for the next target image. After completing the determination process for all target images, the image reconstruction means 403 reconstructs an image.

In this exemplary embodiment, too, the same advantageous effects as Exemplary Embodiment 1 can be attained.

Though the above describes the case where $D_1$ calculated by Expression (4) is used as the determination index value, the determination index value may be calculated by a calculation method other than Expression (4). For instance, the unsuitable area extraction means 500 may obtain $D_2$ through calculation of the following Expression (8), and set $D_2$ as the determination index value.

Expression (8)

$$D_2 = \max_{j'}[F(j, j') \cdot C(k, i', j')] \qquad [\text{Math. 8}]$$

Expression (8) indicates that a largest value of F(j, j')·C(k, i', j') calculated for each pixel in the target image is set as $D_2$. In the case of finding the determination index value $D_2$ in such a way, too, the unsuitable area extraction means 500 compares $D_2$ with a predetermined threshold, determines the pixel j as a pixel of an unsuitable area if $D_2$ is larger than the threshold, and determines the pixel j as not a pixel of an unsuitable area if $D_2$ is not larger than the threshold.

The above describes the case where the unsuitable area extraction means 500 calculates and stores the matrix A (in other words, the ellipsoid) for each pixel in the reference image beforehand. However, instead of calculating and storing the matrix A itself beforehand, the maximum variance pixel for each pixel in the reference image may be stored beforehand. In the case, when determining, for each individual target image, whether or not a pixel in the target image is a pixel of an unsuitable area, the maximum variance pixel is referenced to calculate the matrix A. When calculating the matrix A, the pixels in the reference image are selected one by one, the adjacent pixel differential vector is calculated from the selected pixel and the maximum variance pixel of the selected pixel, and the matrix A is calculated using the adjacent pixel differential vector. Thus, by storing the maximum variance pixel for each pixel in the reference image upon input of the reference image and calculating, for each target image, the matrix A relating to each pixel in the reference image, the same advantageous effects as Exemplary Embodiment 5 can be attained.

In Exemplary Embodiment 6, the unsuitable area determination means 402e may include the reference high-resolution image generation means 608 (see FIG. 6) as in Exemplary Embodiment 2, where the reference high-resolution image generation means 608 generates the reference high-resolution image. The pixel difference calculation means 405 and the unsuitable area extraction means 500 then perform the same processing as described above, using the reference high-resolution image and the target image. This produces the same advantageous effects as Exemplary Embodiment 2.

In Exemplary Embodiment 6, the computer 400e may have a structure that includes the used image generation means 807 and the image reconstruction means 403b described in Exemplary Embodiment 3, instead of the unsuitable area storage means 407 and the image reconstruction means 403. This produces the same advantageous effects as Exemplary Embodiment 3.

In Exemplary Embodiment 6, the computer 400e may have a structure that includes the blended image generation means 1003 described in Exemplary Embodiment 4, instead of the image reconstruction means 403. This produces the same advantageous effects as Exemplary Embodiment 4.

Various modifications described in each of Exemplary Embodiments 1 to 5 may be applied to Exemplary Embodiment 6. For example, in Exemplary Embodiment 6, too, the target image resolution increasing means for increasing the resolution of the target image by interpolation may be provided. In this case, the pixel difference calculation means 405 specifies a pixel nearest a pixel position in the reference image from among pixels in the image obtained by correcting the target image of the increased resolution so as to resolve the positional displacement, thereby relating the pixel in the target image of the increased resolution to the pixel in the reference image. The pixel difference calculation means 405 then calculates the relative pixel differential vector of the relative pixels.

Example

The following describes an example according to the present invention, with reference to FIG. 1. This example corresponds to Exemplary Embodiment 1.

In this example, a video capture board capable of input and output of a NTSC (National Television System Committee) signal is used as the image input means 410, a display device is used as the image output means 420, and an image processing board including an image processor is used as the computer 400. The video capture board converts an input video signal to a YUV signal, and sends the YUV signal to the image processing board. Moreover, when a processing result of the image processing board is transferred, the video capture board converts the processing result to a video signal, and displays the video signal on the display device. Thus, in this example, the processing result of the image processing board is transferred to the video capture board, and the video capture board displays the image on the display device.

The image processing board includes the positional displacement amount estimation means 401, the unsuitable area determination means 402 (the acceptable area calculation means 404, the pixel difference calculation means 405, the unsuitable area extraction means 406, and the unsuitable area storage means 407), and the image reconstruction means 403.

When an input signal of a reference image is input to the reference image input means 411, the reference image input means 411 stores the input value. In this example, it is supposed that the first one of a plurality of input images is the reference image. It is also supposed that the reference image and each target image are represented in the YUV format. The acceptable area calculation means 404 selects the pixels in the reference image one by one. Let i be the selected pixel, and $x_{1i}=(Y_{1i}, U_{1i}, V_{1i})^t$ be a vector whose element is a pixel value of the pixel i. In this example, the acceptable area calculation means 404 calculates a parameter indicating an acceptable area, as the matrix A given by the above-mentioned Expression (3).

σ in Expression (3) is a radius of an axis direction of an ellipsoid as the acceptable area other than a rotational axis. In the example shown in FIG. 2, σ is the minor-axis radius of the ellipsoid. σ is set beforehand as a constant. I is a unit matrix of the same number of rows and the same number of columns as the dimensions of the color space. In this example, the color space is a three-dimensional space of Y, U, and V, so that I is a 3×3 unit matrix. $\Delta x_{1i}$ in Expression (3) is a maximum variance vector of the pixel i selected from the reference image. That is, $\Delta x_{1i}$ is a vector having a largest magnitude among differential vectors obtained by subtracting the vector indicated by the pixel value of the pixel i respectively from vectors indicated by pixel values of surrounding eight pixels adjacent to the pixel i.

d in Expression (3) is a central axis radius of the ellipsoid as the acceptable area. In the example shown in FIG. 2, d is the major-axis radius of the ellipsoid. d is the magnitude of the maximum variance vector $\Delta x_{1i}$ of the pixel i. Note that an upper limit $d_{max}$ of the central axis radius is set beforehand as a constant. Though the acceptable area calculation means 404 sets the magnitude of is set to be not smaller than a radius of other axis directions. Therefore, in the case where the magnitude of the maximum variance vector $\Delta x_{1i}$ is smaller than σ, the acceptable area calculation means 404 sets the central axis radius d=σ.

When a target image is input to the target image input means 412, the positional displacement amount estimation means 401 calculates a positional displacement amount of the target image from the reference image with subpixel accuracy, using a pixel value $x_i$ in the reference image which is the first input image and a pixel value $x_k$ in the target image. k denotes the ordinal position of the target image among all input images. The positional displacement amount estimation means 401 can be regarded as calculating at which position coordinates in the reference image each pixel in the target image is situated. When estimating the positional displacement amount, the positional displacement amount estimation means 401 performs the calculation using, for example, a projective transformation model which is a deformation model assuming a uniform deformation. In the case where a positional displacement amount of an area of the most part of the image can be represented by the uniform deformation, it is possible to estimate the positional displacement amount for the area with a small error. The positional displacement amount estimation means 401 stores the estimated positional displacement amount.

Next, the pixel difference calculation means 405 specifies a pixel in the reference image nearest a pixel in the k-th target image of interest, based on the calculated positional displacement amount. Let j be the pixel in the target image, and $x_{kj}$ be a vector indicated by a pixel value of the pixel j. Let i be the pixel in the reference image determined to be nearest the pixel j, and $x_{1i}$ be a vector indicated by a pixel value of the pixel i. The pixel difference calculation means 405 relates the pixel i to the pixel j. The pixel difference calculation means 405 then calculates a vector $\delta x(k, i, j)=x_{kj}-x_{1i}$, as a differential vector between the pixel j and the pixel i. The pixel difference calculation means 405 equally relates each pixel in the target image to each pixel in the reference image, and calculates the differential vector.

The unsuitable area extraction means 406 determines, for each pixel in the target image, whether or not the pixel in the target image corresponds to an unsuitable area, using the parameter A for the pixel in the reference image relative to the pixel and the differential vector $\delta x(k, j)$ calculated by the pixel difference calculation means 405. Here, the unsuitable area extraction means 406 may determine whether or not a position in the color space indicated by the pixel value of the pixel j in the target image is outside the acceptable area of the relative pixel i. In detail, the unsuitable area extraction means 406 calculates C(k, i, j) given by the following Expression (9), and determines whether or not C(k, i, j) is larger than a threshold. The threshold may be set beforehand.

[Math. 9]

$$C(k,i,j)=(\delta x(k,i,j))^t A \delta x(k,i,j) \qquad \text{Expression (9)}$$

If C(k, i, j) is larger than the threshold, the unsuitable area extraction means 406 determines that the position in the color space indicated by the pixel value of the pixel j in the target image is outside the acceptable area of the relative pixel i in the reference image, and therefore the pixel j is a pixel of an unsuitable area. If C(k, i, j) is not larger than the threshold, on the other hand, the unsuitable area extraction means 406 determines that the position in the color space indicated by the pixel value of the pixel j in the target image is in the acceptable area of the relative pixel i in the reference image, and therefore the pixel j is a pixel of a suitable area.

The unsuitable area extraction means 406 stores information specifying the pixel of the unsuitable area, in the unsuitable area storage means 407. In this example, the unsuitable area extraction means 406 defines an N×N diagonal matrix in the following manner, and stores the diagonal matrix in the unsuitable area storage means 407, where N is the number of pixels in the target image. In the case of determining that the j-th pixel in the target image of interest (the k-th input image) is an unsuitable area, the unsuitable area extraction means 406 sets the j-th diagonal component of the N×N diagonal matrix to 0. In the case of determining that the j-th pixel in the target image of interest (the k-th input image) is a suitable area, the unsuitable area extraction means 406 sets the j-th diagonal component to 1. The N×N diagonal matrix defined in this manner corresponds to the matrix $S_k$ in Expression (1).

Figure 18:
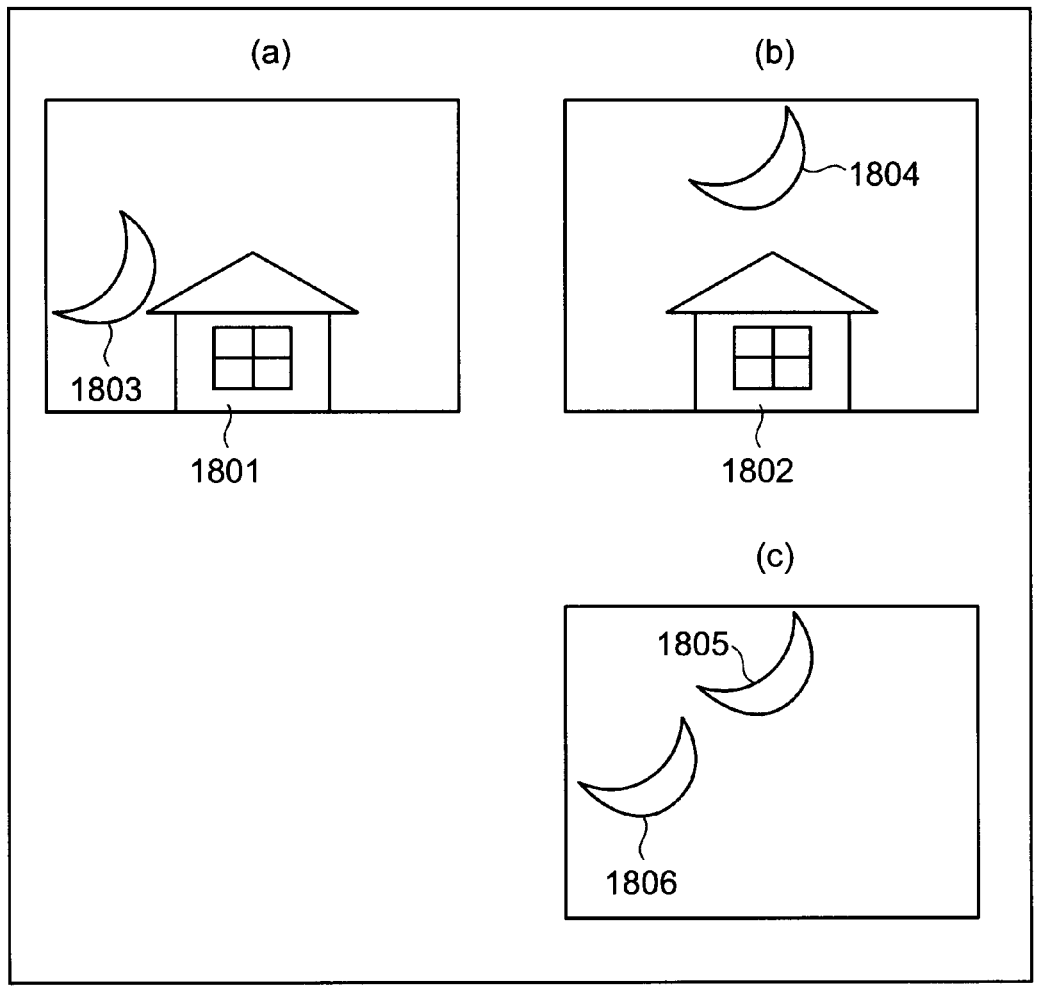
FIG. 18 is an explanatory diagram showing an example of an unsuitable area.

FIG. 18 is an explanatory diagram showing an example of an unsuitable area. FIG. 18(*a*) shows a reference image, and FIG. 18(*b*) shows a target image. Houses 1801 and 1802 captured in the reference image and the target image are stationary objects, and areas representing the houses conform to the transformation according to the projective transformation model assumed in the positional displacement amount estimation means 401. Moons 1803 and 1804 captured in the reference image and the target image change in position with time, and do not conform to the projective transformation model. This being the case, C(k, i, j) calculated for a pixel in the area 1804 of the moon and a pixel in an area relative to the area 1803 has a large value not less than a fixed value, and so each area is determined as an unsuitable area. Hence, among areas in the target image, pixels in areas 1805 and 1806 shown in FIG. 18(*c*) are each determined as an unsuitable area. The unsuitable area extraction means 406 defines the matrix ($S_k$) in which diagonal components relative to the pixels in the areas 1805 and 1806 in the target image are set to 0 and diagonal components relative to the other pixels in the target image are set to 1, and stores the matrix in the unsuitable area storage means 407.

Alternatively, the unsuitable area extraction means 406 may define the following value, as the j-th diagonal component of this matrix.

[Math. 10]

$$\sqrt{\exp[-\beta C(k,i,j)]}$$

C(k, i, j) is a value obtained as a result of the calculation of Expression (9) for the j-th pixel in the k-th target image. β is a parameter indicating to what degree the value of C(k, i, j) is reflected on the diagonal component of the matrix $S_k$, and is a predetermined constant. The diagonal component resulting from the above calculation using C(k, i, j) and β represents a reliability level of the j-th pixel being a suitable area.

After the diagonal matrix ($S_k$) is stored for each input target image, the image reconstruction means 403 generates a high-resolution image using the estimated positional displacement amount calculated by the positional displacement amount estimation means 401 and the diagonal matrix $S_k$ for each target image. The image reconstruction means 403 may generate the high-resolution image by finding such a matrix T that minimizes the evaluation function E[T] in Expression (1). Lastly, the image reconstruction means 403 sends the generated high-resolution image to the image output means 420 to display the high-resolution image.

In the case where the reference image and the target image are images in the YUV format, a 3×3 unit is used as the unit matrix I in Expression (3), and the matrix A of 3×3 is calculated. Subsequently, the calculation of the 3×3 matrix and the three-dimensional vector is performed in Expression (9). In the case where the reference image and the target image are represented in a color space other than three-dimensional, such as a multispectral image or a hyperspectral image, the unit matrix I corresponding to the dimensions of the color image is used in Expression (3). That is, in the case where a pixel has r pixel values, the calculation of Expression (3) is performed using the unit matrix I of r×r.

Figure 19:
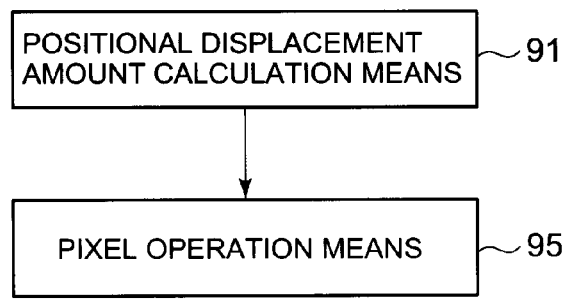
FIG. 19 is a block diagram showing a minimum structure according to the present invention.
Figure 20:
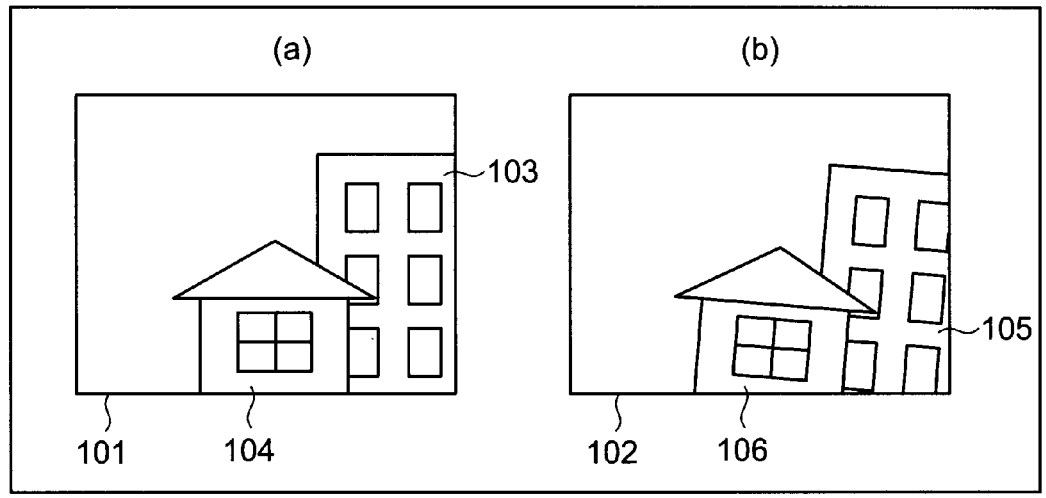
FIG. 20 is an explanatory diagram showing an example of an image that is subject to positional displacement amount estimation.
Figure 21:
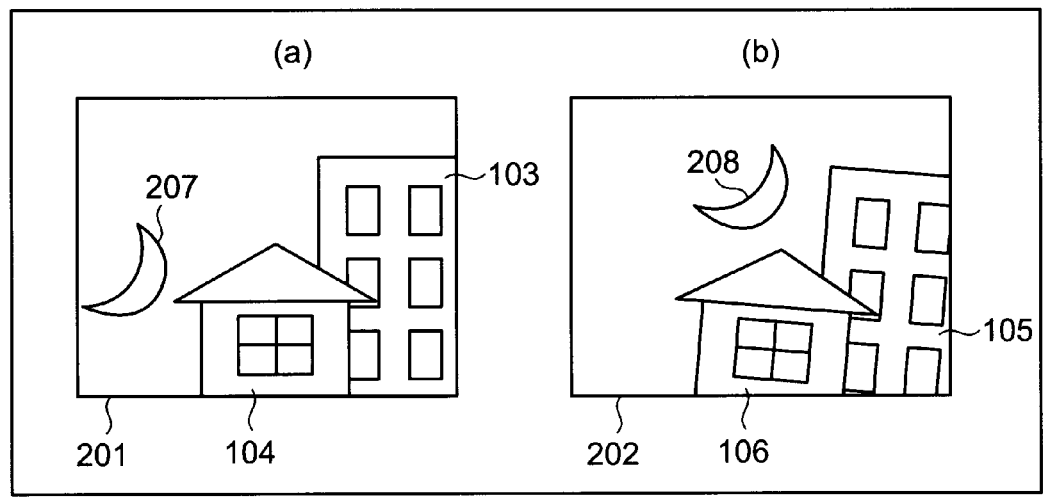
FIG. 21 is a diagram showing an image in the case where not only a building and a house shown in FIG. 20 but also the moon is captured as a subject.
Figure 22:
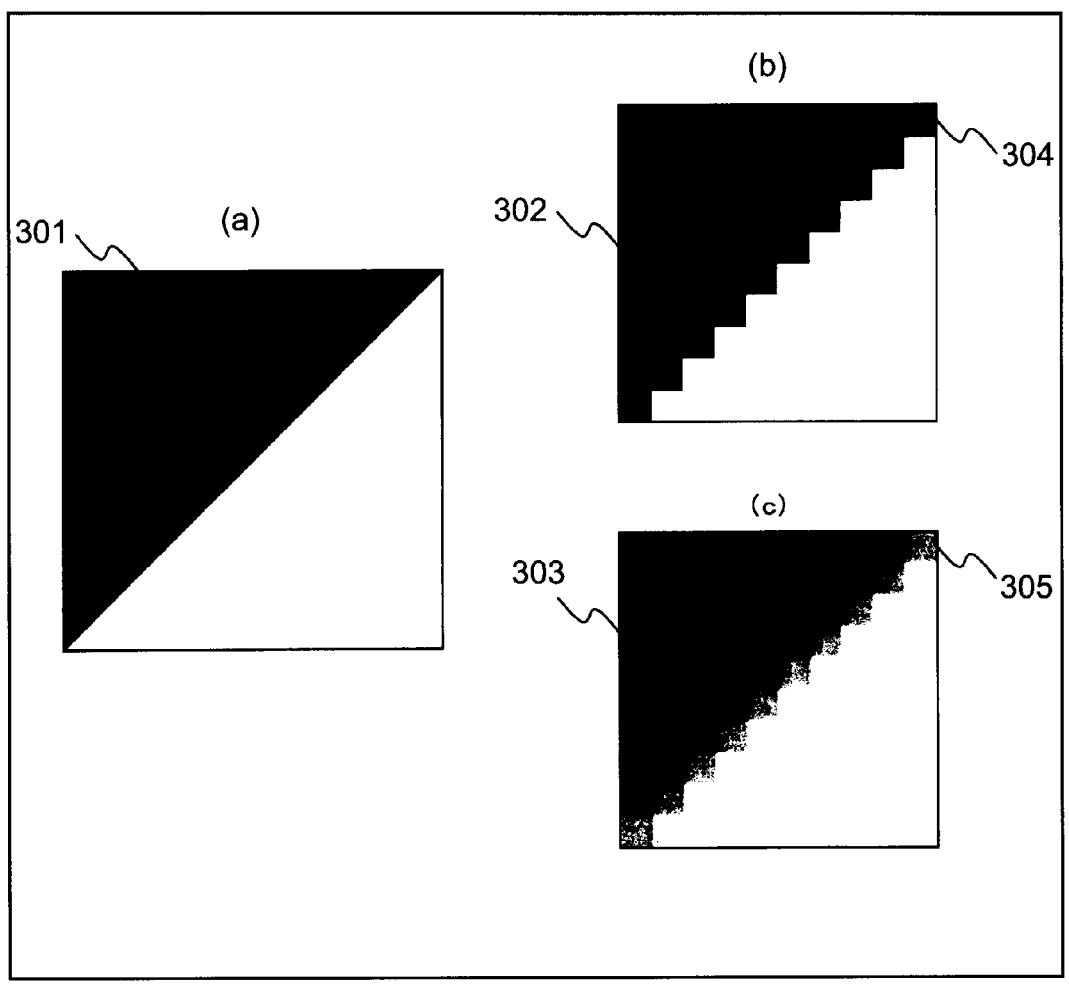
FIG. 22 is an explanatory diagram showing an example of a large pixel value variance of corresponding pixels.

The following describes a minimum structure according to the present invention. FIG. 19 is a block diagram showing the minimum structure according to the present invention. An image processing system according to the present invention includes positional displacement amount calculation means 91 and pixel operation means 95.

The positional displacement amount calculation means 91 (e.g. the positional displacement amount estimation means 401) calculates a positional displacement amount in a positional displacement between a target image and a reference image, the target image being an image that is subject to determination of whether or not a local area that does not conform to an assumed change with respect to the reference image is present.

The pixel operation means 95 (e.g. the unsuitable area determination means 402, 402*a*, 402*b*, 402*d*, 402*e*) relates a pixel in the target image to a pixel in the reference image by specifying the pixel in the reference image nearest a position of the pixel in the target image when the target image is corrected so as to resolve the positional displacement, calculates a relative pixel differential vector which is a differential vector of respective vectors of the relative pixels, and determines whether or not the pixel in the target image is a pixel of the local area, based on the relative pixel differential vector and an ellipsoid in a predetermined space, the ellipsoid relating to the pixel in the reference image.

According to such a structure, it is possible to prevent a situation where an area with a large pixel value variance in an image tends to be determined as a local area that does not conform to the assumed change.

The above exemplary embodiments also disclose a structure in which the image operation means includes: determination area specification means (e.g. the acceptable area calculation means 404, 404*a*, or the maximum variance pixel calculation means 1208 and the acceptable area calculation means 1204) for specifying, as the ellipsoid in the predetermined space (e.g. color space), a determination area (e.g. acceptable area) for determining whether or not the pixel in the target image relative to the pixel in the reference image is the pixel of the local area; difference calculation means (e.g. the pixel difference calculation means 405, 405*a*) for relating the pixel in the target image to the pixel in the reference image by specifying the pixel in the reference image nearest the position of the pixel in the target image when the target image is corrected so as to resolve the positional displacement between the target image and the reference image, and calculating the relative pixel differential vector which is the differential vector of the respective vectors of the relative pixels; and local area determination means (e.g. the unsuitable area extraction means 406) for determining, for each pixel in the target image, whether or not a position in the space of the pixel in the target image is outside the determination area of the pixel in the reference image relative to the pixel, using the relative pixel differential vector, to thereby determine whether or not the pixel in the target image is the pixel of the local area.

The above exemplary embodiments also disclose a structure in which when the reference image is input, the determination area specification means selects pixels in the reference image one by one, calculates an adjacent pixel differential vector which is a differential vector of respective vectors of the selected pixel and each surrounding pixel of the selected pixel, specifies a maximum variance vector which is the adjacent pixel differential vector having a largest magnitude, and sets the ellipsoid defined by the magnitude and a direction of the maximum variance vector and a pixel value of the selected pixel, as the determination area.

The above exemplary embodiments also disclose a structure in which the determination area specification means includes: maximum variance pixel specification means (e.g. the maximum variance pixel calculation means 1208) for, when the reference image is input, selecting pixels in the reference image one by one, and specifying, from among surrounding pixels of the selected pixel, a maximum variance pixel that corresponds to an adjacent pixel differential vector having a largest magnitude, the adjacent pixel differential vector being a differential vector of respective vectors of the selected pixel and each surrounding pixel of the selected pixel; and determination area calculation means (e.g. the acceptable area calculation means 1204) for, when the local area determination means determines for each target image whether or not the pixel in the target image is the pixel of the local area that does not conform to the assumed change, selecting the pixels in the reference image one by one, calculating the adjacent pixel differential vector from the selected pixel and the maximum variance pixel of the selected pixel, and setting the ellipsoid defined by the magnitude and a direction of the adjacent pixel differential vector and a pixel value of the selected pixel, as the determination area. According to such a structure, an amount of memory used up to when the determination of whether or not the pixel is the local area is performed can be reduced.

The above exemplary embodiments also disclose a structure in which when the target image is input, the determination area specification means selects pixels in the target image one by one, calculates an adjacent pixel differential vector which is a differential vector of respective vectors of the selected pixel and each surrounding pixel of the selected pixel, specifies a maximum variance vector which is the adjacent pixel differential vector having a largest magnitude, and sets the ellipsoid defined by the magnitude and a direction of the maximum variance vector and a pixel value of the selected pixel, as the determination area.

The above exemplary embodiments also disclose a structure in which the image operation means (e.g. the unsuitable area determination means 402e) includes: difference calculation means (e.g. the pixel difference calculation means 405) for relating the pixel in the target image to the pixel in the reference image by specifying the pixel in the reference image nearest the position of the pixel in the target image when the target image is corrected so as to resolve the positional displacement between the target image and the reference image, and calculating the relative pixel differential vector which is the differential vector of the respective vectors of the relative pixels; and local area determination means (e.g. the unsuitable area extraction means 500) for calculating a base index value for each pixel in the target image using the relative pixel differential vector, and determining whether or not the pixel in the target image is the pixel of the local area based on the base index value, the base index value indicating a degree of whether or not positions in the predetermined space of a plurality of pixels in the target image which are centered on the pixel are respectively in or outside ellipsoids in the space relating to pixels in the reference image corresponding to the plurality of pixels.

The above exemplary embodiments also disclose a structure in which when the reference image is input, the local area determination means (e.g. the unsuitable area extraction means 500) selects pixels in the reference image one by one, calculates an adjacent pixel differential vector which is a differential vector of respective vectors of the selected pixel and each surrounding pixel of the selected pixel, specifies a maximum variance vector which is the adjacent pixel differential vector having a largest magnitude, and defines the ellipsoid according to the maximum variance vector.

The above exemplary embodiments also disclose a structure in which the local area determination means (e.g. the unsuitable area extraction means 500): selects, when the reference image is input, pixels in the reference image one by one, calculates an adjacent pixel differential vector which is a differential vector of respective vectors of the selected pixel and each surrounding pixel of the selected pixel, and specifies a maximum variance pixel that corresponds to the adjacent pixel differential vector having a largest magnitude; and selects, when determining whether or not the pixel in the target image is the pixel of the local area, the pixels in the reference image one by one, calculates the adjacent pixel differential vector from the selected pixel and the maximum variance pixel of the selected pixel, and defines the ellipsoid according to the adjacent pixel differential vector.

The above exemplary embodiments also disclose a structure comprising image generation means (e.g. the image reconstruction means 403, 403b, or the blended image generation means 1003) for generating one image from the reference image and the target image, according to information indicating where the pixel of the local area that does not conform to the assumed change is present.

The above exemplary embodiments also disclose a structure in which the image generation means (e.g. the image reconstruction means 403, 403b) generates a high-resolution image having a larger number of pixels than each of the reference image and the target image, from the reference image and the target image. According to such a structure, the local area that does not conform to the assumed change can be determined accurately, so that a reduction in image quality improvement effect in high-quality image generation can be suppressed.

The above exemplary embodiments also disclose a structure comprising pixel value replacement means (e.g. the used image generation means 807) for replacing a pixel value of the pixel in the target image determined as the pixel of the local area that does not conform to the assumed change, with a pixel value of the pixel in the reference image relative to the pixel, wherein the image generation means generates the high-resolution image, from the reference image and the target image in which the pixel value has been replaced by the pixel value replacement means. According to such a structure, the high-quality image can be generated with a smaller amount of memory.

The above exemplary embodiments also disclose a structure in which the image generation means calculates, from the reference image and the target image, a mean pixel value of the relative pixels in the reference image and the target image while excluding the pixel of the local area that does not conform to the assumed change from the calculation of the mean pixel value, and generates a blended image having the calculated mean pixel value as a pixel value. According to such a structure, the local area that does not conform to the assumed change can be determined accurately, which contributes to high-resolution of the blended image.

The above exemplary embodiments also disclose a structure comprising pixel value replacement means (e.g. the used image generation means 807) for replacing a pixel value of the pixel in the target image determined as the pixel of the local area that does not conform to the assumed change, with a pixel value of the pixel in the reference image relative to the pixel, wherein the image generation means generates a blended image having, as a pixel value, a mean pixel value of the relative pixels in the reference image and the target image, from the reference image and the target image in which the pixel value has been replaced by the pixel value replacement means. According to such a structure, the blended image of high quality can be generated with a smaller amount of memory.

The above exemplary embodiments also disclose a structure comprising reference image resolution increasing means (e.g. the reference high-resolution image generation means 608) for increasing a resolution of the reference image by interpolating the reference image, wherein the difference calculation means relates the pixel in the target image to the pixel in the reference image of the increased resolution by specifying the pixel in the reference image of the increased resolution nearest the position of the pixel in the target image when the target image is corrected so as to resolve the positional displacement, and calculates the relative pixel differential vector of the respective vectors of the relative pixels.

The above exemplary embodiments also disclose a structure comprising target image resolution increasing means for increasing a resolution of the target image by interpolating the target image, wherein the difference calculation means relates the pixel in the target image of the increased resolution to the pixel in the reference image by specifying, from among pixels in an image obtained by correcting the target image of the increased resolution so as to resolve the positional displacement, the pixel nearest a position of the pixel in the reference image, and calculates the relative pixel differential vector of the respective vectors of the relative pixels.

Note that the above exemplary embodiments disclose characteristic structures of the image processing system as shown in (1) to (15) below.

(1) An image processing system comprising: a positional displacement amount calculation unit for calculating a positional displacement amount in a positional displacement between a target image and a reference image, the target image being an image that is subject to determination of whether or not a local area that does not conform to an assumed change with respect to the reference image is present; and a pixel operation unit for relating a pixel in the target image to a pixel in the reference image by specifying the pixel in the reference image nearest a position of the pixel in the target image when the target image is corrected so as to resolve the positional displacement, calculating a relative pixel differential vector which is a differential vector of respective vectors of the relative pixels, and determining whether or not the pixel in the target image is a pixel of the local area, based on the relative pixel differential vector and an ellipsoid in a predetermined space, the ellipsoid relating to the pixel in the reference image.

(2) The image processing system wherein the image operation unit includes: a determination area specification unit for specifying, as the ellipsoid in the predetermined space, a determination area for determining whether or not the pixel in the target image relative to the pixel in the reference image is the pixel of the local area; a difference calculation unit for relating the pixel in the target image to the pixel in the reference image by specifying the pixel in the reference image nearest the position of the pixel in the target image when the target image is corrected so as to resolve the positional displacement between the target image and the reference image, and calculating the relative pixel differential vector which is the differential vector of the respective vectors of the relative pixels; and a local area determination unit for determining, for each pixel in the target image, whether or not a position in the space of the pixel in the target image is outside the determination area of the pixel in the reference image relative to the pixel, using the relative pixel differential vector, to thereby determine whether or not the pixel in the target image is the pixel of the local area.

(3) The image processing system wherein when the reference image is input, the determination area specification unit selects pixels in the reference image one by one, calculates an adjacent pixel differential vector which is a differential vector of respective vectors of the selected pixel and each surrounding pixel of the selected pixel, specifies a maximum variance vector which is the adjacent pixel differential vector having a largest magnitude, and sets the ellipsoid defined by the magnitude and a direction of the maximum variance vector and a pixel value of the selected pixel, as the determination area.

(4) The image processing system wherein the determination area specification unit includes: a maximum variance pixel specification unit for, when the reference image is input, selecting pixels in the reference image one by one, and specifying, from among surrounding pixels of the selected pixel, a maximum variance pixel that corresponds to an adjacent pixel differential vector having a largest magnitude, the adjacent pixel differential vector being a differential vector of respective vectors of the selected pixel and each surrounding pixel of the selected pixel; and a determination area calculation unit for, when the local area determination unit determines for each target image whether or not the pixel in the target image is the pixel of the local area that does not conform to the assumed change, selecting the pixels in the reference image one by one, calculating the adjacent pixel differential vector from the selected pixel and the maximum variance pixel of the selected pixel, and setting the ellipsoid defined by the magnitude and a direction of the adjacent pixel differential vector and a pixel value of the selected pixel, as the determination area.

(5) The image processing system wherein when the target image is input, the determination area specification unit selects pixels in the target image one by one, calculates an adjacent pixel differential vector which is a differential vector of respective vectors of the selected pixel and each surrounding pixel of the selected pixel, specifies a maximum variance vector which is the adjacent pixel differential vector having a largest magnitude, and sets the ellipsoid defined by the magnitude and a direction of the maximum variance vector and a pixel value of the selected pixel, as the determination area.

(6) The image processing system wherein the image operation unit includes: a difference calculation unit for relating the pixel in the target image to the pixel in the reference image by specifying the pixel in the reference image nearest the position of the pixel in the target image when the target image is corrected so as to resolve the positional displacement between the target image and the reference image, and calculating the relative pixel differential vector which is the differential vector of the respective vectors of the relative pixels; and a local area determination unit for calculating a base index value for each pixel in the target image using the relative pixel differential vector, and determining whether or not the pixel in the target image is the pixel of the local area based on the base index value, the base index value indicating a degree of whether or not positions in the predetermined space of a plurality of pixels in the target image which are centered on the pixel are respectively in or outside ellipsoids in the space relating to pixels in the reference image relative to the plurality of pixels.

(7) The image processing system wherein when the reference image is input, the local area determination unit selects pixels in the reference image one by one, calculates an adjacent pixel differential vector which is a differential vector of respective vectors of the selected pixel and each surrounding pixel of the selected pixel, specifies a maximum variance vector which is the adjacent pixel differential vector having a largest magnitude, and defines the ellipsoid according to the maximum variance vector.

(8) The image processing system wherein the local area determination unit: selects, when the reference image is input, pixels in the reference image one by one, calculates an adjacent pixel differential vector which is a differential vector of respective vectors of the selected pixel and each surrounding pixel of the selected pixel, and specifies a maximum variance pixel that corresponds to the adjacent pixel differential vector having a largest magnitude; and selects, when determining whether or not the pixel in the target image is the pixel of the local area, the pixels in the reference image one by one, calculates the adjacent pixel differential vector from the selected pixel and the maximum variance pixel of the selected pixel, and defines the ellipsoid according to the adjacent pixel differential vector.

(9) The image processing system comprising an image generation unit for generating one image from the reference image and the target image, according to information indicating where the pixel of the local area that does not conform to the assumed change is present.

(10) The image processing system wherein the image generation unit generates a high-resolution image having a larger number of pixels than each of the reference image and the target image, from the reference image and the target image.

(11) The image processing system comprising a pixel value replacement unit for replacing a pixel value of the pixel in the target image determined as the pixel of the local area that does not conform to the assumed change, with a pixel value of the pixel in the reference image relative to the pixel, wherein the image generation unit generates the high-resolution image, from the reference image and the target image in which the pixel value has been replaced by the pixel value replacement unit.

(12) The image processing system wherein the image generation unit calculates, from the reference image and the target image, a mean pixel value of the relative pixels in the reference image and the target image while excluding the pixel of the local area that does not conform to the assumed change from the calculation of the mean pixel value, and generates a blended image having the calculated mean pixel value as a pixel value.

(13) The image processing system comprising a pixel value replacement unit for replacing a pixel value of the pixel in the target image determined as the pixel of the local area that does not conform to the assumed change, with a pixel value of the pixel in the reference image relative to the pixel, wherein the image generation unit generates a blended image having, as a pixel value, a mean pixel value of the relative pixels in the reference image and the target image, from the reference image and the target image in which the pixel value has been replaced by the pixel value replacement unit.

(14) The image processing system comprising a reference image resolution increasing unit for increasing a resolution of the reference image by interpolating the reference image, wherein the difference calculation unit relates the pixel in the target image to the pixel in the reference image of the increased resolution by specifying the pixel in the reference image of the increased resolution nearest the position of the pixel in the target image when the target image is corrected so as to resolve the positional displacement, and calculates the relative pixel differential vector of the respective vectors of the relative pixels.

(15) The image processing system comprising a target image resolution increasing unit for increasing a resolution of the target image by interpolating the target image, wherein the difference calculation unit relates the pixel in the target image of the increased resolution to the pixel in the reference image by specifying, from among pixels in an image obtained by correcting the target image of the increased resolution so as to resolve the positional displacement, the pixel nearest a position of the pixel in the reference image, and calculates the relative pixel differential vector of the respective vectors of the relative pixels.

Part or whole of the above exemplary embodiments may be described as in the following supplementary notes, but are not limited to such.

(Supplementary note 1) An image processing method comprising: calculating a positional displacement amount in a positional displacement between a target image and a reference image, the target image being an image that is subject to determination of whether or not a local area that does not conform to an assumed change with respect to the reference image is present; and relating a pixel in the target image to a pixel in the reference image by specifying the pixel in the reference image nearest a position of the pixel in the target image when the target image is corrected so as to resolve the positional displacement, calculating a relative pixel differential vector which is a differential vector of respective vectors of the relative pixels, and determining whether or not the pixel in the target image is a pixel of the local area, based on the relative pixel differential vector and an ellipsoid in a predetermined space, the ellipsoid relating to the pixel in the reference image.

(Supplementary note 2) The image processing method according to supplementary note 1, specifying, as the ellipsoid in the predetermined space, a determination area for determining whether or not the pixel in the target image relative to the pixel in the reference image is the pixel of the local area, relating the pixel in the target image to the pixel in the reference image by specifying the pixel in the reference image nearest the position of the pixel in the target image when the target image is corrected so as to resolve the positional displacement between the target image and the reference image, calculating the relative pixel differential vector which is the differential vector of the respective vectors of the relative pixels, and determining, for each pixel in the target image, whether or not a position in the space of the pixel in the target image is outside the determination area of the pixel in the reference image relative to the pixel, using the relative pixel differential vector, to thereby determine whether or not the pixel in the target image is the pixel of the local area.

(Supplementary note 3) The image processing method according to supplementary note 2, when the reference image is input, selecting pixels in the reference image one by one, calculating an adjacent pixel differential vector which is a differential vector of respective vectors of the selected pixel and each surrounding pixel of the selected pixel, specifying a maximum variance vector which is the adjacent pixel differential vector having a largest magnitude, and setting the ellipsoid defined by the magnitude and a direction of the maximum variance vector and a pixel value of the selected pixel, as the determination area.

(Supplementary note 4) The image processing method according to supplementary note 2, when the reference image is input, selecting pixels in the reference image one by one, and specifying, from among surrounding pixels of the selected pixel, a maximum variance pixel that corresponds to an adjacent pixel differential vector having a largest magnitude, the adjacent pixel differential vector being a differential vector of respective vectors of the selected pixel and each surrounding pixel of the selected pixel, and when determining for each target image whether or not the pixel in the target image is the pixel of the local area that does not conform to the assumed change, selecting the pixels in the reference image one by one, calculating the adjacent pixel differential vector from the selected pixel and the maximum variance pixel of the selected pixel, and setting the ellipsoid defined by the magnitude and a direction of the adjacent pixel differential vector and a pixel value of the selected pixel, as the determination area.

(Supplementary note 5) The image processing method according to supplementary note 2, when the target image is input, selecting pixels in the target image one by one, calculating an adjacent pixel differential vector which is a differential vector of respective vectors of the selected pixel and each surrounding pixel of the selected pixel, specifying a maximum variance vector which is the adjacent pixel differential vector having a largest magnitude, and setting the ellipsoid defined by the magnitude and a direction of the maximum variance vector and a pixel value of the selected pixel, as the determination area.

(Supplementary note 6) The image processing method according to supplementary note 1, relating the pixel in the target image to the pixel in the reference image by specifying the pixel in the reference image nearest the position of the pixel in the target image when the target image is corrected so as to resolve the positional displacement between the target image and the reference image, calculating the relative pixel differential vector which is the differential vector of the respective vectors of the relative pixels, calculating a base index value for each pixel in the target image using the relative pixel differential vector, and determining whether or not the pixel in the target image is the pixel of the local area based on the base index value, the base index value indicating a degree of whether or not positions in the predetermined space of a plurality of pixels in the target image which are centered on the pixel are respectively in or outside ellipsoids in the space relating to pixels in the reference image relative to the plurality of pixels.

(Supplementary note 7) The image processing method according to supplementary note 6, when the reference image is input, selecting pixels in the reference image one by one, calculating an adjacent pixel differential vector which is a differential vector of respective vectors of the selected pixel and each surrounding pixel of the selected pixel, specifying a maximum variance vector which is the adjacent pixel differential vector having a largest magnitude, and defining the ellipsoid according to the maximum variance vector.

(Supplementary note 8) The image processing method according to supplementary note 6, selecting, when the reference image is input, pixels in the reference image one by one, calculating an adjacent pixel differential vector which is a differential vector of respective vectors of the selected pixel and each surrounding pixel of the selected pixel, and specifying a maximum variance pixel that corresponds to the adjacent pixel differential vector having a largest magnitude, and selecting, when determining whether or not the pixel in the target image is the pixel of the local area, the pixels in the reference image one by one, calculating the adjacent pixel differential vector from the selected pixel and the maximum variance pixel of the selected pixel, and defining the ellipsoid according to the adjacent pixel differential vector.

(Supplementary note 9) The image processing method according to any one of supplementary notes 1 to 8, generating one image from the reference image and the target image, according to information indicating where the pixel of the local area that does not conform to the assumed change is present.

(Supplementary note 10) The image processing method according to supplementary note 9, generating a high-resolution image having a larger number of pixels than each of the reference image and the target image, from the reference image and the target image.

(Supplementary note 11) The image processing method according to supplementary note 10, replacing a pixel value of the pixel in the target image determined as the pixel of the local area that does not conform to the assumed change, with a pixel value of the pixel in the reference image relative to the pixel, and generating the high-resolution image, from the reference image and the target image in which the pixel value has been replaced.

(Supplementary note 12) The image processing method according to supplementary note 9, calculating, from the reference image and the target image, a mean pixel value of the relative pixels in the reference image and the target image while excluding the pixel of the local area that does not conform to the assumed change from the calculation of the mean pixel value, and generating a blended image having the calculated mean pixel value as a pixel value.

(Supplementary note 13) The image processing method according to supplementary note 9, replacing a pixel value of the pixel in the target image determined as the pixel of the local area that does not conform to the assumed change, with a pixel value of the pixel in the reference image relative to the pixel, and generating a blended image having, as a pixel value, a mean pixel value of the relative pixels in the reference image and the target image, from the reference image and the target image in which the pixel value has been replaced.

(Supplementary note 14) The image processing method according to any one of supplementary notes 1 to 13, increasing a resolution of the reference image by interpolating the reference image, relating the pixel in the target image to the pixel in the reference image of the increased resolution by specifying the pixel in the reference image of the increased resolution nearest the position of the pixel in the target image when the target image is corrected so as to resolve the positional displacement, and calculating the relative pixel differential vector of the respective vectors of the relative pixels.

(Supplementary note 15) The image processing method according to any one of supplementary notes 1 to 13, increasing a resolution of the target image by interpolating the target image, relating the pixel in the target image of the increased resolution to the pixel in the reference image by specifying, from among pixels in an image obtained by correcting the target image of the increased resolution so as to resolve the positional displacement, the pixel nearest a position of the pixel in the reference image, and calculating the relative pixel differential vector of the respective vectors of the relative pixels.

(Supplementary note 16) An image processing program for causing a computer to execute: a positional displacement amount calculation process of calculating a positional displacement amount in a positional displacement between a target image and a reference image, the target image being an image that is subject to determination of whether or not a local area that does not conform to an assumed change with respect to the reference image is present; and a pixel operation process of relating a pixel in the target image to a pixel in the reference image by specifying the pixel in the reference image nearest a position of the pixel in the target image when the target image is corrected so as to resolve the positional displacement, calculating a relative pixel differential vector which is a differential vector of respective vectors of the relative pixels, and determining whether or not the pixel in the target image is a pixel of the local area, based on the relative pixel differential vector and an ellipsoid in a predetermined space, the ellipsoid relating to the pixel in the reference image.

(Supplementary note 17) The image processing program according to supplementary note 16, causing the computer to execute, in the pixel operation process: a determination area specification process of specifying, as the ellipsoid in the predetermined space, a determination area for determining whether or not the pixel in the target image relative to the pixel in the reference image is the pixel of the local area; a difference calculation process of relating the pixel in the target image to the pixel in the reference image by specifying the pixel in the reference image nearest the position of the pixel in the target image when the target image is corrected so as to resolve the positional displacement between the target image and the reference image, and calculating the relative pixel differential vector which is the differential vector of the respective vectors of the relative pixels; and a local area determination process of determining, for each pixel in the target image, whether or not a position in the space of the pixel in the target image is outside the determination area of the pixel in the reference image relative to the pixel, using the relative pixel differential vector, to thereby determine whether or not the pixel in the target image is the pixel of the local area.

(Supplementary note 18) The image processing program according to supplementary note 17, causing the computer to execute, as the determination area specification process, a process of, when the reference image is input, selecting pixels in the reference image one by one, calculating an adjacent pixel differential vector which is a differential vector of respective vectors of the selected pixel and each surrounding pixel of the selected pixel, specifying a maximum variance vector which is the adjacent pixel differential vector having a largest magnitude, and setting the ellipsoid defined by the magnitude and a direction of the maximum variance vector and a pixel value of the selected pixel, as the determination area.

(Supplementary note 19) The image processing program according to supplementary note 17, causing the computer to execute, as the determination area specification process: a maximum variance pixel specification process of, when the reference image is input, selecting pixels in the reference image one by one, and specifying, from among surrounding pixels of the selected pixel, a maximum variance pixel that corresponds to an adjacent pixel differential vector having a largest magnitude, the adjacent pixel differential vector being a differential vector of respective vectors of the selected pixel and each surrounding pixel of the selected pixel; and a determination area calculation process of, when determining for each target image whether or not the pixel in the target image is the pixel of the local area that does not conform to the assumed change in the local area determination process, selecting the pixels in the reference image one by one, calculating the adjacent pixel differential vector from the selected pixel and the maximum variance pixel of the selected pixel, and setting the ellipsoid defined by the magnitude and a direction of the adjacent pixel differential vector and a pixel value of the selected pixel, as the determination area.

(Supplementary note 20) The image processing program according to supplementary note 17, causing the computer to execute, as the determination area specification process, a process of, when the target image is input, selecting pixels in the target image one by one, calculating an adjacent pixel differential vector which is a differential vector of respective vectors of the selected pixel and each surrounding pixel of the selected pixel, specifying a maximum variance vector which is the adjacent pixel differential vector having a largest magnitude, and setting the ellipsoid defined by the magnitude and a direction of the maximum variance vector and a pixel value of the selected pixel, as the determination area.

(Supplementary note 21) The image processing program according to supplementary note 16, causing the computer to execute, in the pixel operation process: a difference calculation process of relating the pixel in the target image to the pixel in the reference image by specifying the pixel in the reference image nearest the position of the pixel in the target image when the target image is corrected so as to resolve the positional displacement between the target image and the reference image, and calculating the relative pixel differential vector which is the differential vector of the respective vectors of the relative pixels; and a local area determination process of calculating a base index value for each pixel in the target image using the relative pixel differential vector, and determining whether or not the pixel in the target image is the pixel of the local area based on the base index value, the base index value indicating a degree of whether or not positions in the predetermined space of a plurality of pixels in the target image which are centered on the pixel are respectively in or outside ellipsoids in the space relating to pixels in the reference image relative to the plurality of pixels.

(Supplementary note 22) The image processing program according to supplementary note 21, causing the computer to execute, when the reference image is input, selecting pixels in the reference image one by one, calculating an adjacent pixel differential vector which is a differential vector of respective vectors of the selected pixel and each surrounding pixel of the selected pixel, specifying a maximum variance vector which is the adjacent pixel differential vector having a largest magnitude, and defining the ellipsoid according to the maximum variance vector.

(Supplementary note 23) The image processing program according to supplementary note 21, causing the computer to execute: selecting, when the reference image is input, pixels in the reference image one by one, calculating an adjacent pixel differential vector which is a differential vector of respective vectors of the selected pixel and each surrounding pixel of the selected pixel, and specifying a maximum variance pixel that corresponds to the adjacent pixel differential vector having a largest magnitude; and selecting, when determining whether or not the pixel in the target image is the pixel of the local area, the pixels in the reference image one by one, calculating the adjacent pixel differential vector from the selected pixel and the maximum variance pixel of the selected pixel, and defining the ellipsoid according to the adjacent pixel differential vector.

(Supplementary note 24) The image processing program according to any one of supplementary notes 16 to 23, causing the computer to execute an image generation process of generating one image from the reference image and the target image, according to information indicating where the pixel of the local area that does not conform to the assumed change is present.

(Supplementary note 25) The image processing program according to supplementary note 24, causing the computer to execute, in the image generation process, generating a high-resolution image having a larger number of pixels than each of the reference image and the target image, from the reference image and the target image.

(Supplementary note 26) The image processing program according to supplementary note 25, causing the computer to execute a pixel value replacement process of replacing a pixel value of the pixel in the target image determined as the pixel of the local area that does not conform to the assumed change, with a pixel value of the pixel in the reference image relative to the pixel, and execute, in the image generation process, generating the high-resolution image, from the reference image and the target image in which the pixel value has been replaced.

(Supplementary note 27) The image processing program according to supplementary note 24, causing the computer to execute, in the image generation process, calculating, from the reference image and the target image, a mean pixel value of the relative pixels in the reference image and the target image while excluding the pixel of the local area that does not conform to the assumed change from the calculation of the mean pixel value, and generating a blended image having the calculated mean pixel value as a pixel value.

(Supplementary note 28) The image processing program according to supplementary note 24, causing the computer to execute a pixel value replacement process of replacing a pixel value of the pixel in the target image determined as the pixel of the local area that does not conform to the assumed change, with a pixel value of the pixel in the reference image relative to the pixel, and execute, in the image generation process, generating a blended image having, as a pixel value, a mean pixel value of the relative pixels in the reference image and the target image, from the reference image and the target image in which the pixel value has been replaced.

(Supplementary note 29) The image processing program according to any one of supplementary notes 16 to 28, causing the computer to execute a reference image resolution increasing process of increasing a resolution of the reference image by interpolating the reference image, and execute, in the difference calculation process, relating the pixel in the target image to the pixel in the reference image of the increased resolution by specifying the pixel in the reference image of the increased resolution nearest the position of the pixel in the target image when the target image is corrected so as to resolve the positional displacement, and calculating the relative g pixel differential vector of the respective vectors of the relative pixels.

(Supplementary note 30) The image processing program according to any one of supplementary notes 16 to 28, causing the computer to execute a target image resolution increasing process of increasing a resolution of the target image by interpolating the target image, and execute, in the difference calculation process, relating the pixel in the target image of the increased resolution to the pixel in the reference image by specifying, from among pixels in an image obtained by correcting the target image of the increased resolution so as to resolve the positional displacement, the pixel nearest a position of the pixel in the reference image, and calculating the relative pixel differential vector of the respective vectors of the relative pixels.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-036826, filed on Feb. 19, 2009, the disclosure of which is incorporated herein in its entirety by reference.

INDUSTRIAL APPLICABILITY

The present invention is applicable, for example, to a process of generating a high-resolution image or a blended image from a plurality of images.

REFERENCE SIGNS LIST 401 positional displacement amount estimation means
403 image reconstruction means
404 acceptable area calculation means
405 pixel difference calculation means
406 unsuitable area extraction means
407 unsuitable area storage means
411 reference image input means
412 target image input means
608 reference high-resolution image generation means
807 used image generation means
1003 blended image generation means
1204 acceptable area calculation means
1208 maximum variance pixel calculation means

The invention claimed is:

1. An image processing system comprising:
at least one processor, wherein the at least one processor is configured to include:
a positional displacement amount calculation unit which calculates a positional displacement amount in a positional displacement between a target image and a reference image;
a pixel operation unit which relates a pixel in the target image to a pixel in the reference image by specifying the pixel in the reference image nearest a position of the pixel in the target image when the target image is corrected so as to resolve the positional displacement, calculates a relative pixel differential vector which is a differential vector of respective vectors of the relative pixels, and determines whether or not the pixel in the target image is a pixel of a local area that does not conform to an assumed change with respect to the reference image, based on the relative pixel differential vector and an ellipsoid indicating uniform change of the reference image in a predetermined space, the ellipsoid relating to the pixel in the reference image; and
an image generation unit which reconstructs one image from the reference image and the target image, according to information indicating where the pixel of the local area is present.

2. The image processing system according to claim 1, wherein the pixel operation unit includes:
a determination area specification unit which specifies, as the ellipsoid in the predetermined space, a determination area for determining whether or not the pixel in the target image relative to the pixel in the reference image is the pixel of the local area;
a difference calculation unit which relates the pixel in the target image to the pixel in the reference image by specifying the pixel in the reference image nearest the position of the pixel in the target image when the target image is corrected so as to resolve the positional displacement between the target image and the reference image, and calculating the relative pixel differential vector which is the differential vector of the respective vectors of the relative pixels; and
a local area determination unit which determines, for each pixel in the target image, whether or not a position in the space of the pixel in the target image is outside the determination area of the pixel in the reference image relative to the pixel, using the relative pixel differential vector, to thereby determine whether or not the pixel in the target image is the pixel of the local area.

3. The image processing system according to claim 2, wherein when the reference image is input, the determination area specification unit selects pixels in the reference image one by one, calculates an adjacent pixel differential vector which is a differential vector of respective vectors of the selected pixel and each surrounding pixel of the selected pixel, specifies a maximum variance vector which is the adjacent pixel differential vector having a largest magnitude, and sets the ellipsoid defined by the magnitude and a direction of the maximum variance vector and a pixel value of the selected pixel, as the determination area.

4. The image processing system according to claim 2, wherein the determination area specification unit includes:
 a maximum variance pixel specification unit which, when the reference image is input, selects pixels in the reference image one by one, and specifies, from among surrounding pixels of the selected pixel, a maximum variance pixel that corresponds to an adjacent pixel differential vector having a largest magnitude, the adjacent pixel differential vector being a differential vector of respective vectors of the selected pixel and each surrounding pixel of the selected pixel; and
 a determination area calculation unit which, when the local area determination unit determines for each target image whether or not the pixel in the target image is the pixel of the local area that does not conform to the assumed change, selects the pixels in the reference image one by one, calculates the adjacent pixel differential vector from the selected pixel and the maximum variance pixel of the selected pixel, and sets the ellipsoid defined by the magnitude and a direction of the adjacent pixel differential vector and a pixel value of the selected pixel, as the determination area.

5. The image processing system according to claim 2, wherein when the target image is input, the determination area specification unit selects pixels in the target image one by one, calculates an adjacent pixel differential vector which is a differential vector of respective vectors of the selected pixel and each surrounding pixel of the selected pixel, specifies a maximum variance vector which is the adjacent pixel differential vector having a largest magnitude, and sets the ellipsoid defined by the magnitude and a direction of the maximum variance vector and a pixel value of the selected pixel, as the determination area.

6. The image processing system according to claim 1, wherein the pixel operation unit includes:
 a difference calculation unit which relates the pixel in the target image to the pixel in the reference image by specifying the pixel in the reference image nearest the position of the pixel in the target image when the target image is corrected so as to resolve the positional displacement between the target image and the reference image, and calculates the relative pixel differential vector which is the differential vector of the respective vectors of the relative pixels; and
 a local area determination unit which calculates a base index value for each pixel in the target image using the relative pixel differential vector, and determines whether or not the pixel in the target image is the pixel of the local area based on the base index value, the base index value indicating a degree of whether or not positions in the predetermined space of a plurality of pixels in the target image which are centered on the pixel are respectively in or outside ellipsoids in the space relating to pixels in the reference image relative to the plurality of pixels.

7. The image processing system according to claim 6, wherein when the reference image is input, the local area determination unit selects pixels in the reference image one by one, calculates an adjacent pixel differential vector which is a differential vector of respective vectors of the selected pixel and each surrounding pixel of the selected pixel, specifies a maximum variance vector which is the adjacent pixel differential vector having a largest magnitude, and defines the ellipsoid according to the maximum variance vector.

8. The image processing system according to claim 6, wherein the local area determination unit:
 selects, when the reference image is input, pixels in the reference image one by one, calculates an adjacent pixel differential vector which is a differential vector of respective vectors of the selected pixel and each surrounding pixel of the selected pixel, and specifies a maximum variance pixel that corresponds to the adjacent pixel differential vector having a largest magnitude; and
 selects, when determining whether or not the pixel in the target image is the pixel of the local area, the pixels in the reference image one by one, calculates the adjacent pixel differential vector from the selected pixel and the maximum variance pixel of the selected pixel, and defines the ellipsoid according to the adjacent pixel differential vector.

9. The image processing system according to claim 1, wherein the image generation unit generates a high-resolution image having a larger number of pixels than each of the reference image and the target image, from the reference image and the target image.

10. The image processing system according to claim 9, further comprising:
 a pixel value replacement unit which replaces a pixel value of the pixel in the target image determined as the pixel of the local area that does not conform to the assumed change, with a pixel value of the pixel in the reference image relative to the pixel,
 wherein the image generation unit generates the high-resolution image, from the reference image and the target image in which the pixel value has been replaced by the pixel value replacement unit.

11. The image processing system according to claim 1, wherein the image generation unit calculates, from the reference image and the target image, a mean pixel value of the relative pixels in the reference image and the target image while excluding the pixel of the local area that does not conform to the assumed change from the calculation of the mean pixel value, and generates a blended image having the calculated mean pixel value as a pixel value.

12. The image processing system according to claim 1, further comprising:
 a pixel value replacement unit which replaces a pixel value of the pixel in the target image determined as the pixel of the local area that does not conform to the assumed change, with a pixel value of the pixel in the reference image relative to the pixel,
 wherein the image generation unit generates a blended image having, as a pixel value, a mean pixel value of the relative pixels in the reference image and the target image, from the reference image and the target image in which the pixel value has been replaced by the pixel value replacement unit.

13. The image processing system according to claim 1, further comprising:
a reference image resolution increasing unit which increases a resolution of the reference image by interpolating the reference image,
wherein the pixel operation unit relates the pixel in the target image to the pixel in the reference image of the increased resolution by specifying the pixel in the reference image of the increased resolution nearest the position of the pixel in the target image when the target image is corrected so as to resolve the positional displacement, and calculates the relative pixel differential vector of the respective vectors of the relative pixels.

14. The image processing system according to claim 1, further comprising:
a target image resolution increasing unit which increases a resolution of the target image by interpolating the target image,
wherein the pixel operation unit relates the pixel in the target image of the increased resolution to the pixel in the reference image by specifying, from among pixels in an image obtained by correcting the target image of the increased resolution so as to resolve the positional displacement, the pixel nearest a position of the pixel in the reference image, and calculates the relative pixel differential vector of the respective vectors of the relative pixels.

15. An image processing method comprising:
calculating a positional displacement amount in a positional displacement between a target image and a reference image;
relating a pixel in the target image to a pixel in the reference image by specifying the pixel in the reference image nearest a position of the pixel in the target image when the target image is corrected so as to resolve the positional displacement, calculating a relative pixel differential vector which is a differential vector of respective vectors of the relative pixels, and determining whether or not the pixel in the target image is a pixel of a local area that does not conform to an assumed change with respect to the reference image, based on the relative pixel differential vector and an ellipsoid indicating uniform change of the reference image in a predetermined space, the ellipsoid relating to the pixel in the reference image; and
generating one image from the reference image and the target image, according to information indicating where the pixel of the local area is present.

16. A non-transitory computer readable information recording medium storing an image processing program, when executed by a computer performs a method for:
calculating a positional displacement amount in a positional displacement between a target image and a reference image;
relating a pixel in the target image to a pixel in the reference image by specifying the pixel in the reference image nearest a position of the pixel in the target image when the target image is corrected so as to resolve the positional displacement, calculating a relative pixel differential vector which is a differential vector of respective vectors of the relative pixels, and determining whether or not the pixel in the target image is a pixel of a local area that does not conform to an assumed change with respect to the reference image, based on the relative pixel differential vector and an ellipsoid indicating uniform change of the reference image in a predetermined space, the ellipsoid relating to the pixel in the reference image; and
generating one image from the reference image and the target image, according to information indicating where the pixel of the local area is present.

17. An image processing system comprising:
at least one processor, wherein the at least one processor is configured to include:
positional displacement amount calculation means for calculating a positional displacement amount in a positional displacement between a target image and a reference image;
pixel operation means for relating a pixel in the target image to a pixel in the reference image by specifying the pixel in the reference image nearest a position of the pixel in the target image when the target image is corrected so as to resolve the positional displacement, calculating a relative pixel differential vector which is a differential vector of respective vectors of the relative pixels, and determining whether or not the pixel in the target image is a pixel of a local area that does not conform to an assumed change with respect to the reference image, based on the relative pixel differential vector and an ellipsoid indicating uniform change of the reference image in a predetermined space, the ellipsoid relating to the pixel in the reference image; and
an image reconstruction means for generating one image from the reference image and the target image, according to information indicating where the pixel of the local area is present.

* * * * *